(12) United States Patent
Watanabe

(10) Patent No.: US 7,848,647 B2
(45) Date of Patent: *Dec. 7, 2010

(54) OPTICAL SWITCH AND OPTICAL WAVEFORM MONITORING DEVICE UTILIZING OPTICAL SWITCH

(75) Inventor: Shigeki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 929 days.

This patent is subject to a terminal disclaimer.

(21) Appl. No.: 11/216,213

(22) Filed: Sep. 1, 2005

(65) Prior Publication Data

US 2006/0051100 A1 Mar. 9, 2006

Related U.S. Application Data

(63) Continuation-in-part of application No. 11/096,090, filed on Apr. 1, 2005, now abandoned.

(30) Foreign Application Priority Data

| Sep. 1, 2004 | (JP) | ............... 2004-254758 |
| Nov. 30, 2004 | (JP) | ............... 2004-346757 |
| Jul. 8, 2005 | (JP) | ............... 2005-200572 |

(51) Int. Cl.
*H04J 14/00* (2006.01)

(52) U.S. Cl. ............... 398/45; 398/65; 398/152; 398/178; 398/180; 359/330; 359/333

(58) Field of Classification Search ............... 398/9, 398/14, 25, 33, 45, 65, 152, 173–175, 177, 398/180; 359/298–333

See application file for complete search history.

(56) References Cited

U.S. PATENT DOCUMENTS 5,798,853 A * 8/1998 Watanabe ............ 398/150

| 5,880,866 A | 3/1999 | Stolen |
| 6,307,984 B1 | 10/2001 | Watanabe |
| 6,504,972 B2 | 1/2003 | Watanabe |
| 6,771,853 B2 | 8/2004 | Watanabe |
| 6,806,996 B2 * | 10/2004 | Tatsuura et al. ............ 359/298 |

(Continued)

FOREIGN PATENT DOCUMENTS

EP 0 843 435 5/1998

(Continued)

OTHER PUBLICATIONS

Li et al: "OTDM Demultiplexer Based on XPM-Induced Wavelength Shifting in Highly Nonlinear Fiber", IEEE Photonics Technology Letters, vol. 15, No. 12, Dec. 2003, pp. 1770-1772.*
Tosi-Beleffi et al: "10 Gbit/s all-optical 2R fiber based regeneration", Optical Communications, vol. 236, Jun. 15, 2004, pp. 323-327.*
Stolen et al: "Parametric Amplification and Frequency Conversion in Optical Fibers", IEEE J. of Quantum Electronics, vol. QE-18, No. 7, Jul. 1982, pafges 1062-1072.*
Watanabe et al: "160 Gbits Optical 3R-Regenerator in a Fiber Transmission Experiment", OFC 2003, Mar. 23-28, 2003, PD16, p. 1-3.*
Notice of Rejection Grounds for corresponding Korean Application No. 10-2005-80779 mailed Oct. 23, 2006.

(Continued)

*Primary Examiner*—Li Liu
(74) *Attorney, Agent, or Firm*—Staas & Halsey LLP

(57) ABSTRACT

The polarization direction of an optical signal is changed by a polarization controller so as to be orthogonal to a main axis of a polarizer. A control pulse generator generates control pulses from control beam with a wavelength which is different from the wavelength of the optical signal. The optical signal and the control pulse are input to a nonlinear optical fiber. In the nonlinear optical fiber, the optical signal, during a time period in which the optical signal and the control pulse coincide, is amplified with optical parametric amplification around a polarization direction of the control pulse. The optical signal, during the time period in which the optical signal and the control pulse coincide, passes through the polarizer.

26 Claims, 45 Drawing Sheets

U.S. PATENT DOCUMENTS

| | | | |
|---|---|---|---|
| 6,870,974 | B2 | 3/2005 | Watanabe |
| 6,963,436 | B2 | 11/2005 | Watanabe |
| 6,985,652 | B2 * | 1/2006 | Tatsuura et al. ............... 385/16 |
| 7,068,931 | B2 * | 6/2006 | Tokunaga ..................... 398/14 |
| 7,202,994 | B2 * | 4/2007 | Okuno et al. ............... 359/332 |
| 7,639,945 | B2 * | 12/2009 | Tamura et al. ................ 398/45 |
| 2001/0031110 | A1 | 10/2001 | Imajuku |
| 2001/0053263 | A1 | 12/2001 | Watanabe |
| 2002/0003653 | A1 * | 1/2002 | Takeda et al. ............... 359/333 |
| 2003/0035618 | A1 | 2/2003 | Watanabe |
| 2003/0043366 | A1 | 3/2003 | Ohta et al. |
| 2004/0057682 | A1 * | 3/2004 | Nicholson et al. .......... 385/122 |
| 2004/0081470 | A1 | 4/2004 | Griffin |
| 2004/0184698 | A1 | 9/2004 | Watanabe |
| 2004/0184808 | A1 * | 9/2004 | Hwang et al. ................. 398/85 |
| 2005/0265434 | A1 | 12/2005 | Watanabe |
| 2005/0265728 | A1 | 12/2005 | Yao |
| 2006/0045445 | A1 | 3/2006 | Watanabe ................... 385/122 |
| 2006/0051100 | A1 | 3/2006 | Watanabe |
| 2006/0159463 | A1 | 7/2006 | Futami et al. |

FOREIGN PATENT DOCUMENTS

| | | |
|---|---|---|
| EP | 862078 | 9/1998 |
| JP | S61-156232 | 7/1986 |
| JP | 7-98464 | 4/1995 |
| JP | 08-184502 * | 7/1996 |
| JP | 11-24115 | 1/1999 |
| JP | 11-220443 | 8/1999 |
| JP | 2002-90788 | 3/2002 |
| JP | 2002-090788 | 3/2002 |
| JP | 2003-65857 | 3/2003 |
| JP | 2003-149693 | 5/2003 |
| JP | 2003-209516 | 7/2003 |
| JP | 2003-294538 | 10/2003 |
| JP | 2003-294539 * | 10/2003 |
| SE | 523 544 | 4/2004 |
| SE | 523544 * | 4/2004 |
| WO | 98/08138 | 2/1998 |

OTHER PUBLICATIONS

P. A. Andrekson et al., "16Gbit/s All-Optical Demultiplexing Using Four-Wave Mixing", Electronics Letters, May 23, 1991, vol. 27, No. 11, pp. 922-924.

P. O. Hedekvist et al., "Demonstration of fibre four-wave mixing optical demultiplexing with 19dB parametric amplification", Electronics Letters, Apr. 25, 1996, vol. 32, No. 9, pp. 830-831.

Bengt-Erik Olsson et al., "80 to 10 Gbit/s Demultiplexing using Fiber Cross-Phase Modulation and Optical Filtering", Annual Meeting of the IEEE Lasers and Electro-Optics Society, Nov. 13, 2000, vol. 1 of 2, pp. 159-160.

J. Li et al., "OTDM Demultiplexer Based on XPM-Induced Wavelength Shifting in Highly Nonlinear Fiber", Optical Fiber Communication Conference. (OFC). Postconference Digest, Atlanta, GA, Mar. 23-28, 2003, Trends in Optics and Photonics Series. (TOPS), Washington, DC: OSA, US, vol. 86, pp. 198-200, Mar. 23, 2003.

European Patent Office Action, mailed Feb. 8, 2007, and issued in corresponding European Patent Application No. 05 018 767.3-2415.

Extended Search Report for corresponding European Application No. 05018767.3 dated May 24, 2006.

T. Morioka et al., "Ultrafast Optical Multi/Demultiplexer Utilising Optical Kerr Effect in Polarisation-Maintaining Single-Mode Fibres", Electronics Letters, IEE Stevenage, GB, vol. 23, No. 9, Apr. 1987, pp. 453-454, XP009066727.

Korean Patent Office Notice of Preliminary Rejection, mailed May 28, 2007 and issued in corresponding Korean Patent Application No. 10-2005-0080779.

Extended European Search Report, mailed Jun. 22, 2007 and issued in corresponding European Patent Application No. 07009620.1-2415.

European Office Communication, mailed Jul. 5, 2007 and issued in corresponding European Patent Application No. 05 018 767.3-2415.

S. Watanabe et al., "Ultrafast All-Optical 3R-Regeneration", IEICE Transactions on Electronics, vol. E87-C, No. 7, Jul. 2004, pp. 1114-1118.

Nobuhide Yamada et al., "Polarization-Insensitive Optical Sampling System Using Two KTP Crystals", IEEE Photonics Technology Letters, vol. 16, No. 1, Jan. 2004, pp. 215-217.

Govind P. Agrawal, "Nonlinear Fiber Optics", The Institute of Optics, University of Rochester, Academic Press, Inc. 1989, pp. 180-186.

Japanese Office Action, dated Aug. 29, 2006, and issued in priority Japanese Application No. 2005-200572.

Islam et al. "Cross-phase modulation in optical fibers"; Optical Society of America; vol. 12, No. 8, Aug. 1987; (3pp).

S. Watanabe, et al., "160Gbit/s Optical 3R-Regenerator in a Fiber Transmission Experiment", Optical Fiber Communications Conference, 2003, PD16, pp. 1-3, vol. 3, Mar. 23-28, 2003 (Previously Cited).

Korean Office Action for corresponding Korean application 10-2005-0080779; mailed Oct. 6, 2008.

Korean Decision of Rejections issued Jun. 24, 2009 in corresponding Korean Patent Application 10-2005-0080779.

Korean Notice of Submission of Opinion issued Jun. 24, 2009 in corresponding Korean Patent Application 10-2008-0002663.

Korean Notice of Submission of Opinion issued Jun. 24, 2009 in corresponding Korean Patent Application 10-2009-0029603.

U.S. Notice of Allowance for parent U.S. Appl. No. 11/346,242; mailed Jul. 11, 2008.

U.S. Office Action for parent U.S. Appl. No. 11/346,242; mailed Dec. 2, 2008.

U.S. Notice of Allowance for parent U.S. Appl. No. 11/346,242; mailed Sep. 3, 2009.

Korean Office Action for corresponding Korean Application 10-2008-002663; dated Dec. 11, 2009.

Korean Office Action for corresponding Korean Application 10-2009-29603; dated Jan. 7, 2010.

S. Watanabe, et al., "160Gbit/s Optical 3R-Regenerator in a Fiber Transmission Experiment", Optical Fiber Communications Conference, 2003, PD16, pp. 1-3, vol. 3, Mar. 23-28, 2003.

R. Ludwig, et al., "160Gbit/s 3R-Regenerating Wavelength Converter", Post-Deadline Papers Technical Digest, 7th OptoElectronics and Communications Conference, PD-1-3, Jul. 8-12, 2002.

S. Watanabe, et al., "Novel Fiber Kerr-Switch with Parametric Gain: Demonstration of Optical Demultiplexing and Sampling up to 640 Gb/s", ECOC 2004 Proceedings Post-Deadline Papers Th4.1.6, pp. 12-13.

L. Lefort, et al., "All-optical switching and sampling based on a parametric device with type II phase-matching", Lasers and Electro-Optics Society Annual Meeting, 1995, Annual Meeting Conference Proceedings, vol. 1, pp. 340-341.

D.U. Noske, et al., "Picosecond Optical Fibre Sampling Oscilloscope", Electronics Letters, vol. 27, No. 19, pp. 1739-1741, Sep. 12, 1991.

Extended European Search Report, dated May 24, 2006, and issued in related European Patent Application No. 05018767.3-2415.

Japanese Patent Office Notice of Rejection, dated Aug. 29, 2006, and issued in related Japanese Patent Application No. 2005-200572.

Korean Office Action mailed May 17, 2010 and issued in corresponding Korean Patent Application 10-2008-0029603.

Korean Office Action mailed May 17, 2010 and issued in corresponding Korean Patent Application 10-2008-0002663.

U.S. Notice of Allowance for related U.S. Appl. No. 11/346,242, filed Jul. 11, 2008.

U.S. Office Action for related U.S. Appl. No. 11/346,242, filed Dec. 2, 2008.

U.S. Notice of Allowance for related U.S. Appl. No. 11/346,242, filed Sep. 3, 2009.

* cited by examiner

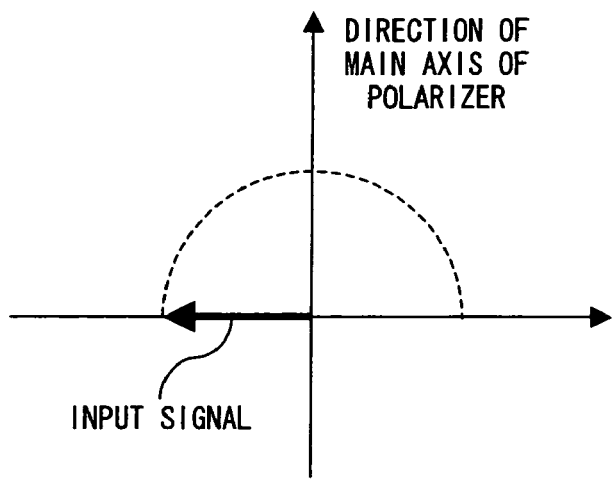
F I G. 6A
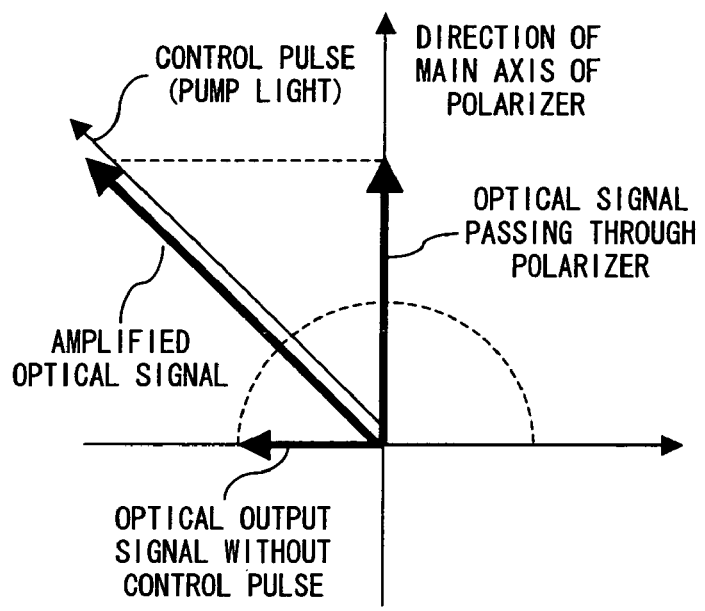
F I G. 6B
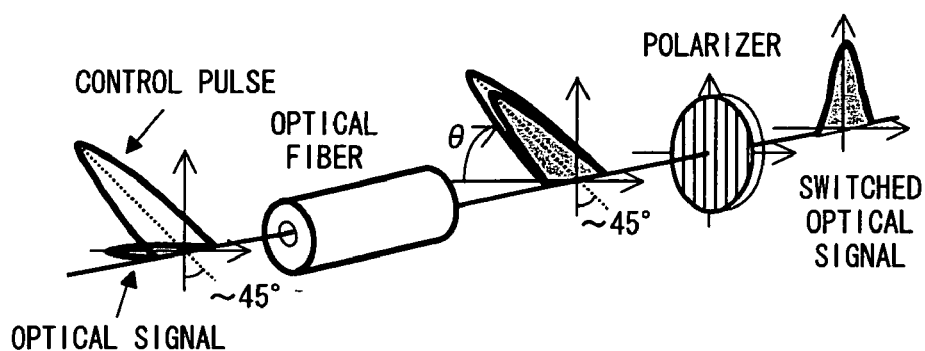
F I G. 6C

F I G. 9 A
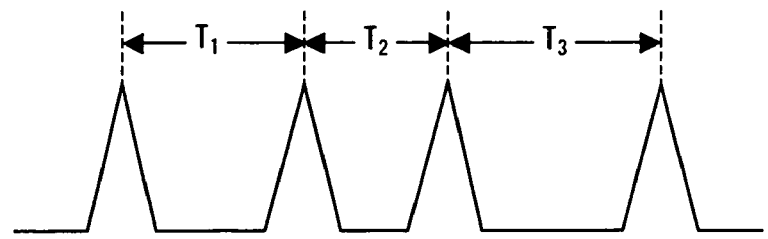
F I G. 9 B
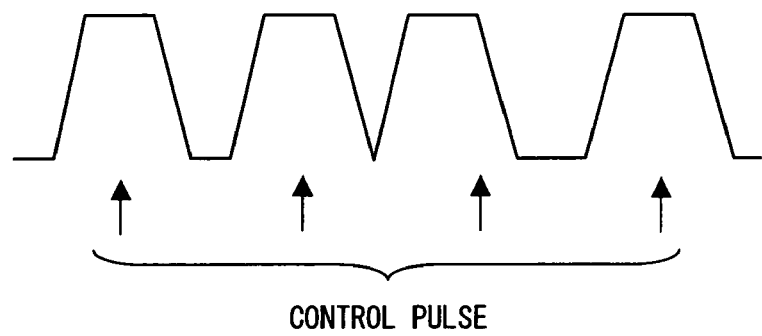
CONTROL PULSE
F I G. 9 C
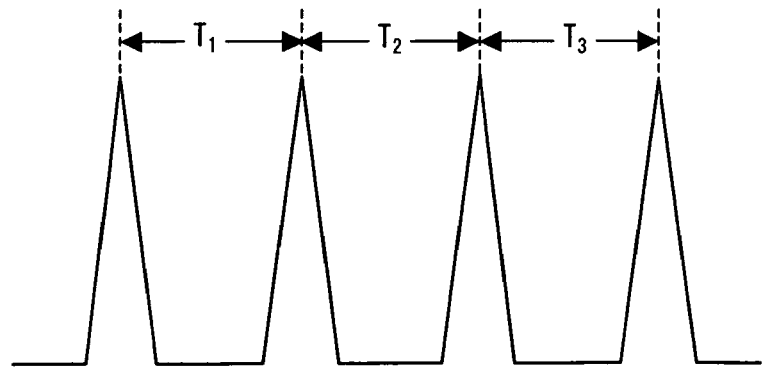

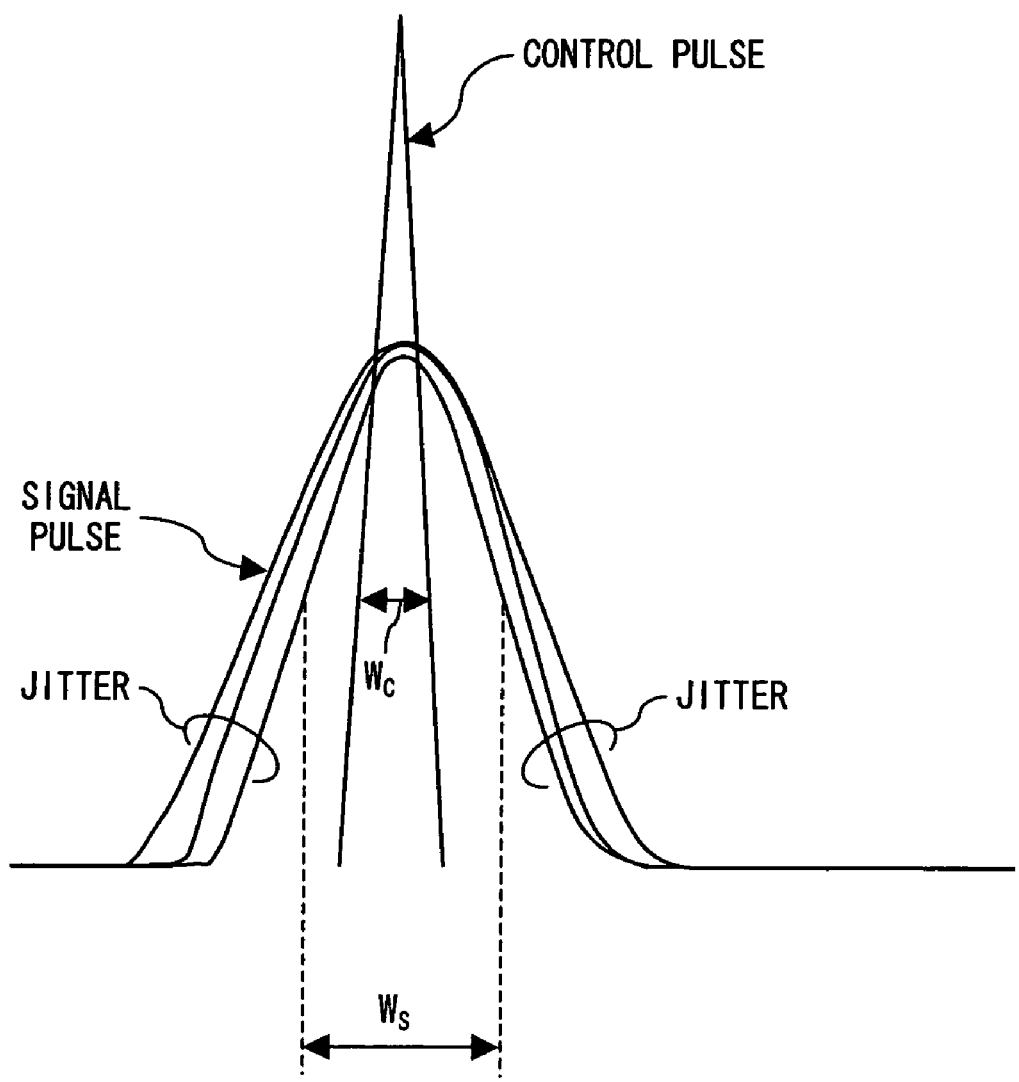
F I G. 1 1

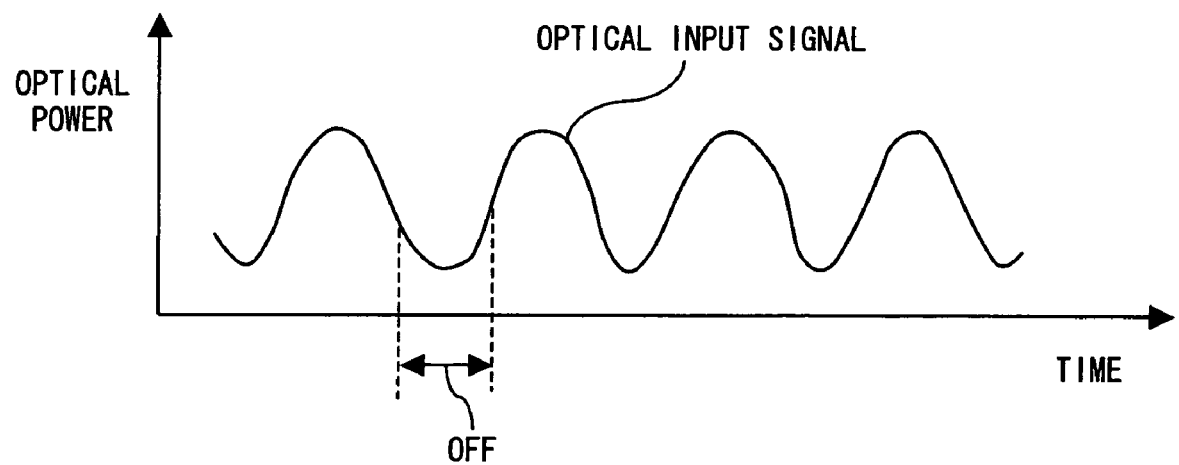
F I G. 1 5 A
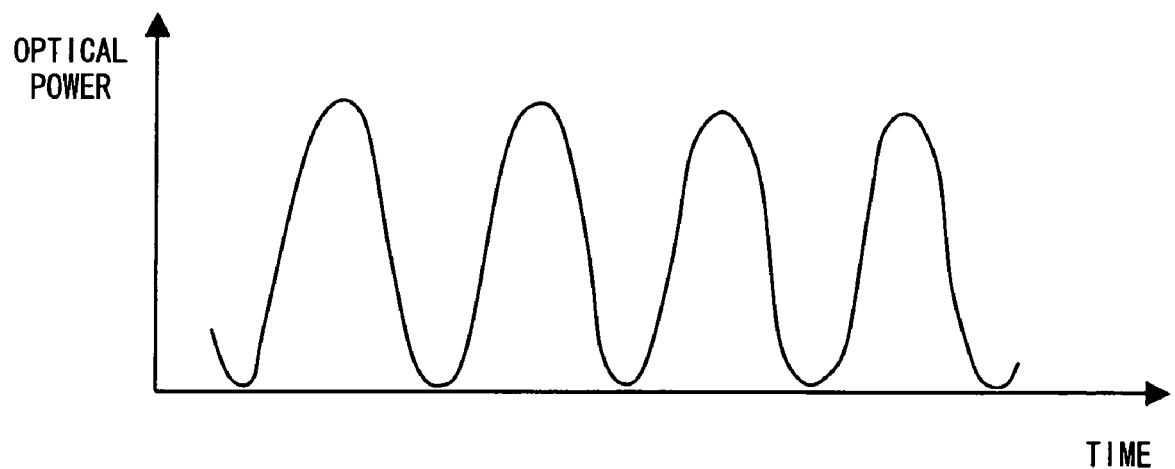
F I G. 1 5 B

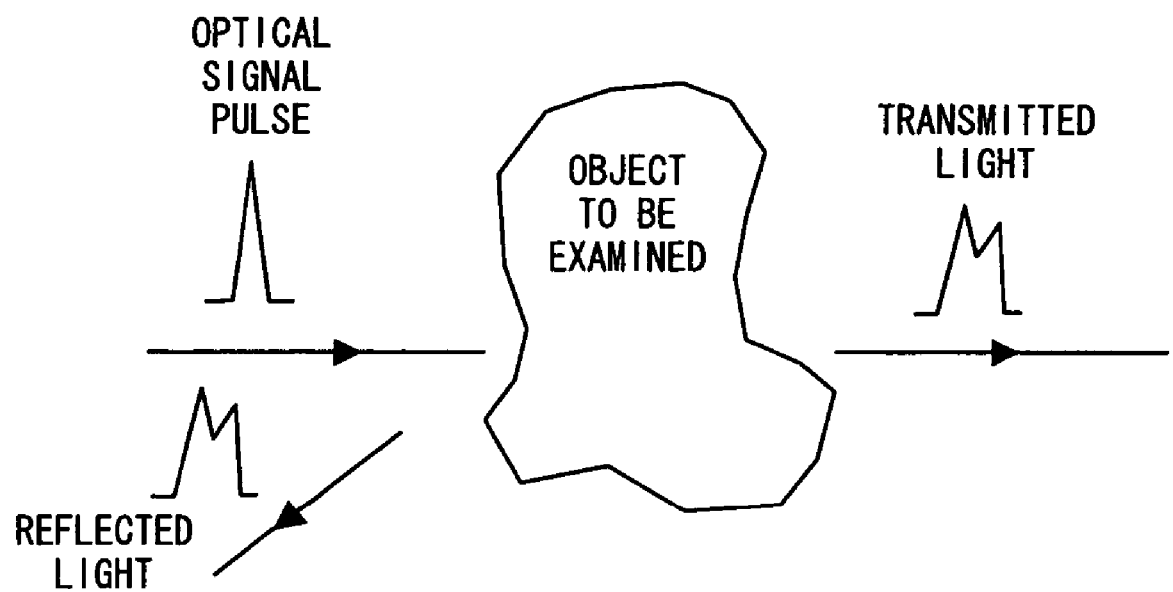
F I G. 1 8

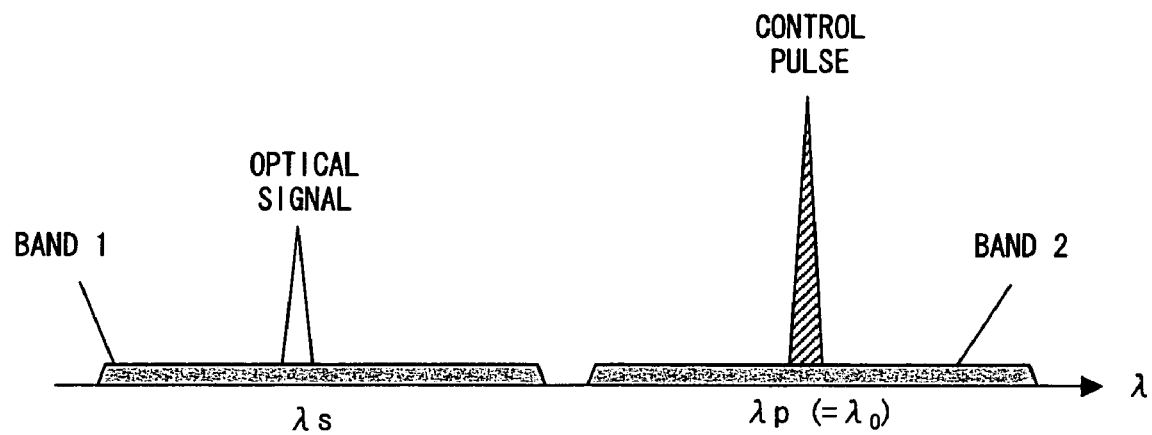
F I G. 2 1 A
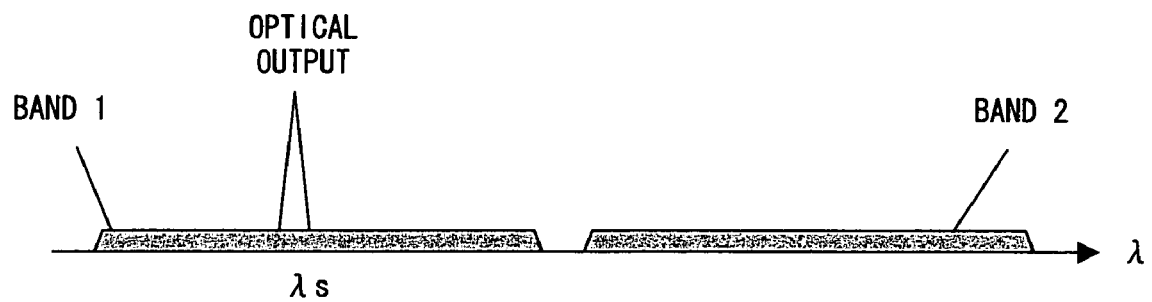
F I G. 2 1 B

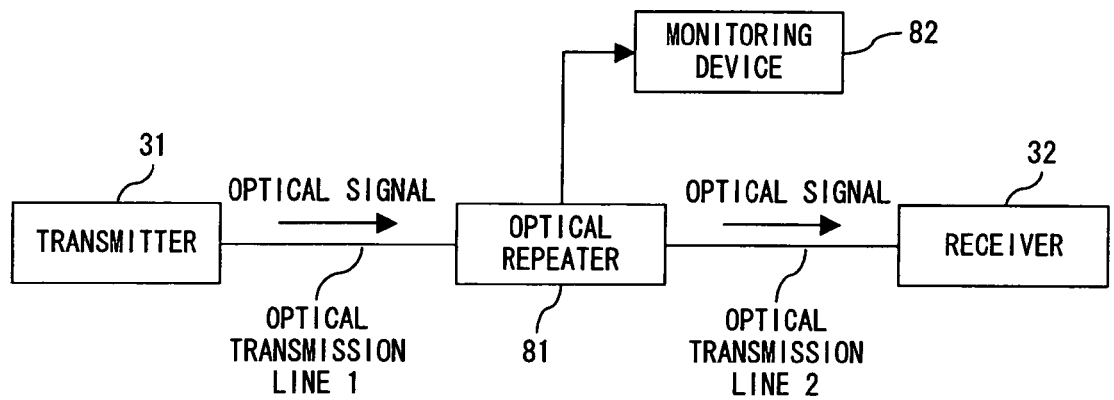
F I G. 2 5 A
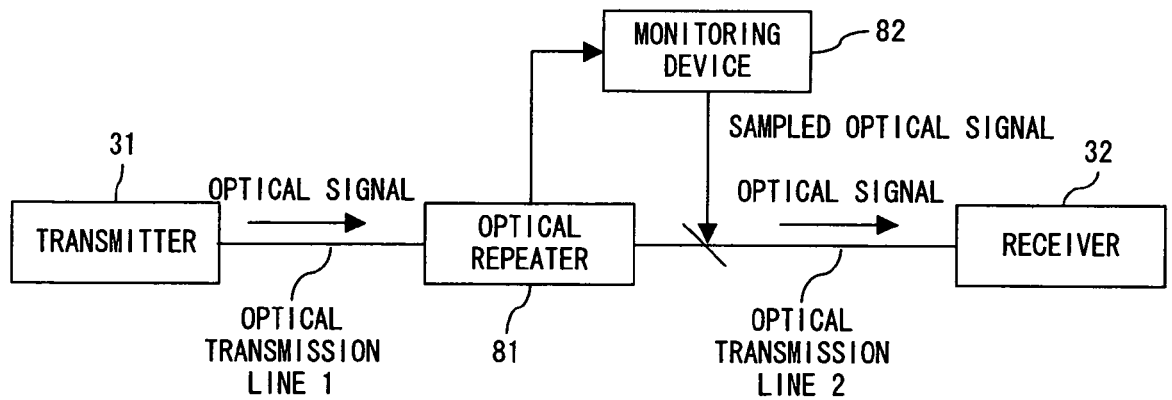
F I G. 2 5 B

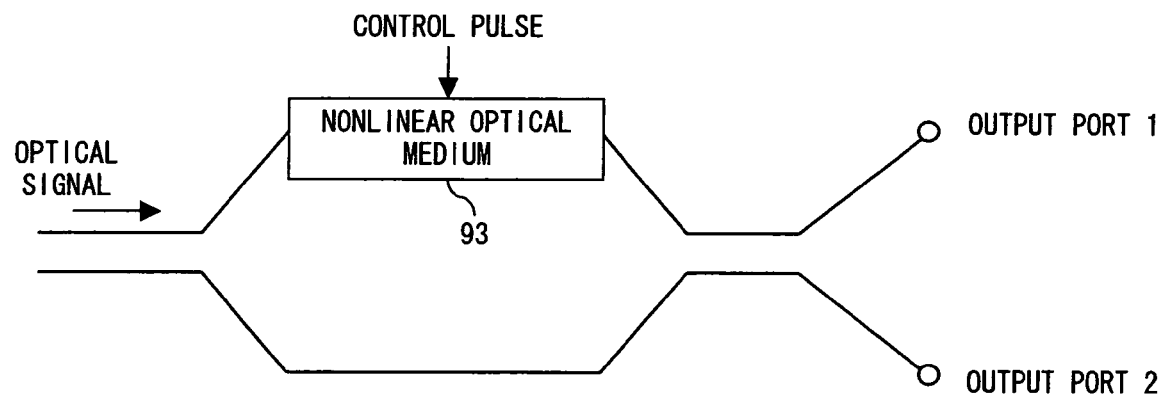
F I G. 2 7

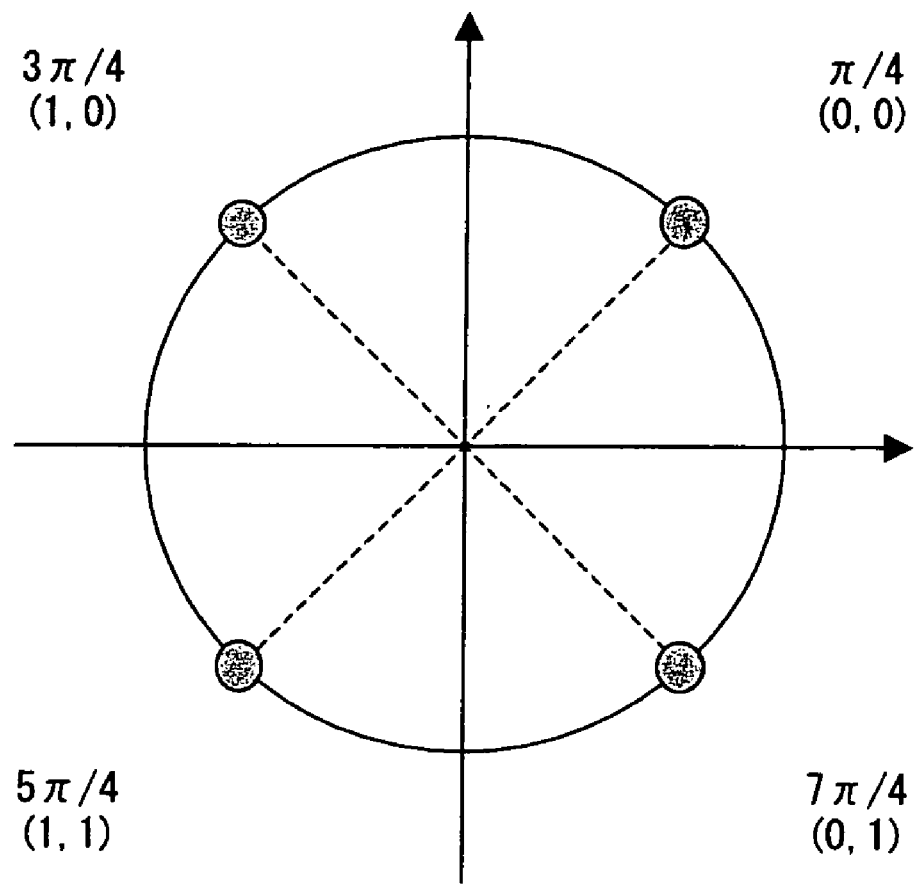
F I G. 2 9

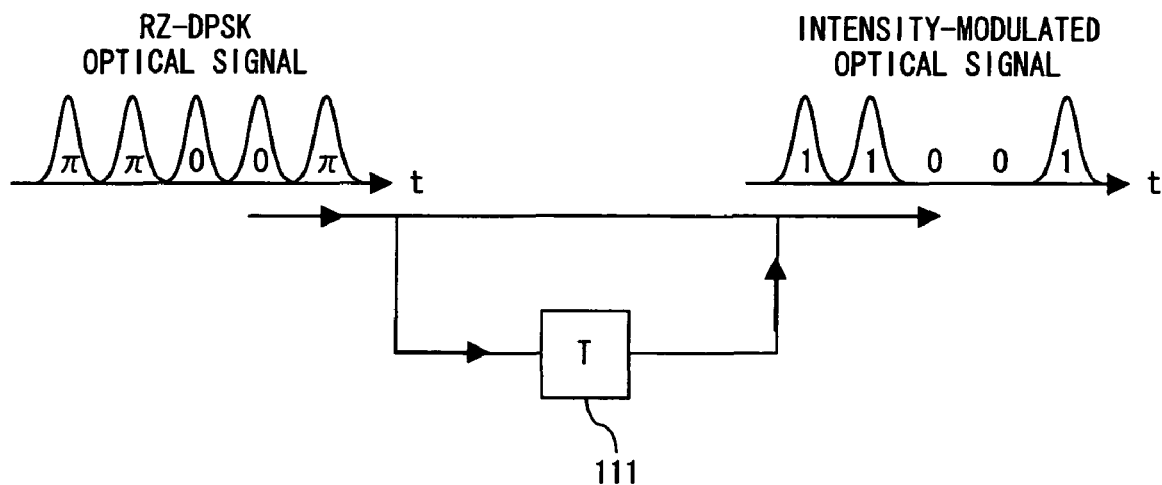
F I G. 3 0 A
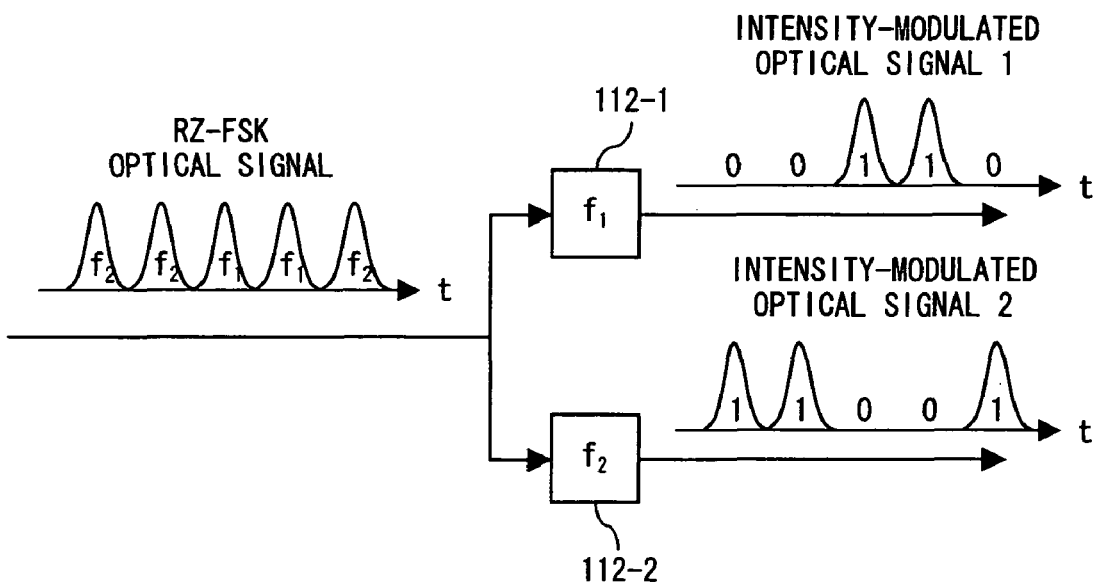
F I G. 3 0 B

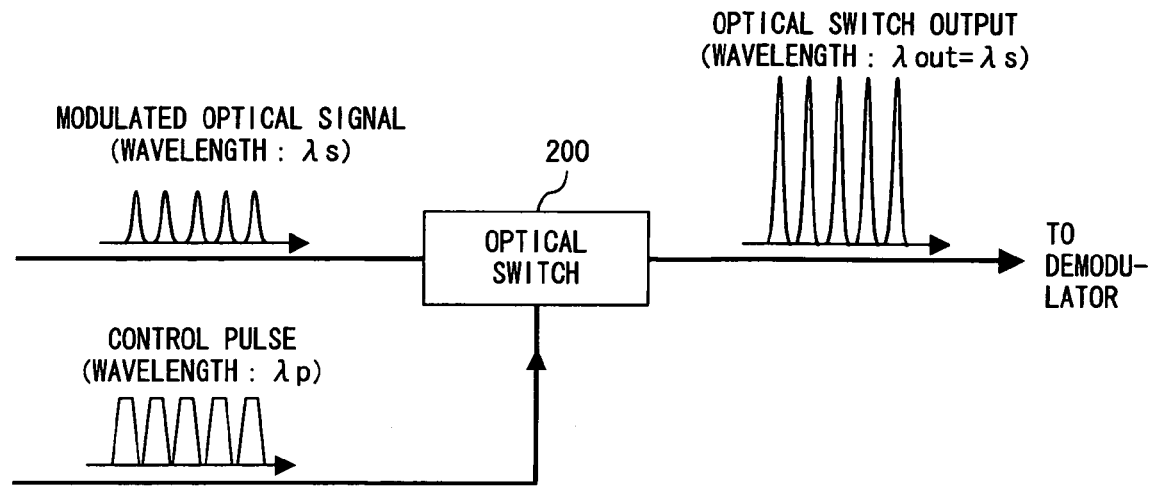
F I G. 3 1 A
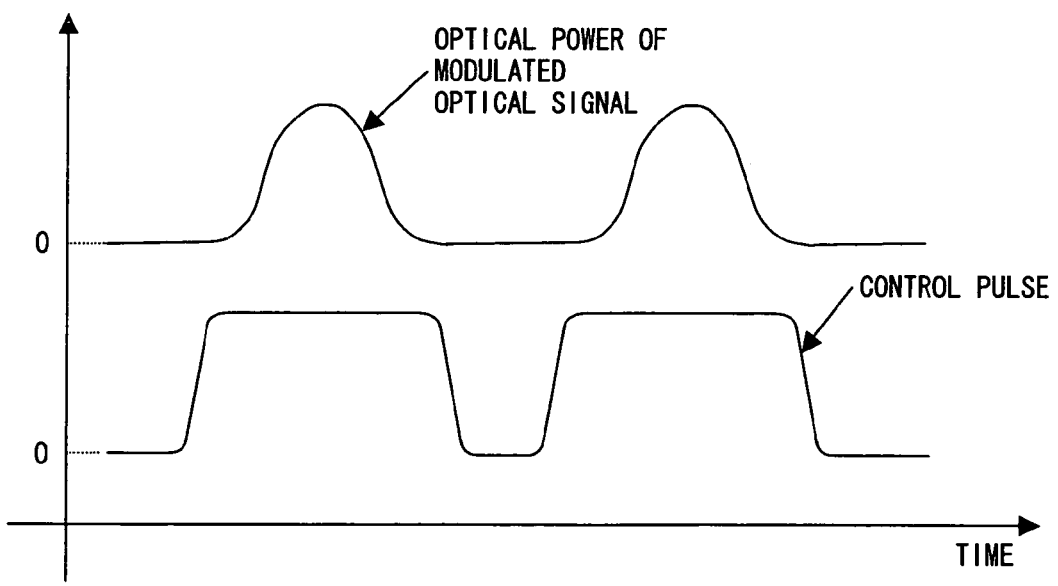
F I G. 3 1 B

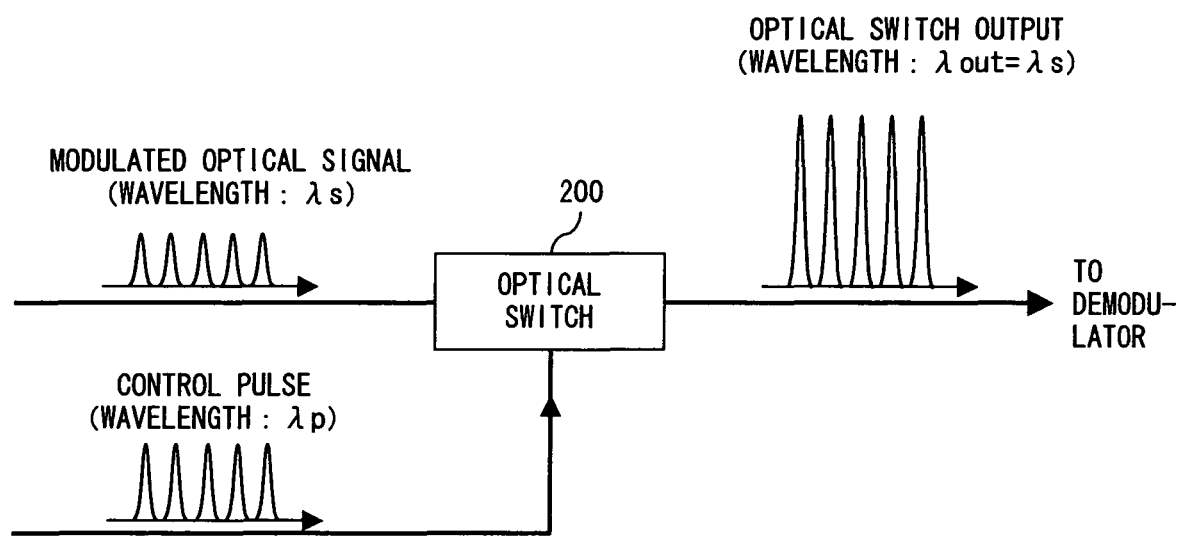
F I G. 3 2

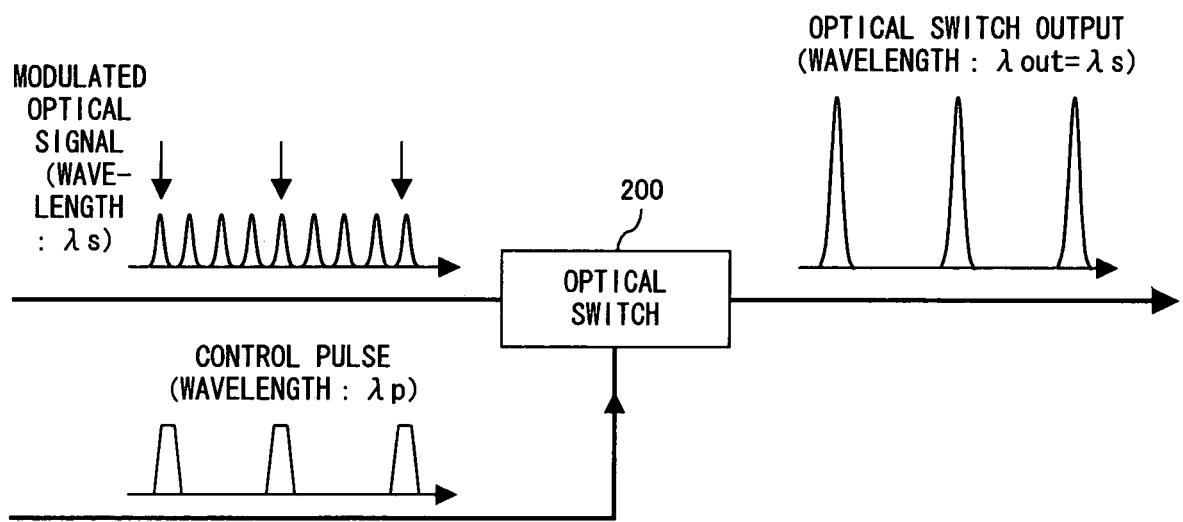
F I G. 3 3

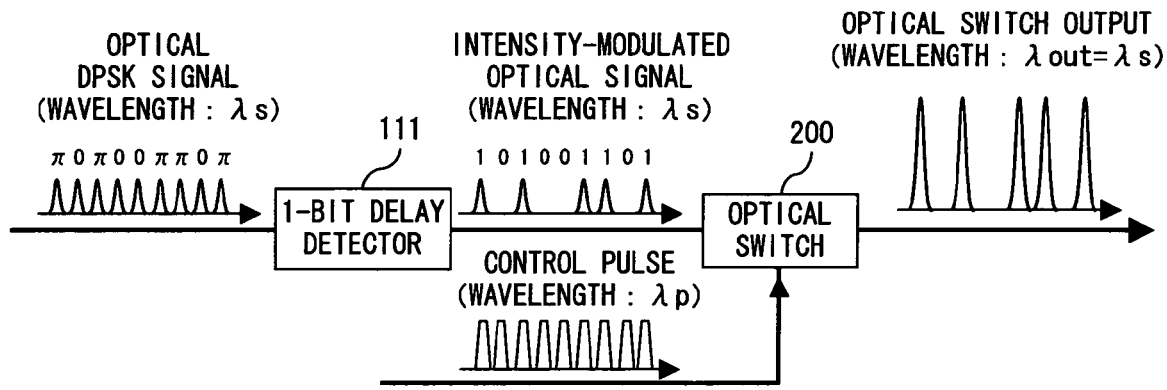
F I G. 3 4 A
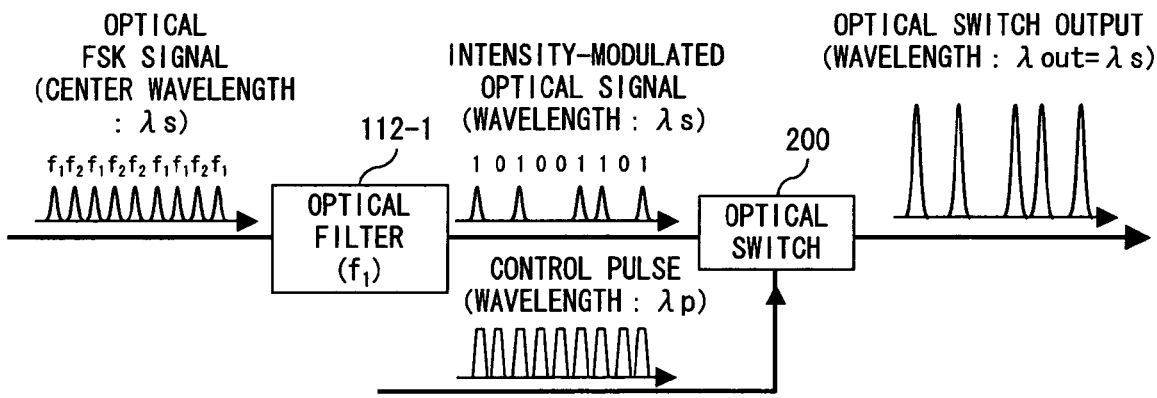
F I G. 3 4 B

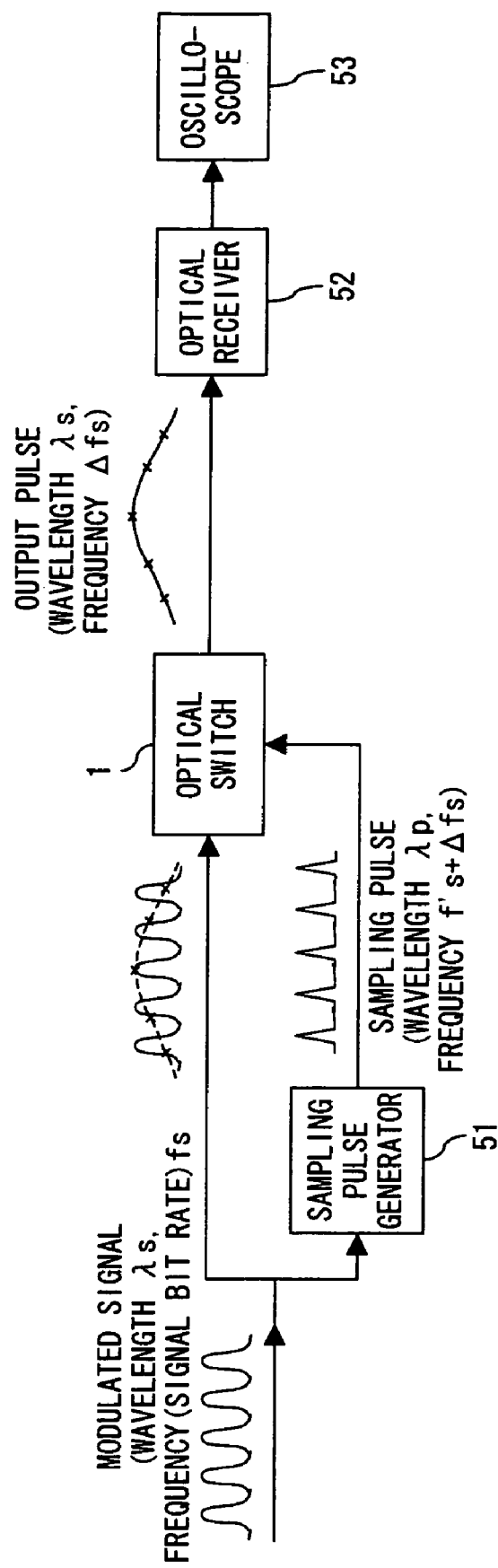
F I G. 35

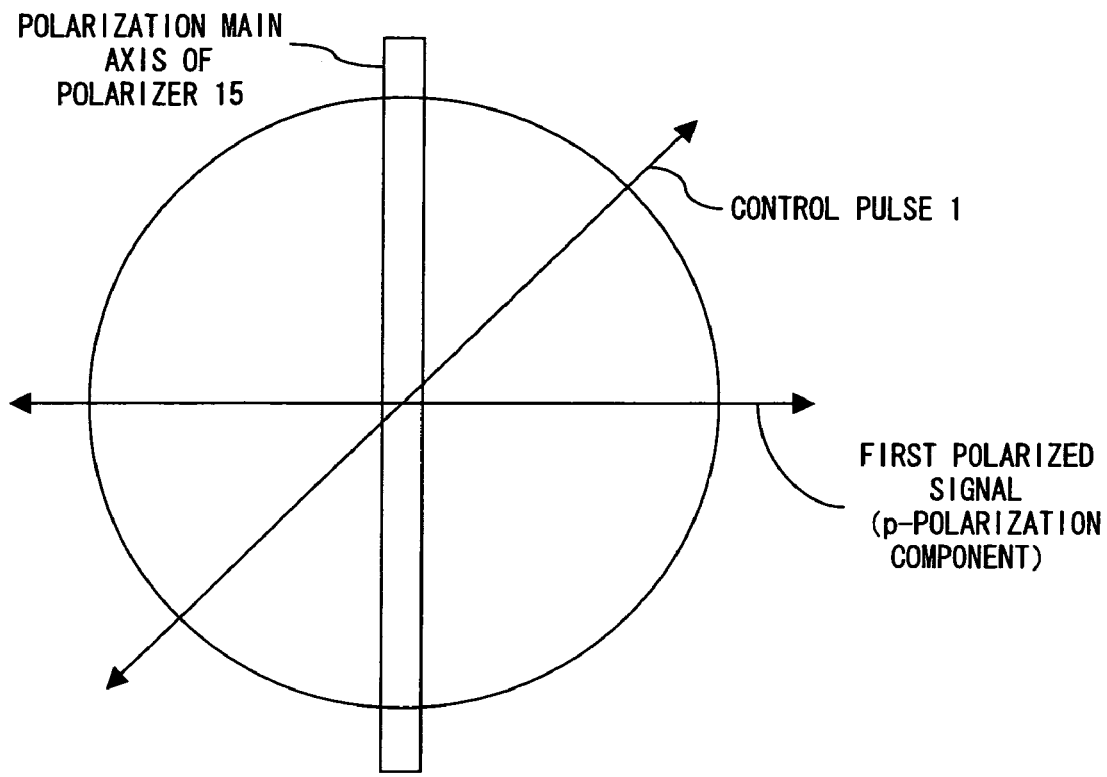
F I G. 37A
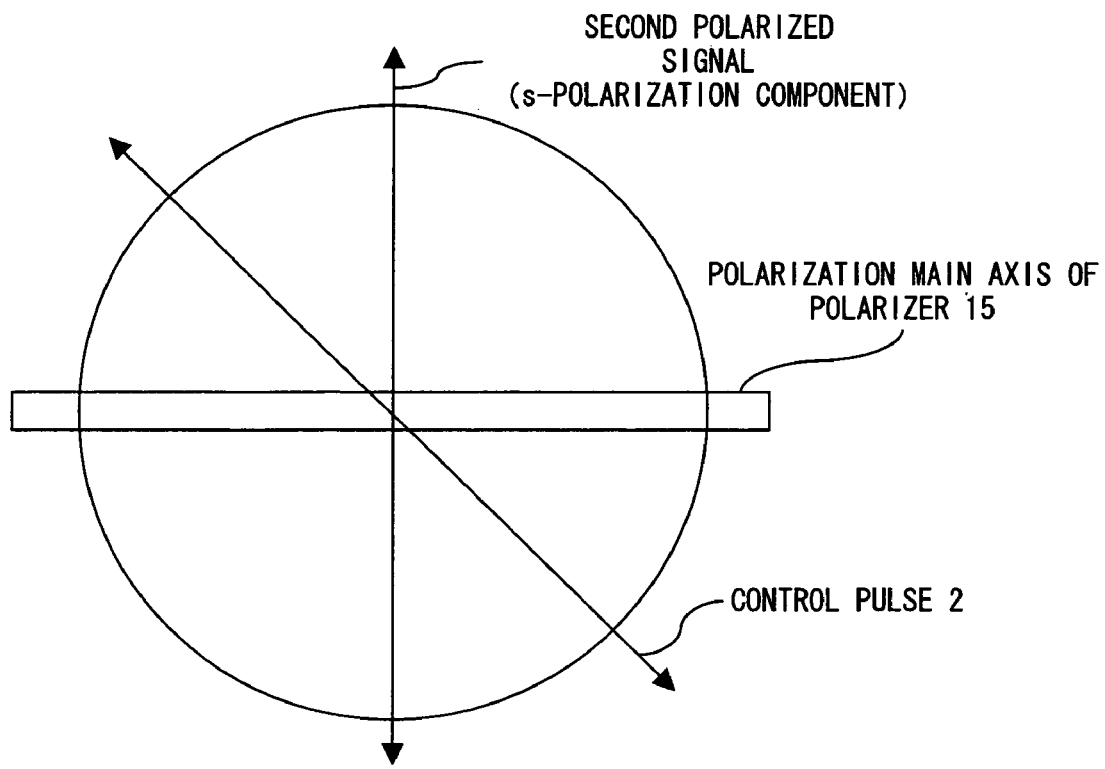
F I G. 37B

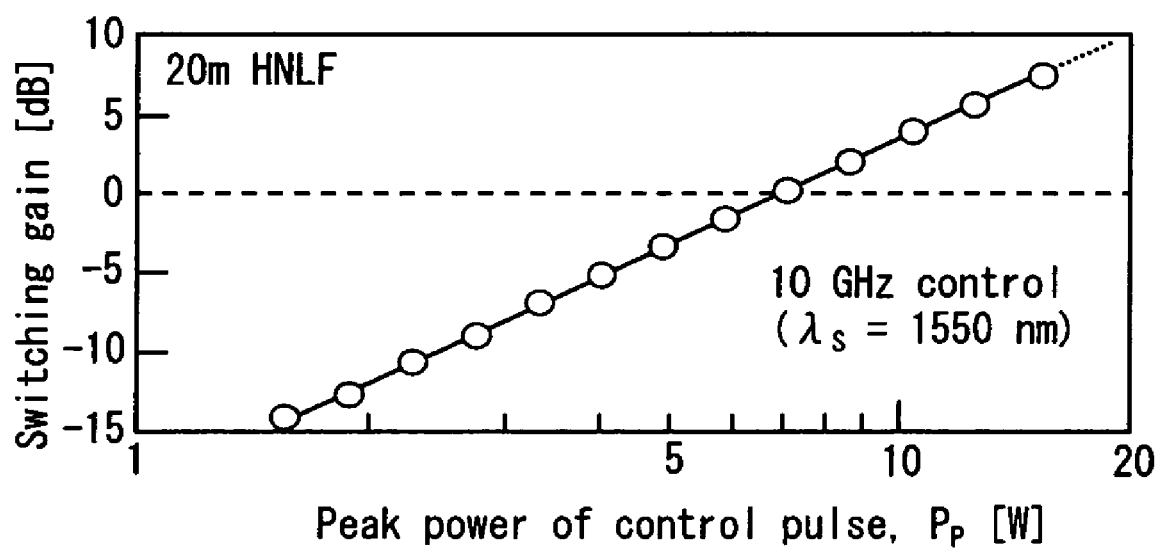
F I G. 4 1

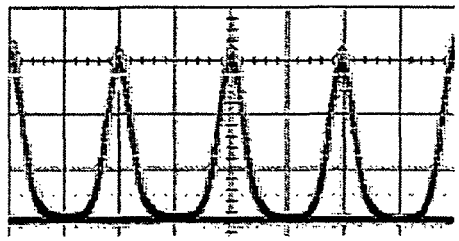
160 Gb/s (λs = 1540 nm)
F I G. 4 4 A
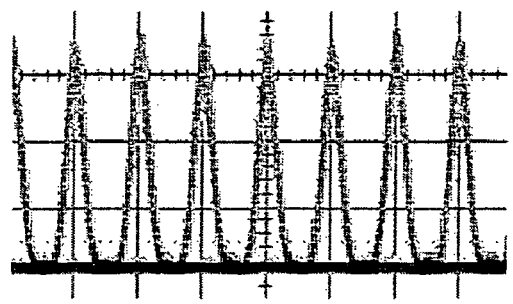
320 Gb/s (λs= 1550 nm)
F I G. 4 4 D
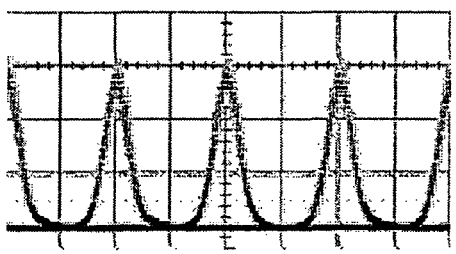
λs = 1550nm
F I G. 4 4 B
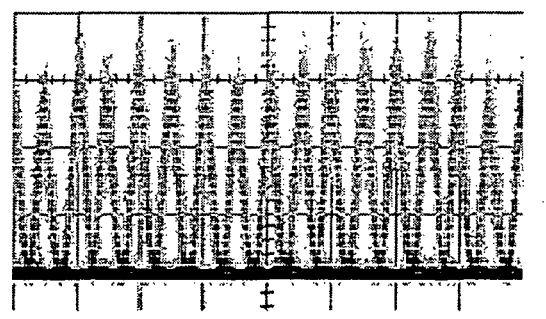
640 Gb/s (λs = 1550 nm)
F I G. 4 4 E
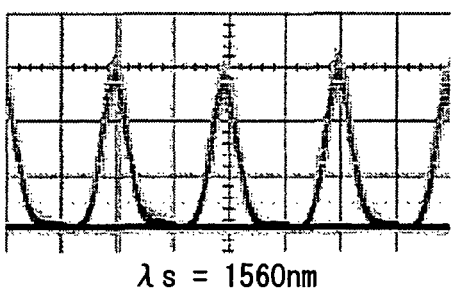
λs = 1560nm
F I G. 4 4 C

OPTICAL SWITCH AND OPTICAL WAVEFORM MONITORING DEVICE UTILIZING OPTICAL SWITCH

This application is a continuation-in-part of application Ser. No. 11/096,090, filed on Apr. 1, 2005, now abandoned.

BACKGROUND OF THE INVENTION

1. Field of the Invention

The present invention relates to technology for extraction of part of an optical signal, more specifically to a method of extracting time-division-multiplexed optical signals with a series of optical pulses or a component of the signals, to an optical switch that utilizes the method and to an optical sampling oscilloscope that utilizes the optical switch.

2. Description of the Related Art

Increase in data volume and the need for long-distance communication in recent years have promoted a wide spread of devices and systems utilizing optical technology. A part of this technology, the optical switch, which extracts a part of an optical signal consisting of a series of optical pulses, is under research and development as a core element. The following methods are known as conventional technology for switching optical signals consisting of a series of optical pulses:

(1) A technology, which first converts received optical signals into electrical signals, switches the signal, and converts back to an optical signal using an optical modulator or laser. This system is referred to as OE/EO type.

(2) A technology, which switches a selected channel by synchronizing electrical signal with the channel, and operating optical modulators such as $LiNbO_3$ modulator and EA (Electro-Absorption) modulator based on the synchronized signal.

(3) A technology, which carries out all switching processes by optical means without involving any electrical signals. To be more specific, the following methods are known as a part of this technology.

(3a) A method using a Mach-Zehnder Interferometer configured such that the phase difference between light passing through two waveguide arms is $\pi$.

(3b) A method utilizing nonlinear wave mixing such as four-wave mixing (FWM) and three wave mixing (TWM).

(3c) A technique, which utilizes the optical Kerr effect such as self phase modulation (SPM) or cross phase modulation (XPM).

(3d) A technique, using gain saturation effect such as cross gain modulation (XGM) and cross absorption modulation (XAM).

The following documents relate to the technology stated above. Non-patent documents 1 and 2 describe techniques to perform 3R regeneration without converting optical signal input into electrical signals. These 3R regeneration techniques yield regenerated signal output with a regular waveform, which are not influenced by jitter, by guiding input optical signal and clock signal regenerated from the optical signal to an optical gate circuit comprising highly-nonlinear fiber.

Patent document 1: Japanese published unexamined application No. H7-98464

Patent document 2: Japanese Patent No. 3494661

Non-patent document 1: S. Watanabe, R. Ludwig, F. Futami, C. Schubert, S. Ferber, C. Boener, C. Schmidt-Langhorst, J. Berger and H. G. Weber, "Ultrafast All-Optical 3R Regeneration", IEICE Trans. Electron, Vol. E87-C, No. 7, July 2004

Non-patent document 2: S. Watanabe, "Signal Regeneration Technique in Optical Field", Kogaku (Japanese Journal of Optics), Vol. 32, No. 1, pp. 10-15, 2003

The conventional technologies listed above have the following technical issues. The OE/EO type is up to 10 Gbps in practice, and research and development is proceeded to work toward practice use up to 40 Gbps. However, it requires dedicated electronic circuitry for every bit rate to be supported, and has a high-speed signal limit due to a limit in the operation speed of electronics. The above-mentioned technology (2) using electrical signals as driving signals or control signals has the same problem in terms of operation speed.

The above-mentioned technology (3) does not have a limited operation speed because it does not employ electrical signals, however adoption of high-speed signals more than 160 Gbps leads to issues such as losses of 10-30 dB on switching and a narrow range of wavelengths that can be switched. Decrease in switching efficiency causes a decrease in the optical S/N ratio and degradation of signal quality. Further, narrow operating bandwidth requires optical switches for each signal wavelength.

SUMMARY OF THE INVENTION

It is an object of the present invention to provide a technique for switching optical signal in high switching efficiency.

The optical switch of the present invention comprises a first polarization controller controlling a polarization direction of an optical signal; a nonlinear optical medium to which the optical signal output from the first polarization controller being input; and a polarizer, placed at the output side of the nonlinear optical medium, having a main polarization axis orthogonal to a polarization direction of the optical signal output from the nonlinear optical medium. The optical signal is amplified with parametric amplification by a control pulse around a polarization direction of the control pulse in said nonlinear optical medium. The optical signal may be amplified with nonlinear amplification by a control pulse around a polarization direction of the control pulse in said nonlinear optical medium.

In the absence of the control pulse, the polarization direction of the optical signal does not change in the nonlinear optical medium. The optical signal is completely blocked by the polarizer. Conversely, in the presence of the control pulse, the polarization direction of the optical signal is rotated by cross phase modulation and the signal is amplified by optical parametric amplification caused by four-wave mixing in the nonlinear optical medium. Consequently, a component of the optical signal passes through the polarizer.

In the optical switch, the angle between the polarization directions of the optical signal and the control pulse can be set to about 45 degrees. This configuration enables an effective polarization rotation and minimization of loss in the polarizer.

Optical fiber can be used as the nonlinear optical medium, its average zero dispersion wavelength can be the same or almost same as a wavelength of the control pulse. According to this configuration, a high efficiency of optical parametric amplification caused by four-wave mixing is achieved.

In addition, before the first polarization controller, a waveform shaper, which flattens the pulse peak of the optical signal, can be equipped. Alternatively, the pulse width of the control pulse can be made shorter than that of the optical signal. Introduction of these configurations allows regeneration of the signal timing by the control pulse used as a clock signal even if the optical signal fluctuates in time.

The optical switch of the present invention can amplify and switch not only intensity-modulated optical signal but also phase-modulated or frequency-modulated optical signal. The phase-modulated optical signal and frequency-modulated optical signal are preferably RZ signal.

If input optical signal is split into a pair of polarized signals which are orthogonal to each other, and the polarized signals are coupled after respectively switched by the optical switch of the present invention, there is no need to control the polarization of the input optical signal.

According to the present invention an optical switch for switching optical signal in high switching efficiency is implemented. Therefore, excellent optical S/N ratio can be achieved.

BRIEF DESCRIPTION OF THE DRAWINGS

FIG. 6A through FIG. 6C are diagrams explaining switching by an optical switch of the present invention;

FIG. 9A through FIG. 9C are diagrams explaining optical 2R regeneration shown in FIG. 8;

FIG. 11 is a diagram explaining the control pulse generated for optical 2R regeneration shown in FIG. 10;

FIG. 15A and FIG. 15B are diagrams showing improvement of extinction ratio;

FIG. 18 is a diagram showing a method of measurement of an object utilizing an optical pulse;

FIG. 21A and FIG. 21B are diagrams showing an example wavelength allocation of signal and control pulses;

FIG. 25A and FIG. 25B are diagrams describing an optical communication system, which uses a waveform monitoring device relating to the present invention;

FIG. 27 is a diagram showing an interferometer, which implements the present invention;

FIG. 29 is a diagram explaining QPSK;

FIG. 30A is an example of a demodulator for demodulating a DPSK optical signal;

FIG. 30B is an example of a demodulator for demodulating a frequency-modulated optical signal;

FIGS. 31A and 31B are examples of an optical switch for switching the modulated optical signal;

FIG. 32 is another example of an optical switch for switching the modulated optical signal;

FIG. 33 is an example of an optical DEMUX using an optical switch of the present invention;

FIG. 34A is an example of switching after phase-modulated optical signal is converted into intensity-modulated optical signal;

FIG. 34B is an example of switching after frequency-modulated optical signal is converted into intensity-modulated optical signal;

FIG. 35 is an example of optical sampling oscilloscope for monitoring a phase-modulated optical signal or a frequency-modulated optical signal;

FIG. 37A and FIG. 37B are diagrams explaining operation of the optical switch shown in FIG. 36;

FIG. 41 is a diagram showing switching gain when the peak power of the control pulse is changed;

FIG. 44A through FIG. 44E are diagrams showing eye patterns of optically sampled signals utilizing the optical switch of the present invention.

DESCRIPTION OF THE PREFERRED EMBODIMENTS

The explanation of the preferred embodiments of the present invention with reference to drawings is provided below.

Figure 1:
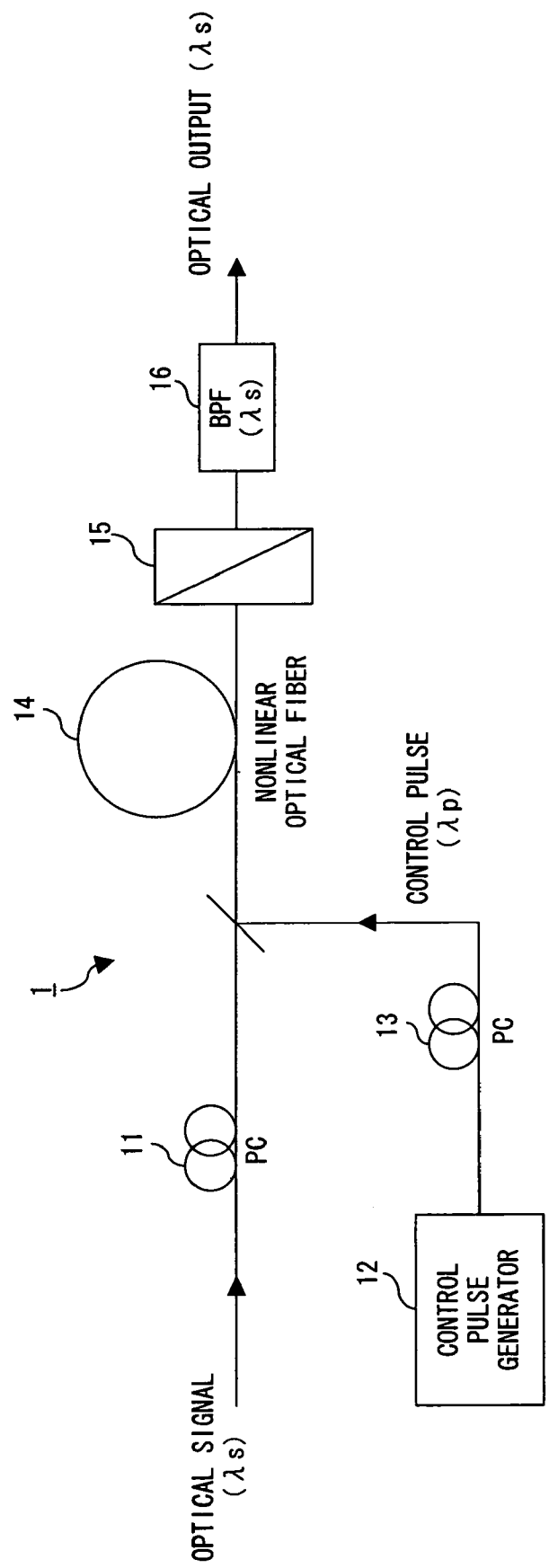
FIG. 1 is a diagram describing a basic configuration of an optical switch of the present invention.

FIG. 1 is a diagram describing a basic configuration of an optical switch 1 of the present invention. In FIG. 1, a polarization controller (PC) 11 controls the polarization direction of the input optical signal. That is, the optical signal is polarized to a designated direction by the polarization controller 11. In the present case, the optical signal is generated using light having a wavelength of "$\lambda s$". The bit rate of the signal is not specifically defined.

A control pulse generator 12 produces a control pulse using optical control beam (control light), which has a wavelength of "$\lambda p$". The wavelength of the signal $\lambda s$ and that of the control pulse $\lambda p$ is preferably separated, however the separation is not specifically defined. Also, the wavelength $\lambda p$ can be either longer or shorter than the wavelength $\lambda s$.

Figure 2:
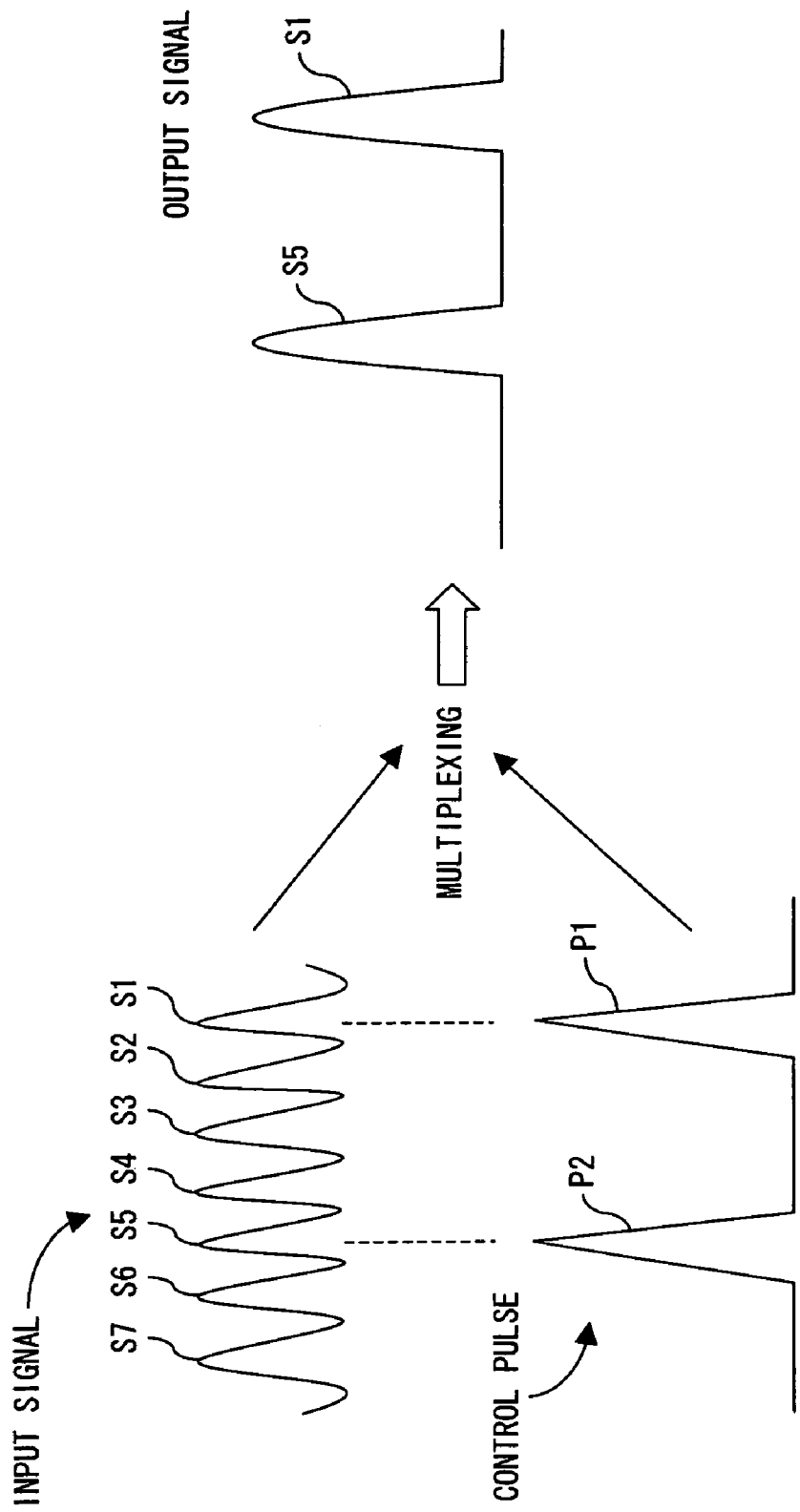
FIG. 2 is a diagram showing an example of a signal and control pulses.

FIG. 2 is a diagram showing an example of a signal pulse and control pulses. In this example, the signal carries signal pulses S1, S2, S3 . . . . Control pulses are generated in synchronization with the signal pulses carried by the signal. In the example shown in FIG. 2, bit rate of the signal is as four times higher as the frequency of the control pulses. The signal pulse S1 and the control pulse P1 coincide, and the signal pulse S5 and control pulse P2 also coincide.

Figure 3:
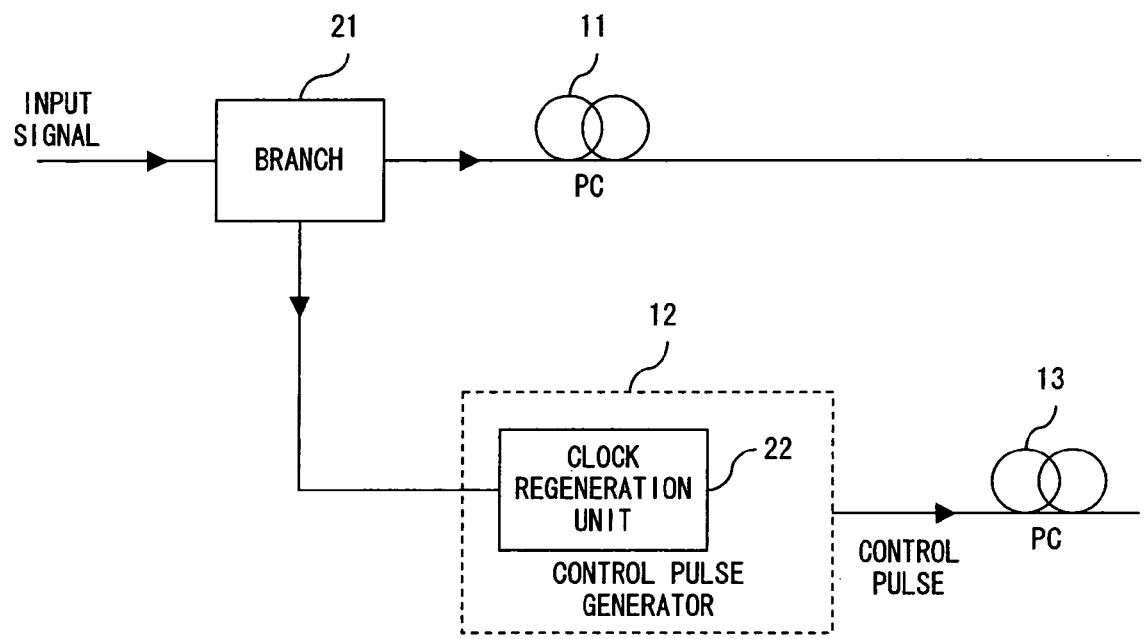
FIG. 3 is a diagram depicting a method of generating a control pulse.

In order to synchronize the control pulses with signal pulses carried by the signal, a configuration such as that shown in FIG. 3 may be employed, though the present invention is not limited to this configuration. An optical branch device 21 branches a part of light carrying the signal and guides the fraction of light to a control pulse generator 12. The larger fraction of the light is guided to the polarization controller 11. The control pulse generator 12 comprises a clock regeneration unit 22, and regenerates clock synchronized with the input signal. The clock regeneration unit 22 may comprise a PLL circuit. The clock pulses can be recovered by full optical process from the input signal, and pulse width of the regenerated clock signal can be widened. Such method of clock regeneration by full optical process from optical signals is described in Japanese published unexamined application No. 2001-249371, for example. The control pulse generator 12 generates control pulses utilizing the regenerated clock. At the time of generation, if a pulse is generated every four clock cycles, control pulse P1 and P2 described in FIG. 2 are obtained.

A polarization controller 13 controls the polarization direction of the control pulse. The polarization direction of the control pulse is aligned to maintain a designated angle to the polarization angle of the signal. It is desirable to set the polarization angle of the control pulse so that the angle between the polarization angle of the signal and that of the control pulse is between 40 and 50 degrees (for example, 45 degree).

Signal and control pulses are multiplexed and coupled to a nonlinear optical fiber 14. In the nonlinear optical fiber 14, the polarization direction of the signal is rotated by cross phase modulation and the signal is amplified by optical parametric amplification caused by four-wave mixing (FWM). In other words, the signal is amplified mainly in polarization direction of the control pulse by the optical parametric amplification caused by the four-wave mixing, as described in FIG. 6C. Here, rotation of polarization and optical parametric amplification are not applied to all part of the signal. They are applied only a time period during which the signal overlaps or coincides with the control pulse. In the example in FIG. 2, rotation of the polarization and optical parametric amplification are applied only to signal pulses S1 and S5, and the polarization directions of signal pulses S2, S3, S4, S6, and S7 remain unchanged.

The above nonlinear optical fiber is employed as an optical parametric amplifier in which wavelength $\lambda s$ of signal and wavelength $\lambda p$ of control pulse are different. Here, the difference between the wavelengths $\lambda s$ and $\lambda p$ can be set in such a way that optical amplification by nonlinear effect such as Raman amplification and Brillouin amplification can be used.

In this configuration, Raman amplification or Brillouin amplification can be implemented. In addition, if n kinds of wavelength $\lambda p2$-$\lambda pn$, which are sequentially different from $\lambda p$ little by little, are provided, Raman amplification can be performed over a broad band.

A polarizer 15 can be a polarization beam splitter (PBS), a birefringent optical crystal, etc., and it passes the component that consists of the polarization along the main axis. The main axis of the polarizer 15 is aligned so as to be perpendicular to polarization angle of the signal. That is, the polarization controller 11 controls the polarization direction of the signal so that the polarization direction of the signal is orthogonal to the main axis of the polarizer 15.

An optical band-pass filter (BPF) 16 passes only signals of wavelength $\lambda s$ and blocks other wavelengths. Therefore, the control source that has a wavelength of $\lambda p$ is blocked. Also, any amplified spontaneous emission (ASE) generated in an optical amplifier (not shown in figures) with wavelengths outside the pass band of the BPF are removed. If the wavelength of the control pulse is significantly different from that of the signal, or if the power of the signal passing through the polarizer 15 is sufficiently larger than that of any ASE, the optical BPF 16 is not needed.

As explained above, the polarization angle of the signal is orthogonal to the main axis of the polarizer 15. In the absence of the control pulse, the polarization angle of the signal is not changed by the nonlinear optical fiber, therefore the signal is completely blocked by the polarizer 15. In the example shown in FIG. 2, signal pulses S2, S3, S4, S6, and S7 are blocked by the polarizer 15. Conversely, when both signal and control pulses are concurrently present in the nonlinear optical fiber 14, the polarization state of the signal is changed by cross phase modulation. In other words, the signal is amplified by the optical parametric amplification mainly in the polarization direction of the control pulse in the nonlinear optical fiber 14. Then, signal output from the nonlinear optical fiber 14 contains an element with a polarization direction the same as that of the main axis of the polarizer 15. As a result, a part of the signal is transmitted by the polarizer 15. In the example shown in FIG. 2, signal pulses S1 and S5 are transmitted by the polarizer 15.

The optical switch 1 allows selective extraction and output of the part of the signal, which coincides (overlap in time domain) with the control pulse. During this, wavelength of the output signal is the same as that of the input signal.

An explanation of the principle of operation for the optical switch of the present invention is given below with details. The configuration and operation of the optical switch of the present invention and operation of an optical Kerr switch utilizing the optical Kerr effect have in common the principle that an element is blocked in the absence of a control pulse (an element with zero switch transmission). Details of the operation of the optical Kerr switch are described in the following document.

"NONLINEAR FIBER OPTICS" page 180-184, Govind P. Agrawal, ACADEMIC PRESS, INC.

Conventional optical Kerr switches comprise a nonlinear optical fiber and polarizer similarly to the optical switch 1 shown in FIG. 1. Signal and control pulses are entered to the nonlinear optical fiber. The polarization angle of the signal is aligned so as to be orthogonal to the main axis of the polarizer.

Figure 4A:
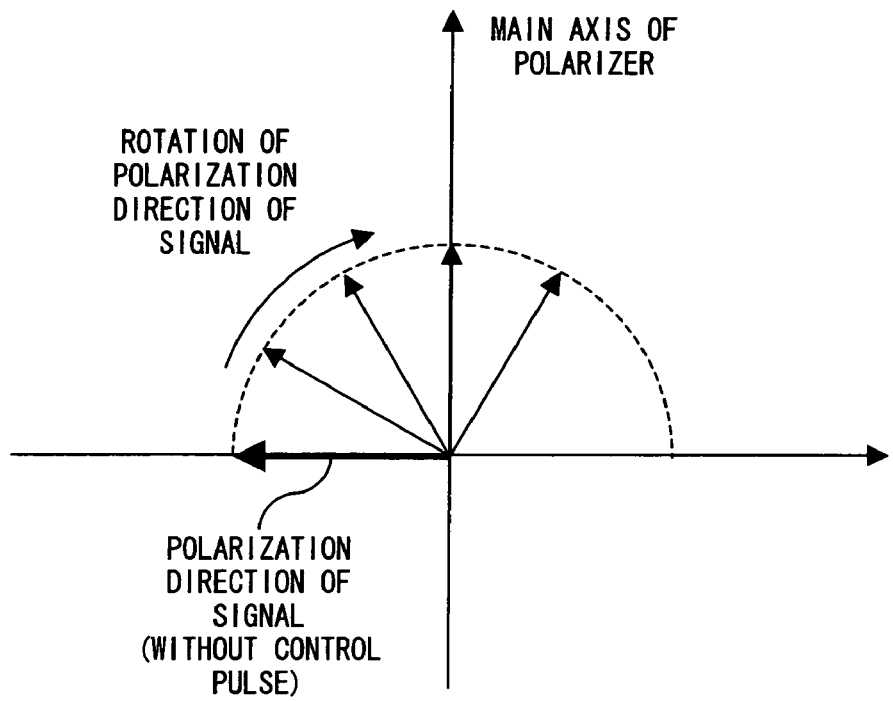
FIGS. 4A and 4B are diagrams explaining the operating principle of the optical Kerr switch.

When the power of the control pulse is zero in the optical Kerr switch, as shown in FIG. 4A, the polarization direction of the signal is not rotated by the nonlinear optical fiber. In other words, the polarization direction of the output signal from the nonlinear optical fiber is orthogonal to the main axis of the polarizer. In such a case, no signal is transmitted by the polarizer (the signal is completely blocked by the polarizer).

Figure 4B:
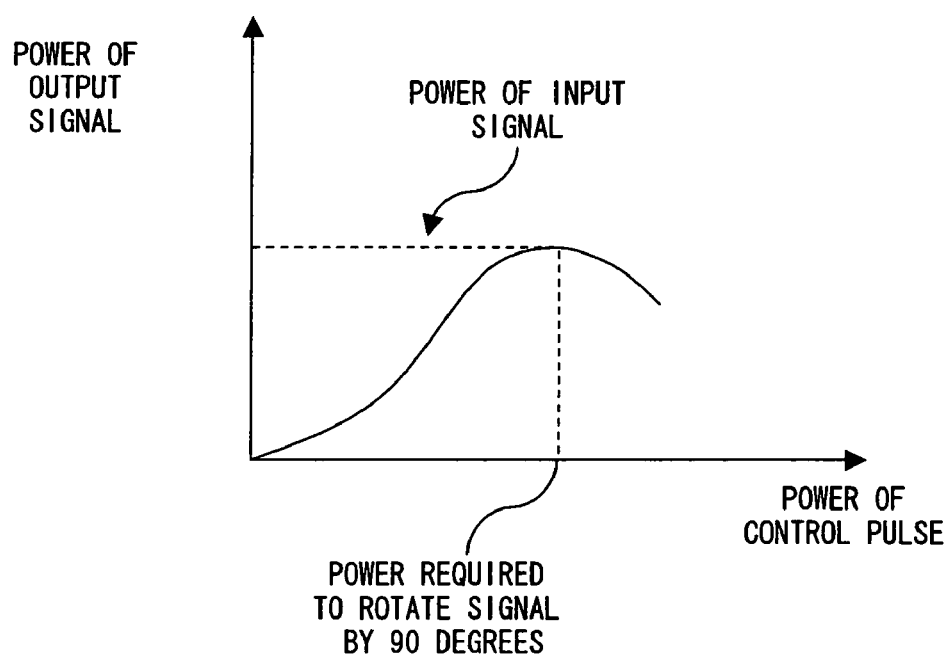
Figure 5:
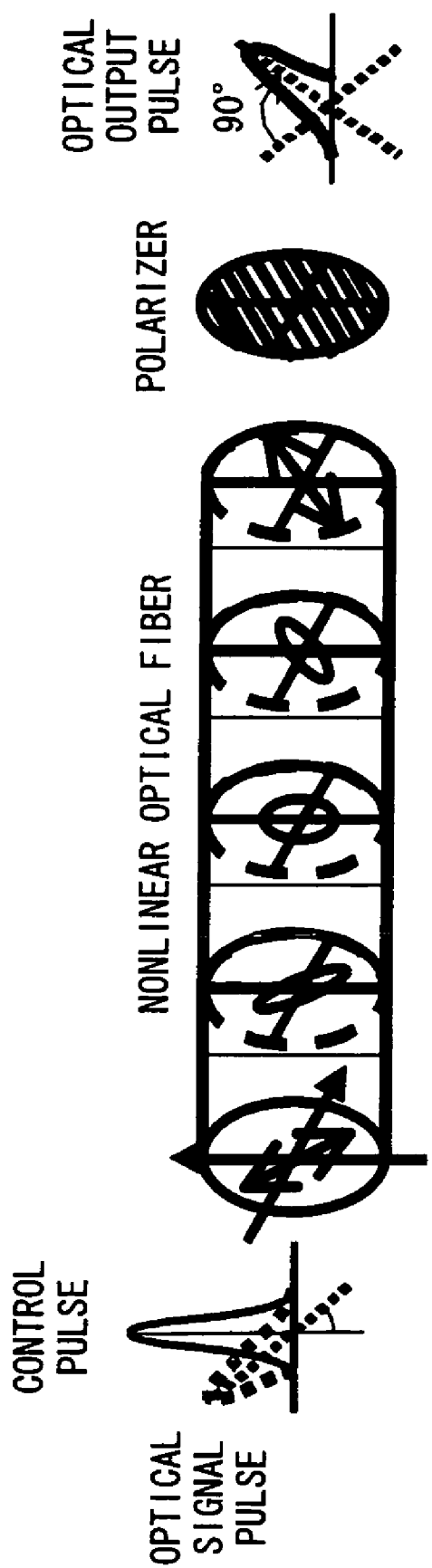
FIG. 5 is a schematic diagram showing the operation of an optical Kerr switch.

When the power of the control pulse is increased under the condition that the signal and control pulse overlap in time, the phase of the signal is shifted by cross phase modulation proportional to the intensity of the control pulse, and the polarization state of the signal is changed as described in FIG. 4A. That is, as the signal is transmitted in the nonlinear optical fiber, as shown in FIG. 5, the polarization state changes and the direction of the polarization main axis of the signal rotates. Such a phenomenon enables a part of the signal to pass through the polarizer, as described in FIG. 4B. The power of the control signal is adjusted so that the change in phase of the signal at its input into the nonlinear optical fiber is π. Then polarization direction of the signal is rotated by 90 degrees from the initial state. In other words, a linear polarization rotated by 90 degrees from the polarization direction of the input optical signal is acquired. At that time, the polarization direction of the signal and main axis of the polarizer coincide, and virtually 100 percent of the signal passes through the polarizer. At this point, the power of the output signal is at its maximum, as indicated in the graph in FIG. 4B. Further increase in the power of the control pulse results in further rotation of the polarization angle of the signal, as well as reduced output power of the signal. That is, as shown in FIG. 5, polarization state of the signal further changes, and the polarization main axis of the signal further rotates. In optical Kerr switches, the output power of the signal changes with the control pulse power with a cosine-curve-like dependency.

Therefore, in an optical Kerr switch, in general, control pulses for signal extraction are generated so that there is sufficient power to rotate the polarization direction of the signal by 90 degrees in the nonlinear optical fiber. However, optical Kerr switches, as is apparent from the operating principle mentioned above, cannot produce output powers greater than the input power of the signal. That is, there is a limit in the improvement of switching efficiency. For this reason, optical Kerr switches are often used with an optical amplifier separately. Moreover, as is apparent from the operating principle described above, the conventional optical Kerr switch requires high-precision setting of optical power of control beam to generate the control pulse because optimal switching operation can be carried out only when the nonlinear phase shift become π.

FIG. 5 is a diagram schematically showing the operation of an optical Kerr switch. The polarization direction of the signal is rotated by cross phase modulation with the control pulse in the nonlinear optical fiber. The power of the control pulse is set so that the polarization direction of the signal is rotated by exactly 90 degrees in the nonlinear optical fiber. By so doing, signals, which overlap with the control pulse in time pass through the polarizer most efficiently.

The optical switch of the present invention obtains high switching efficiency by the effective utilization of the above-explained polarization rotation by cross phase modulation and by the use of optical parametric amplification generated by four-wave mixing in the nonlinear optical fiber 14 shown in FIG. 1 in which the control pulse is used as pump light. Unlike the conventional optical Kerr switch, pinpoint power control of the control pulse is not required in the present invention. Here, four-wave mixing is the phenomenon in the nonlinear medium (the nonlinear optical fiber 14 of the present case) hypothetically absorbing two photons through its nonlinear polarization, and releasing two photons to conserve energy. When the nonlinear medium supplied with a high power pump light whose wavelength is different from the signal wavelength, the signal is amplified (parametric amplification) by the released photon mentioned above.

The optical switch of the present invention assures dramatic improvement of switching efficiency by utilizing parametric amplification. Here, switching efficiency is defined as the ratio of power of the output signal to the power of the input signal. The present invention enables a dramatic increase in output power of the signal after switching, and produces high-performance optical switch with extremely low degradation in the optical S/N ratio.

Suppose the length of the nonlinear optical fiber 14 used in optical switch 1 is "L" and its loss is "α". Also, the input and output signals of the nonlinear optical fiber 14 are "Es1" and "Es2", respectively. Under the ideal phase-matching condition for four-wave mixing, switching efficiency ηs can be approximated by the following equation (1).

$$\eta s \equiv |Es2|^2/|Es1|^2 = \exp(-\alpha L) \cdot G \quad (1)$$

where "G" is the optical parametric gain, and is approximated by the following equation (2).

$$G = 1 + \{\gamma P_p L(L)\}^2 \quad (2)$$

Where "$P_p$" is the peak power of the input control pulse in the nonlinear optical fiber 14. "L(L)" is the nonlinear effective interaction length expressed as "$\{1-\exp(-\alpha L)\}/\alpha$". The third-order nonlinear coefficient "γ" is expressed as "$\omega n_2/cA_{eff}$", where "c", "ω" "$n_2$" and "$A_{eff}$" represent the "speed of light", the "optical angular frequency", the "nonlinear refractive index" and the "effective cross-sectional area", respectively.

The above equations (1) and (2) reveal that the switching efficiency of a signal in the nonlinear optical fiber 14 increases as "$\gamma P_p L(L)$" increases. Also, if the properties and length of the nonlinear optical fiber 14 are determined, "γ" and "L(L)" become fixed values. Then, the switching efficiency increases with increase in "$P_p$". That is, increase in peak power of the control pulse results in higher efficiency of signal switching, caused by optical parametric amplification.

In the optical switch 1, the angle between the polarization direction of the signal and the polarization direction of the control pulse is set to about 45 degrees. The polarization directions of the signal and the control pulse are set by polarization controllers 11 and 13, respectively.

Generally, four-wave mixing, or optical parametric amplification, has its maximum efficiency when the polarization directions of interacting waves coincide with each other. Conversely, when the polarization directions are orthogonal to each other, four-wave mixing is hardly observed. Therefore, when the angle between the polarization directions of the signal and the control pulse is set to about 45 degrees, the efficiency is much lower compared with the efficiency when the polarization directions are coincident with each other. However, polarization component in the same direction as the control pulse is amplified by the optical parametric amplification in the polarization direction, which is the same as the direction of the control pulse, and thus, the input optical signal is optically switched as the signal component in the polarization direction.

Meanwhile, as explained with reference to FIG. 4A, when the power of the control pulse is relatively low, the polarization direction of the signal starts to rotate in accordance with the power of the control pulse by cross phase modulation. The components obtained by the optical parametric gain increases as polarization rotation of the signal approaches 45 degrees. When the degree of rotation reaches 45 degrees, the polarization direction of the signal and the control pulse coincide, and the maximum optical parametric gain is obtained. In such a way, the change in the polarization state of the signal by the optical cross phase modulation depends on the power of the control pulse; however the optical cross phase modulation used in the conventional optical Kerr switch does not impede the effect of the present invention.

Here, signal amplification by four-wave mixing, that is optical parametric amplification, in nonlinear optical fiber can be considered as a phenomenon in which an element with the same wavelength as the signal is newly generated by control pulses supplied as pump energy. Also, control pulses with very high power are supplied to the nonlinear optical fiber 14 in optical switch 1 of the present invention. For that reason, a large part of the output signal from the nonlinear optical fiber 14 is an element newly generated by four-wave mixing. However, the state of the polarization (SOP) of this newly generated signal element is less affected by cross phase modulation, and therefore its polarization direction is not changed by cross phase modulation. In other words, polarization rotation does not occur. Therefore, in the region where the power of the control pulse is very high, the polarization direction of the signal amplified by optical parametric amplification in the nonlinear optical fiber 14 is fixed at almost the same direction as the polarization direction of the control pulse. Consequently, the signal switched by the nonlinear optical fiber of the present invention is output from the nonlinear optical fiber as a signal polarized in the direction approximately coincided with the polarization direction of the control pulse (or around the polarization direction of the control pulse). This switching is significantly different from the switching mechanism of the conventional optical Kerr switch.

FIG. 6A through FIG. 6C are diagrams explaining switching by the optical switch of the present invention. Direction and length of the arrows representing signal in FIG. 6A and FIG. 6B express polarization angle and amplitude of the signal. The polarization direction of the signal is orthogonal to the main axis of the polarizer 15 as shown in FIG. 6A. FIG. 6C schematically describes the switching operation by the optical switch of the present invention.

In the present invention, the signal is output as a linear polarization in a direction around polarization direction of the control pulse at the output terminal of the nonlinear optical fiber by the optical parametric amplification by the control pulse.

The optical parametric amplification and cross phase modulation do not occur in the nonlinear optical fiber 14 in the absence of control pulses. For that reason, the polarization direction of the output signal from the nonlinear optical fiber 14 is the same as that of the input signal. That is, the polarization angle of the output signal is orthogonal to the main axis of the polarizer 15. In such a case, the signal is completely blocked by the polarizer 15.

In the presence of a control pulse, as explained with reference to FIG. 4A, the signal is amplified by the optical parametric amplification and the polarization direction of the signal is rotated as a result of cross phase modulation. However, the power of the control pulse used in the optical switch 1 of the present invention is very high (peak power of the control pulse is several watts or more, for example) For that reason, the signal is amplified by optical parametric amplification caused by four-wave mixing. The efficiency of this optical parametric amplification is highest when the polarization direction of the signal and control pulse are coincident. In addition, the SOP of signal element, newly generated by four-wave mixing, is not affected by cross phase modulation, and therefore its polarization direction does not change.

Therefore, the polarization direction of the signal amplified by optical parametric amplification in the nonlinear optical fiber 14 is fixed at nearly the same direction as a polarization direction of the control pulse, as described in FIG. 6B. Unlike the conventional optical Kerr switch, the polarization state of the signal does not keep rotating.

Here, the angle between the polarization direction of the signal at input of the nonlinear optical fiber 14 and the polarization direction of the control pulse is set to about 45 degrees. In addition, the angle between the polarization direction of the output signal and the main axis of the polarizer 15 is also 45 degrees. Then, about 50 percent ($=(1/\sqrt{2})^2$) of the power of the output signal from the nonlinear optical fiber 14 passes through the polarizer 15.

In the optical switch 1 of the present invention, the power of the signal decreases by half when the signal passes through the polarizer 15. However, the power of the signal can be readily amplified to be able to sufficiently compensate for the decrease by the polarizer 15 by optical parametric amplification in the nonlinear optical fiber 14. Although the power of the output signal from the optical switch 1 is partially lost in the polarizer 15, it is still large compared with that of the input signal. Thus, switching efficiency is dramatically improved. Considering the fact that the maximum switching efficiency of the conventional optical Kerr switch is 1, switching efficiency of the present invention is a remarkable improved. The efficiency of the conventional four-wave mixing switch is $\{\gamma P_p L(L)\}^2$, and the efficiency of the optical switch of the present invention exceeds that of the conventional one. In addition to the efficiency improvement, the present invention differs in that there is no wavelength shift, and the conventional four-wave mixing switch does not provide this feature.

Figure 7:
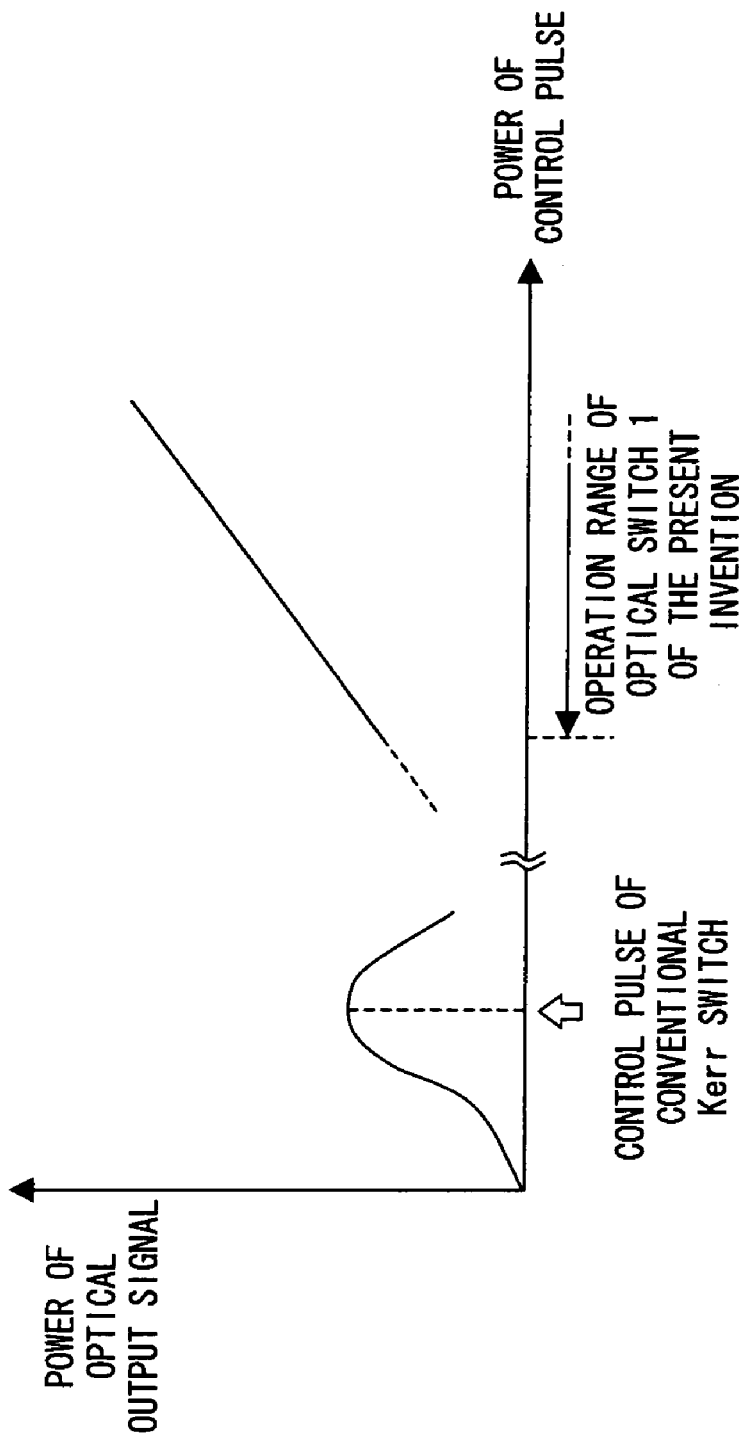
FIG. 7 is a diagram explaining the operating range of a conventional optical Kerr switch and the optical switch of the present invention.

FIG. 7 is a diagram explaining the operational range of the conventional optical Kerr switch and the optical switch of the present invention. The conventional Kerr switch requires only low power control pulses to achieve rotation of the polarization direction of the input signal by 90 degrees. For that reason, the polarization state of the signal changes with the increase in the power of the control pulse without optical parametric amplification (or with very small optical parametric amplification), and the polarization state and the direction of the polarization main axis of the signal changes depending on the control pulse power. The maximum output signal power does not exceed that of the input signal. Therefore, switching efficiency of the conventional Kerr switch is less than 1.

Compared with the conventional Kerr switch, the optical switch 1 of the present invention uses control pulses of much higher power. In the nonlinear optical fiber 14, optical parametric amplification by four-wave mixing occurs in the polarization direction of the control pulse. That is, the polarization of the signal starts to rotate by cross phase modulation in the range where control pulse power is relatively small. As the angle of the polarization of the signal gradually approaches that of the control pulse, optical parametric amplification occurs by four-wave mixing. As the polarization angle of the signal is fixed at the angle of the polarization angle of the control pulse, the output signal power increases approximately in proportion to the square of the power of the control pulse. Thus, the power of the output signal exceeds the power of the input signal. The proper setting of the peak power of the control pulse can produce switching efficiencies greater than 1. In other words, the optical switch 1 of the present invention is an optical switch comprising the function of an optical amplifier. Among optical switches, which do not involve wavelength shift, an optical switch with optical amplifier functionality does not exist in the conventional technology.

The polarization state of the signal in its initial setting is orthogonal to a main axis direction of the polarizer 15 in the optical switch 1 of the present invention. For that reason, the optical switch 1 can control the OFF signal (zero level) with high extinction ratio. This cannot be achieved with a conventional switch without wavelength shift. More specifically, the optical switch 1 produces output of a higher-level signal than that of the input signal due to the optical parametric gain in the case of the ON signal (1 level), and constantly performs good control by utilizing the high extinction ratio of a polarizer in the case of the OFF signal (zero level). Thus, signal has high extinction and S/N ratios (or high quality signal regeneration) after switching.

Moreover, the optical switch 1 of the present invention uses optical Kerr (third-order nonlinear optical) effect including cross phase modulation and four-wave mixing in nonlinear optical fiber. These nonlinear effects are extremely high-speed phenomena, which comprise response speeds of femtosecond order. Therefore, the present invention has a feature of transparent switching, which is independent of bit rate and pulse shape. Also, the present invention can be adopted for use with ultra high-speed signals such as terra bps level signals.

Additionally, in the embodiment above, the angle between the polarization of the signal and that of the control pulse is set to about 45 degrees. This angle can be varied according to a number of conditions in order to obtain the highest efficiency. However, experiments and simulations proved that the angle should be between about 40 degrees and about 50 degrees at the input port of the nonlinear optical fiber. When the angle is too large, polarization rotation of the signal by cross phase modulation and optical parametric amplification by four-wave mixing is not likely to occur, not a favorable outcome. When the angle is too small, loss at polarizer 15 is increased, also not a favorable outcome.

Next is an explanation of an embodiment of the optical switch 1.

Figure 8:
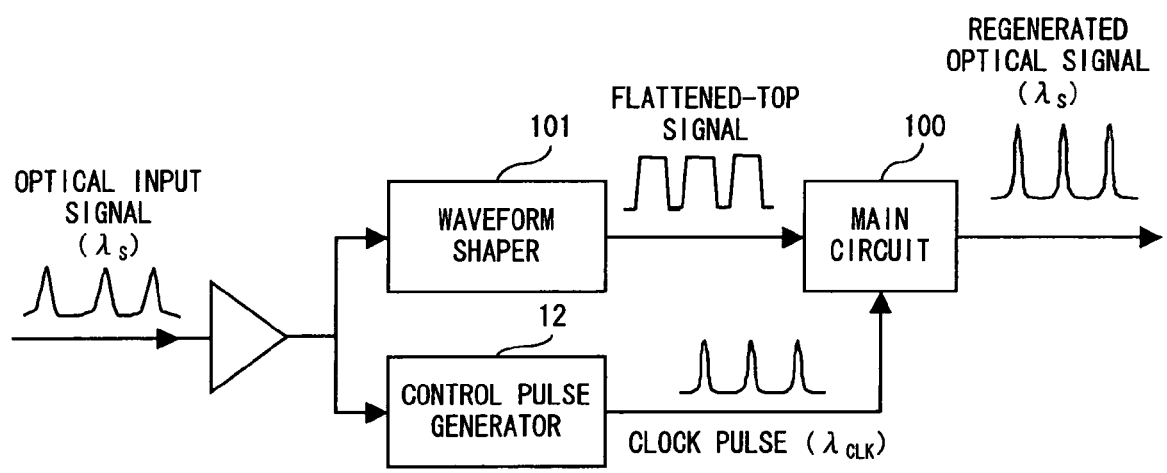
FIG. 8 is an embodiment performing optical 2R regeneration.

FIG. 8 is an embodiment performing optical 2R regeneration. Here, "optical 2R" indicates re-timing and re-amplification.

In FIG. 8, main circuit 100 comprises the polarization controllers 11 and 13, the nonlinear optical fiber 14, the polarizer 15 and the optical band-pass filter (BPS) 16, as described in FIG. 1. The control pulse generator 12 comprises the clock regeneration unit 22 shown in FIG. 3, and generates control pulses by using a clock regenerated from the input signal.

The input signal is branched and provided to a waveform shaper 101 and the control pulse generator 12. The waveform shaper 101 converts the waveform of the signal shown in FIG. 9A into an optical pulse with its peaks flattened as shown in FIG. 9B. The optical pulse is sent to the main circuit 100. The control pulse generator 12 generates a control pulse with a reference frequency corresponding to the signal bit rate (instead of reference frequency, N×RF or RF/N can be used, where RF is reference frequency and N is a positive integer). The main circuit 100 regenerates signals (optical 2R regeneration) from the input signal with its waveform shaped by waveform shaper 101 utilizing this control pulse.

When the signal bit rate is high (160 Gbps), timing fluctuation of data pulses, or jitter, occurs due to the influence of polarization dispersion, noise added by the optical amplifiers, etc. In the example shown in FIG. 9A, cycle T1, T2 and T3 differs from each other. However, in 2R regeneration described in FIG. 8, as long as the jitter is within the range of the flattened-top domain of the signal pulse, the jitter is minimized by regeneration using the control pulse. That is to say, cycle T1, T2 and T3 become identical, as shown in FIG. 9C. Also, optical parametric amplification in the main circuit 100 regenerates signal with large amplification. In addition, the frequency (wavelength) of the output signal from the main circuit 100 has the same frequency (wavelength) as that of the input signal.

For waveform shaping, the waveform shaper 101 can employ any method such as utilizing nonlinear chirp, a method utilizing the difference in group velocity dispersion between the two polarization principle axes in polarization maintaining fiber (see Non-patent Document 1 and 2), a method utilizing a gain saturation amplifier, a method utilizing an optical modulator, and a method of optical modulation using signal processing after O/E conversion of the signal.

The optical 2R regeneration, described in FIG. 8, which utilizes the optical switch of the present invention, can eliminate the need for polarization dispersion compensators in receivers because fluctuations in time are minimized.

Figure 10:
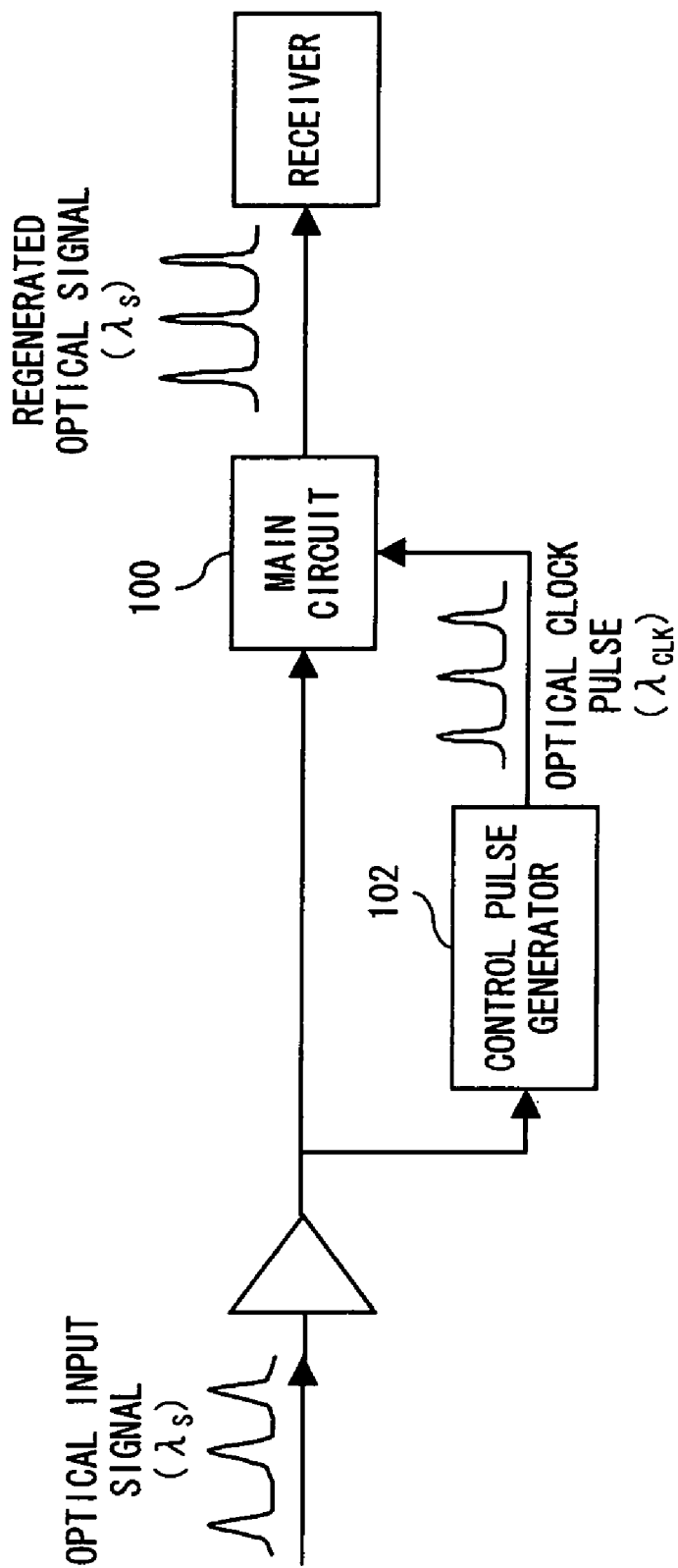
FIG. 10 is a diagram showing another embodiment of optical 2R regeneration.

FIG. 10 is a diagram showing another embodiment of optical 2R regeneration. In FIG. 10, a control pulse generator 102 is fundamentally the same as control pulse generator 12 in FIG. 1 or FIG. 3. However, as shown in FIG. 11, the control pulse generator 102 generates control pulses with a very narrow pulse width. That is, the pulse width (full width at half maximum: FWHM) Wc of the control pulse generated by the control pulse generator 102 is narrower than the pulse width (FWHM) Ws of a signal pulse. The pulse width Ws indicates a width of a range which is not affected by jitter.

Optical 2R regeneration utilizing such control pulses allows the optical switch to minimize fluctuations in time such as those of FIG. 9A to 9C by employing the configuration explained with reference to FIG. 8. That is, fluctuations added to the signal in optical fiber transmission (caused by for example, polarization-mode dispersion) can be controlled. Therefore, by performing the above-mentioned optical 2R regeneration in a receiver or optical repeater, both reception and transmission characteristics are improved by controlling the polarization-mode dispersion without using complex devices, such as polarization-mode dispersion compensators.

It is also possible that an optical clock pulse, of a lower frequency than the bit rate of the signal, is generated by the control pulse generator 102 on generation of the control pulse, which has shorter time width than that of the signal pulse, and the control pulse with desired frequency is generated by optically time-division multiplexing (OTDM) of the optical clock pulses. For example, when the bit rate of the signal is 160 Gb/s, an optical clock pulse of 10 GHz or 40 GHz is generated. Then, the optical clock pulses are multiplexed and a control pulse of 160 GHz is generated.

Generation of pulses with very short pulse widths are achieved by methods such as utilizing mode-locked lasers, modulation utilizing regenerated optical clock signals in Electro-absorption modulators or $LiNbO_3$ intensity/phase modulators, pulse compression using optical fiber after linear chirp of a regenerated optical pulse, utilizing the adiabatic soliton compression effect, extraction of apart of the spectrum of a linear chirped optical pulse with an optical band pass filter, using an optical switch utilizing second and third-order nonlinear optical effects, and using interferometric optical switches.

Figure 12:
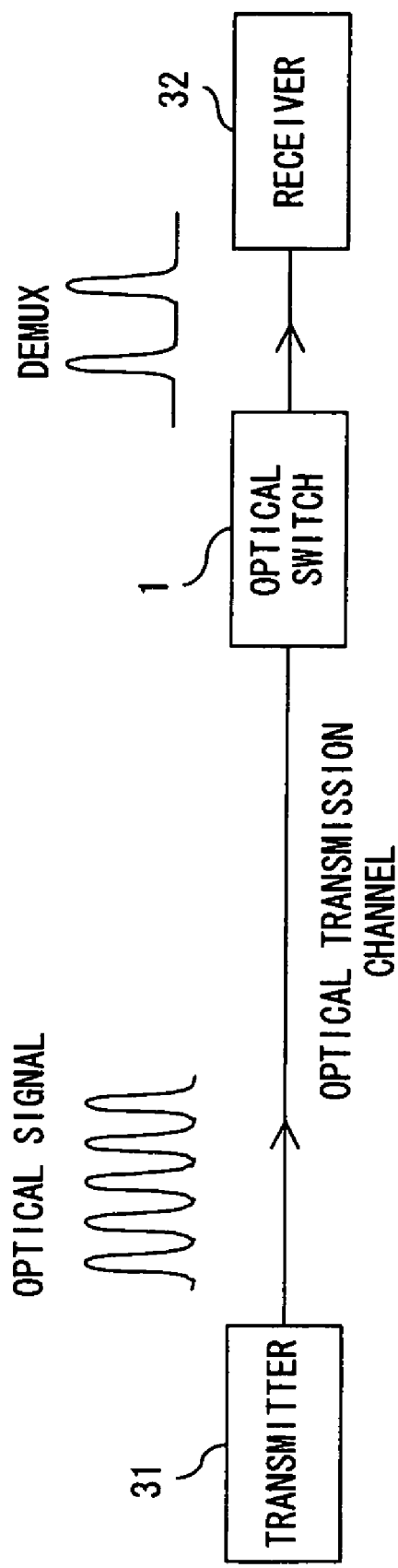
FIG. 12 is a diagram showing an embodiment with an optical switch being employed in a receiver of a communication system.

FIG. 12 is a diagram showing an embodiment with an optical switch being used to pre-process the signal to be input to a receiver of a communications system. In FIG. 12, the signal transmitted by a transmitter 31 feeds a plurality of channels, which are multiplexed by optical time-division multiplexing. If for example, the bit rate of the multiplexed signal is 160 Gbps, four 40 Gbps channels are multiplexed by optical time-division multiplexing. A receiver 32 receives the signal of a designated channel from the multiplexed signal.

The optical switch 1 extracts a channel, which the receiver 32 is designated to receive, from the channels propagated by the signal. In other words, the optical switch 1 operates as DEMUX device. For example, in FIG. 2, when signals S1, S2, S3 . . . are propagated by the input signal, and when signals S1, S5 . . . are designated to be received by the receiver 32, the optical switch 1 feeds control pulses P1, P2 . . . to the nonlinear optical fiber 14. As a result, signals S1, S5 . . . are extracted from the signal. At which time, the extracted signals are amplified by optical parametric amplification. During the time period in which control pulse is not generated, the output of the optical switch 1 is in the OFF state. Therefore, favorable extinction and S/N ratios can be achieved.

Figure 13A:
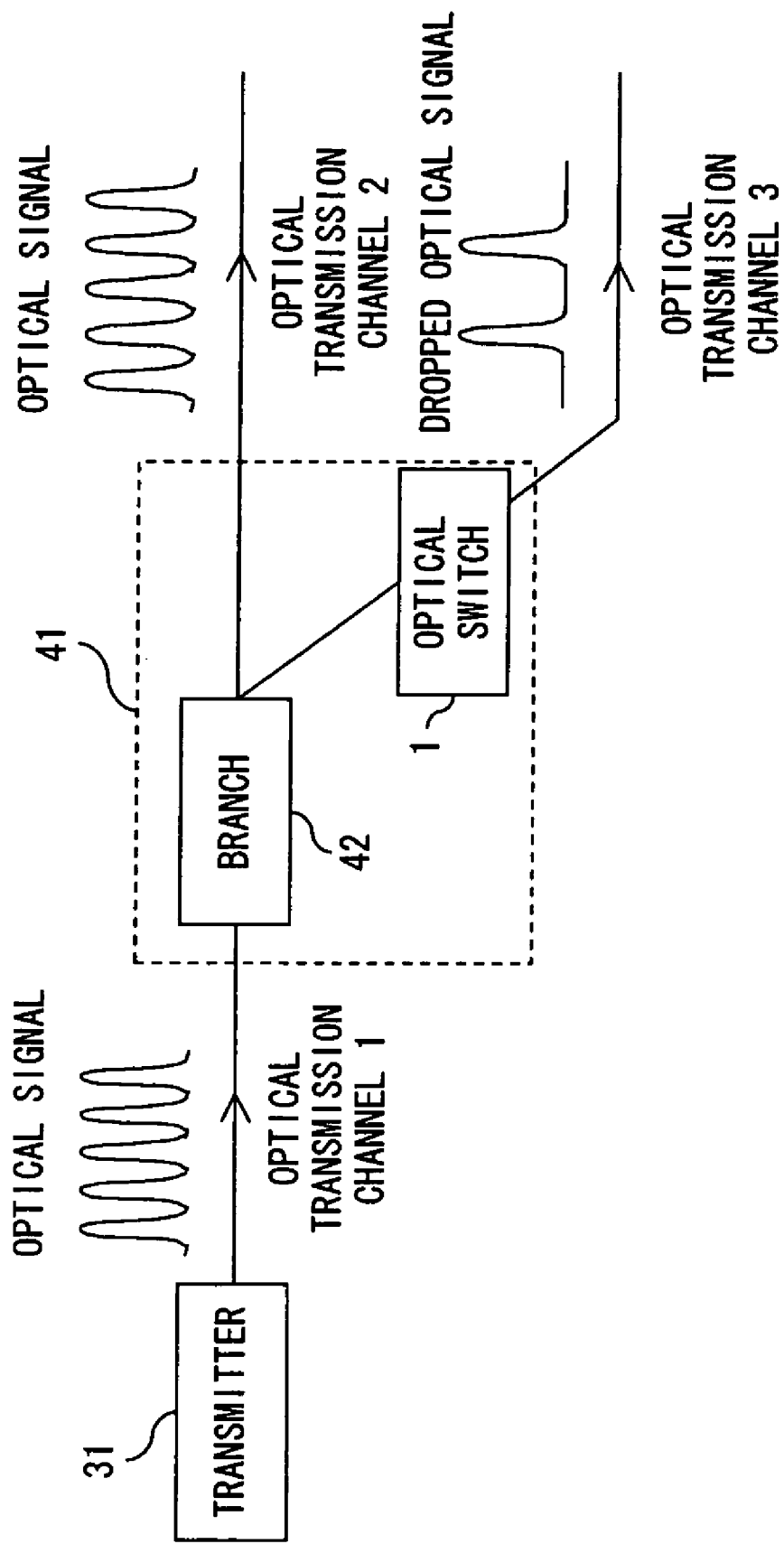
FIG. 13A and FIG. 13B are diagrams describing embodiments, which employ the optical switch in repeater node.

FIG. 13A is a diagram showing an embodiment with an optical switch being used in a repeater node of a communication system. In FIG. 13A, the signal transmitted by the transmitter 31 is similar to the signal of FIG. 12. Optical switch node 41 comprises an optical branch device 42, which splits the signal received via first optical transmission line. One of the branched signals is output to second optical transmission line, and the other branched signal is guided to the optical switch 1. The optical switch 1 extracts a designated channel of a plurality of channels propagated by the input signal, and guides the extracted signal to third optical transmission line. That is, the optical repeater node 41 drops a designated channel among a plurality of channels, which are multiplexed by optical time-division multiplexing.

Figure 13B:
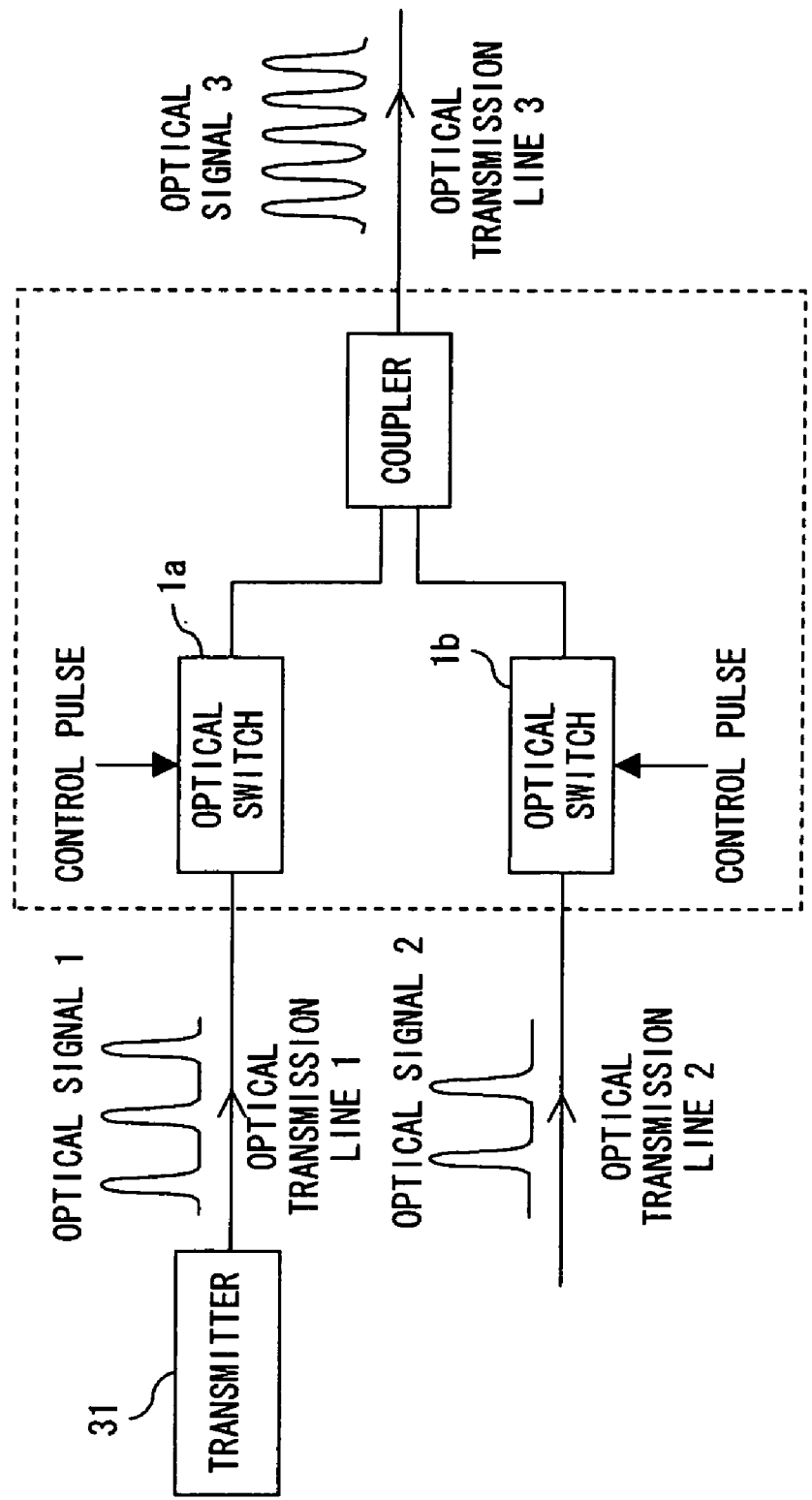

Similarly, the present invention can realize optical time-division multiplexing (OTDM) or time-domain optical ADD circuit of two channel. The configuration diagram of this application is shown in FIG. 13B.

First input signal, provided through first optical transmission line, is fed to optical switch 1a of the present invention. A control pulse with a rate, which is the same as the bit rate of the signal and is all "1" pattern (continuously non-zero pattern), is provided to the optical switch 1a. By so doing, the optical switch 1a amplifies all of the signal pulses in the first signal and outputs it. The second input signal, fed through second optical transmission line, is guided to optical switch 1b of the present invention. A control pulse to select a part or all of signal pulses transmitted by the second signal is fed to optical switch 1b. By so doing, the optical switch 1b selects, amplifies and outputs a part or all of the second signal.

The output of optical switches 1a and 1b are multiplexed by an optical coupler, and guided to third optical transmission line. By this process, third signal is produced by the multiplexing of the first signal and the second signal (or a part of the second signal). Additionally, a control system can be configured between optical switches (1a and 1b) and the optical coupler to match the phases of the first and second signals.

Figure 14:
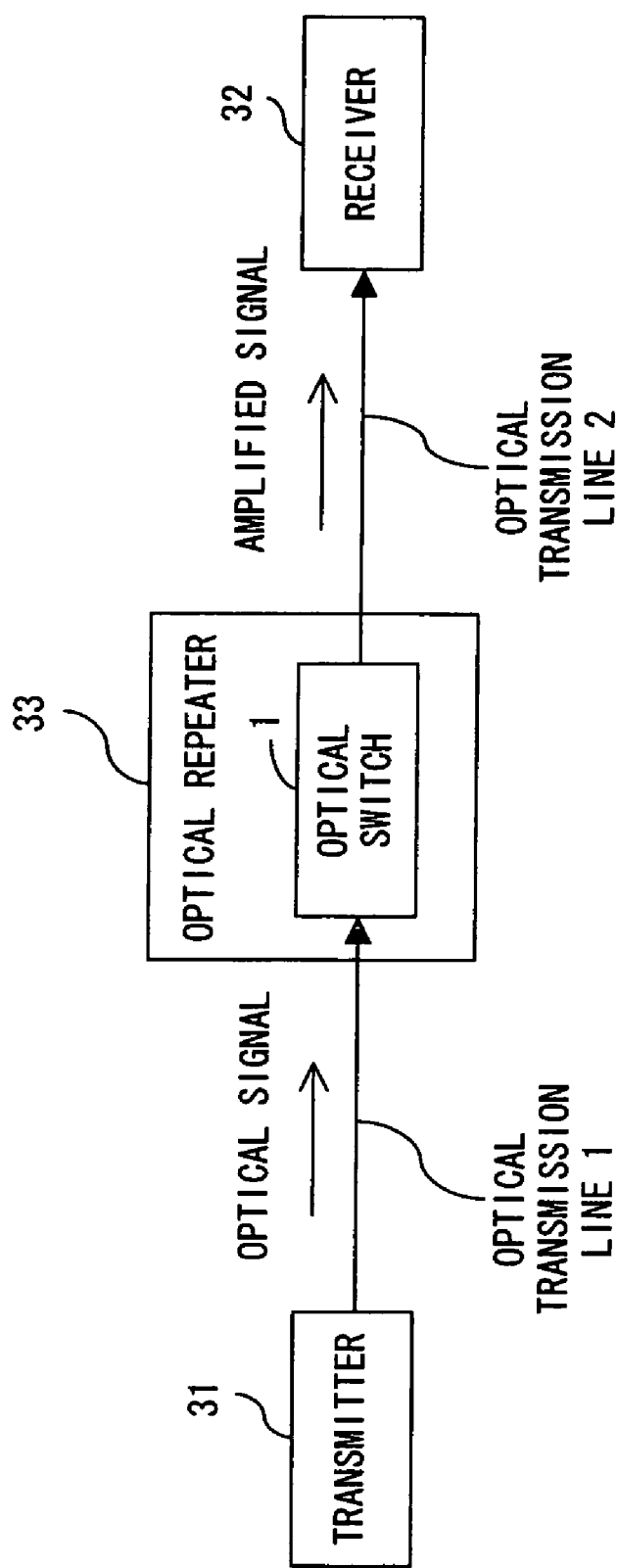
FIG. 14 is a diagram describing an optical communication system, which employs an optical switch of the present invention in an optical repeater.
Figure 16:
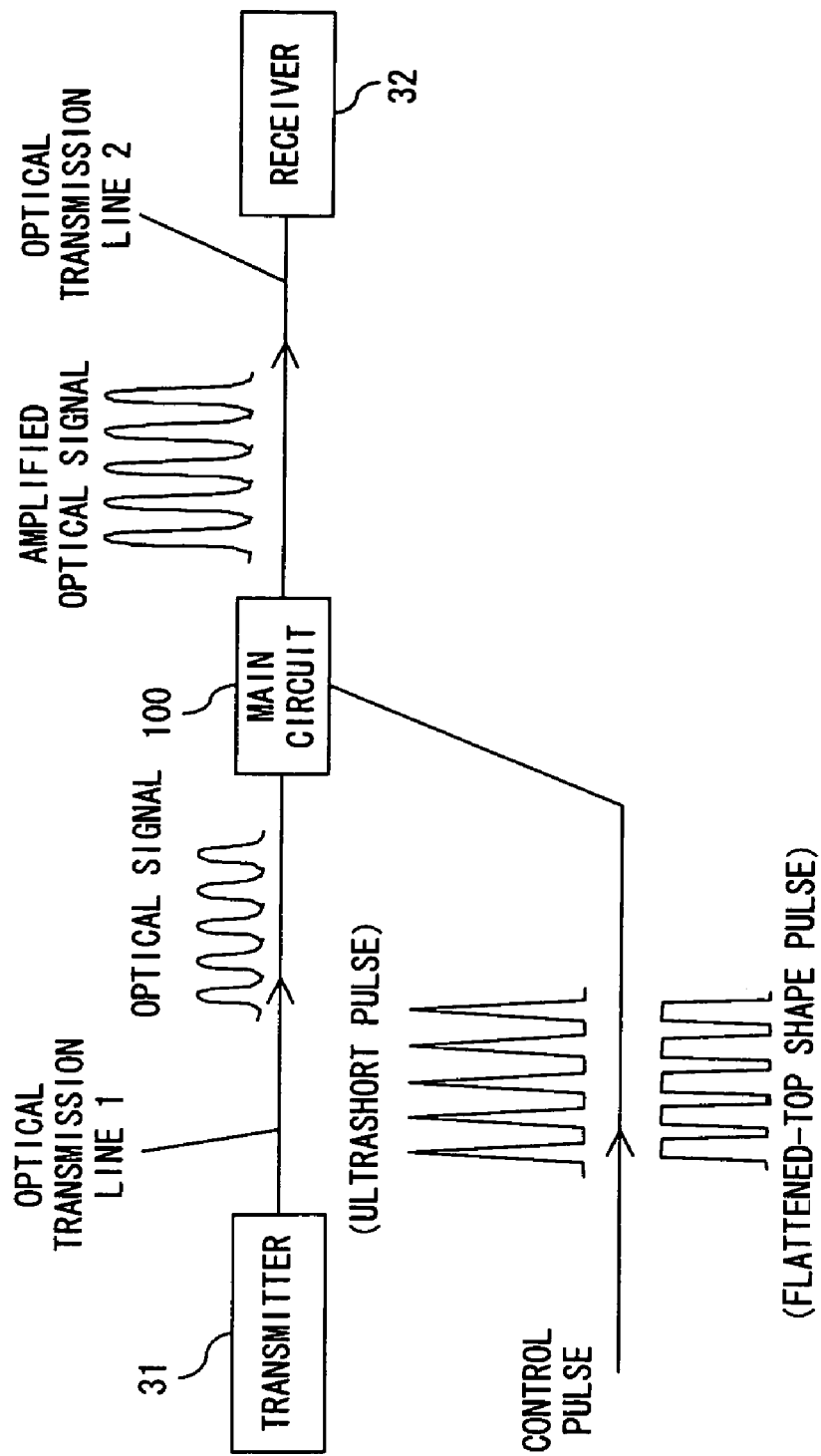
FIG. 16 is a diagram showing an embodiment of the optical switch utilizing a flat-topped control pulse.

FIG. 14 is a diagram describing an optical communication system, which uses an optical switch of the present invention in an optical repeater. In this system, a signal transmitted by a transmitter 31 is amplified by the optical switch 1 in an optical repeater 33, and sent to a receiver 32. First optical transmission line and second optical transmission line can be either optical fiber or free-space transmission.

A signal propagated through a transmission line is attenuated in proportion to its transmission distance, its extinction ratio is degraded as shown in FIG. 15A, and jitter increases.

In the system described in FIG. 14, the influence of jitter and polarization-mode dispersion can be minimized by employing the optical switch 1 to perform optical 2R regeneration as explained in FIG. 8 or FIG. 10. Also, in the optical switch 1, all signals are blocked during the time period in which control pulse is absent. For which reason, even if optical power, when the signal is in a state of "OFF", is increased by noise and distortion of the waveform during transmission (see FIG. 15A), a signal with a high extinction ratio can be regenerated (see FIG. 15B).

In 2R regeneration described in FIG. 8, the peaks of the signal pulse is flattened, however the peaks of the control pulse can be flattened instead of those of the signal pulse. Such a configuration enables amplification repeating, which does not affect phase or the pulse width of the signal. This configuration can also be used in optical DEMUX device as shown in FIG. 12, optical ADM device as shown in FIGS. 13A and 13B, or devices to switch phase-modulated signal or frequency-modulated signals. It is desirable that the signal and control pulse are synchronized with each other by using the optical clock regenerated from the input signal by the clock pulse regenerator 22 shown in FIG. 3.

Figure 17:
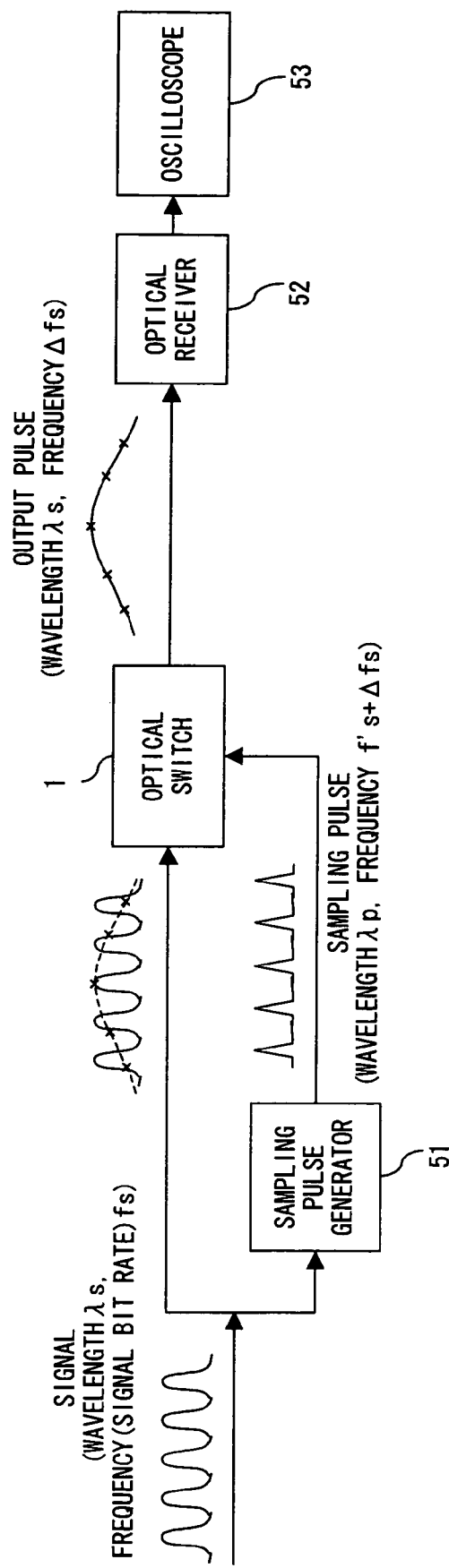
FIG. 17 is a diagram describing an embodiment, which employs the optical switch in an optical sampling oscilloscope.

FIG. 17 is a diagram describing an embodiment, which uses the optical switch in an optical sampling oscilloscope. Here, the bit rate of the signal to be used for observation is expressed as "fs". This signal is input to the optical switch 1.

A sampling pulse generator 51 comprises a clock regenerator to regenerate a reference clock signal from the input signal. The frequency or the sampling rate of the reference clock signal is "f's". The sampling pulse generator 51 generates a series of optical pulses synchronized with a frequency "f's+Δfs", (where Δfs<<f's), which is slightly different from the reference clock frequency, using an optical pulse source. This series of optical pulses are fed to the optical switch 1 as control pulses as explained above with reference to FIG. 1. To make the electric circuit easier, the slower sampling rate "f's=fs/N, where N=1, 2, - - - " is usually used, for example. In so doing, when "N≧2", the frequency of the optical signal of f's can be one Nth of the signal bit rate. In other words, processing speed of an electrical circuit can be lowered, and designing and manufacturing of the electrical circuit can be facilitated. As "N" approaches "1", the number of the sampling signal increases, and thus clear waveform information can be acquired; however, high-speed electrical circuit is required.

The optical switch 1 outputs an optical pulse in proportion to intensity of the input signal at peak timing of the control pulse. An optical receiver 52 converts the output optical pulses from the optical switch 1 sequentially into electrical signals. An oscilloscope 53 detects the waveform of the input signal by tracing the electrical signals obtained from the optical receiver 52 in time domain. At this time, since the frequency difference between the input signal and "N×f's" is "Δfs", the signal waveform is detected in cycle Δfs, which is much slower than the bit rate of the input signal. And by setting sampling rate fs/N much slower than the modulation speed of the input signal, the waveform can be observed even if it is an ultra-high speed pulse, which exceeds the operating speed limits of the electronic circuitry of the oscilloscope. It is possible to output an optical signal with high optical intensity by the gain of the optical switch, and therefore an optical sampling oscilloscope with high sensitivity can be realized. Incidentally, operation of optical sampling oscilloscopes is described in Japanese published unexamined application No. 2003-65857, and Japanese unpublished application No. 2004-214982, for example.

The above-described optical sampling oscilloscope can be used to analyze various substances, such as examining the surface of ultra-microfabricated elements or internal composition of an object. That is, as described in FIG. 18, a signal pulse is incident on an object to be examined, and its reflected or transmitted light are observed. The waveform of reflected or transmitted light differs from the original waveform according to the surface condition and/or non-uniformity of the internal composition of the object to be examined. The shorter signal pulse width facilitates observation of distortion and/or non-uniformity of the examined object, because the pulse shape of short pulses is more sensitive to such features than that of broader pulses and thus tends to change shape more easily, therefore the pulse waveforms of the resulting reflected or transmitted light tend to be distorted more easily.

Figure 19:
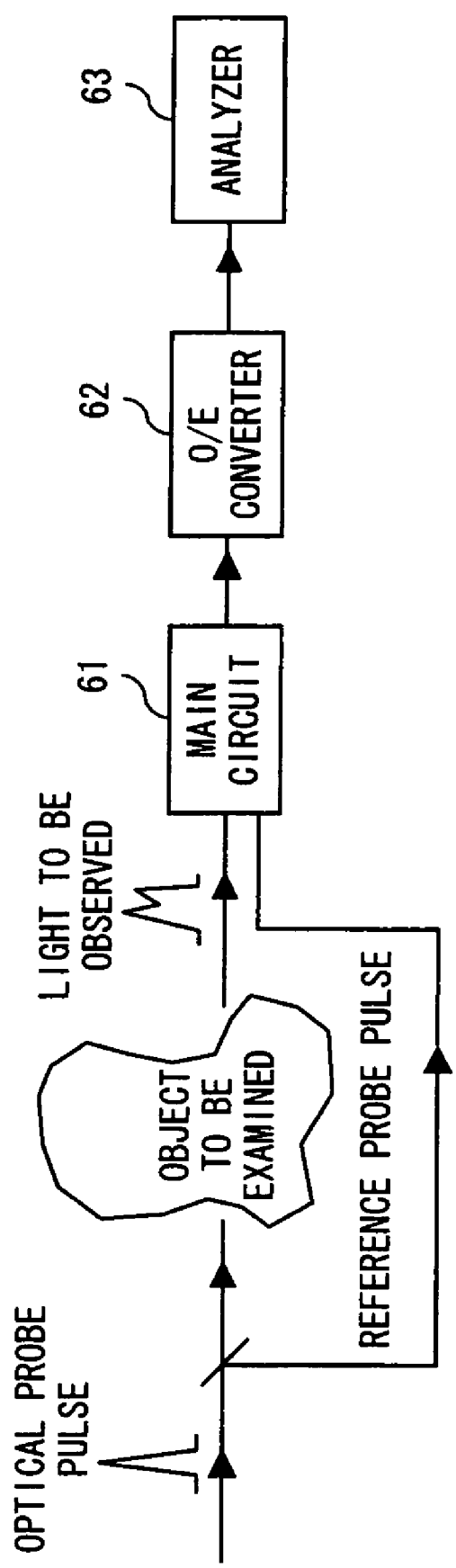
FIG. 19 is a diagram describing an embodiment of a substance analyzer, which uses an optical switch of the present invention.

FIG. 19 is a diagram describing an embodiment of a substance analyzer, which uses an optical switch of the present invention. In FIG. 19, a main circuit 61 is relevant to the optical switch 1 and the sampling pulse generator 51 of FIG. 17. Also, an O/E converter 62 and an analyzer 63 are relevant to the optical receiver 52 and the oscilloscope 53 of FIG. 17.

In this substance analyzer, an optical probe pulse with a short pulse width is used as explained above. First, by directly inputting this optical probe pulse into the main circuit 61, and its waveform is observed. Next, the optical probe pulse is directed at an object to be examined. By guiding measurement light (reflected light or transmitted light) from the object to be examined to the main circuit 61, the waveform of the measurement light is observed. Then comparison of the two waveforms allows the examination of the surface and internal state of the object.

The measurement light is not limited to reflected light or transmitted light, but if the examined object luminesces when irradiated with optical probe pulse, the light emitted from the examined object can be measured. High time resolution and the excellent optical amplification of the optical switch 1 provide for highly accurate measurement of the emitted light even though the emission is very short duration and very weak intensity. Therefore the material analyzer relating to the present invention makes an important contribution to analysis of physical properties of the examined object.

Any wavelength, which can adopt the present invention, can be selected from not only the 1.55 µm band for optical communication but also all wavelength bands that can produce nonlinear optical effects. When an optical fiber is selected as the nonlinear medium, a single-mode fiber is used in the wavelength band in which the nonlinear optical effect can be obtained. The use of optical fibers is not limited to silica fibers, but also optical fibers whose nonlinear effects are enhanced such as photonic crystal fibers and bismuth-substituted fibers are effective. In particular, the use of photonic crystal fiber enables the flexible choice of chromatic dispersion characteristics. Also, there is a possibility that shorter wavelengths can be utilized, it is reported that nonlinear optical fiber can be realized in the wavelength range from the visible ray wavelength up to about 0.8 µm (M. Nakazawa et al., Technical Digest in CLEO2001). In addition, further short wavelength range may be used for the present invention.

An explanation of wavelength configuration in the optical switch of the present invention and enhanced bandwidth of the switching wavelength is provided below.

The optical switch 1 of the present invention utilizes both polarization rotation by cross phase modulation and optical parametric amplification by four-wave mixing in nonlinear optical fiber. These nonlinear optical effects can be achieved at extremely high speed and with extremely broad bandwidth. According to the present invention, thus, it is possible to switch all signals, which are allocated in a wavelength band used in an optical communication system.

In order to improve the characteristics of the optical switch 1, the switch is configured to facilitate four-wave mixing. Development of four-wave mixing depends strongly on the chromatic dispersion of the nonlinear optical fiber. Also, when the optical signal and control pulse (pump light) are coincident in the nonlinear optical fiber, four-wave mixed light (idler light) is generated. If the frequencies of the signal and control pulse are "fs" and "fp", respectively, the frequency of idler light is "2fp−fs". Efficient development of four-wave mixing requires phase matching between the signal and the idler light.

Figure 20:
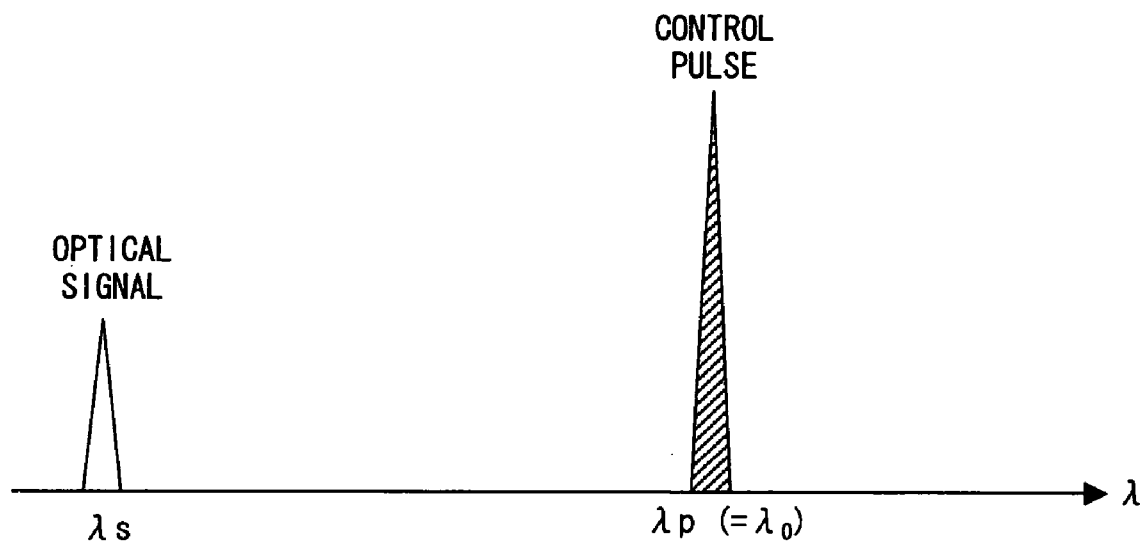
FIG. 20 is a diagram showing the wavelength allocation of the control pulse.

Generally, in order to efficiently generate optical parametric amplification caused by four-wave mixing, for example, it is desirable that the wavelength of the control pulse (pump light) corresponds to the zero dispersion wavelength $\lambda_0$ of the nonlinear optical fiber as shown in FIG. 20. Alternatively, dispersion-flattened fiber (or a fiber with small chromatic dispersion) can be used as a nonlinear optical fiber. However, depending on the length of nonlinear optical fiber and difference between the wavelengths of the signal and the control pulse, these requirements can be eliminated.

In general, when chromatic dispersion around a center wavelength of the control beam to generate the control pulse is $\beta_2$, the amount of phase difference caused by the difference between the wavelength of the optical signal and that of the control pulse can be estimated as "$\beta_2 \times (2\pi fp - 2\pi fs)^2$". Consequently, when the wavelength of the control pulse (pump light) is matched with the wavelength of the zero-dispersion of the nonlinear optical fiber ($\beta_2=0$), the amount of the phase difference by the chromatic dispersion can be virtually zero. However, like the present invention, when the intensity of the control pulse is high, it is effective to optimize the wavelength allocation, considering the amount of phase difference due to the nonlinear phase modulation by the nonlinear effect such as PSM and XPM. The amount of the phase difference, when considering the nonlinear characteristics, can be estimated as "$\beta_2 \times (2\pi fp - 2\pi fs)^2 + 2\gamma P_p$", and therefore, it should be set so that the value reaches the minimum. In so doing, a possible method is a method, in which the wavelength of the pump light (control pulse) is arranged in the anomalous dispersion side of the nonlinear optical fiber so as to have "$\beta_2 < 0$".

FIG. 21A and FIG. 21B are diagrams showing an example wavelength allocation of signal and control pulse, given that two usable wavelength bands exist in the example. Here, two wavelength bands are such as visible ray wavelength band and infrared wavelength band, or C-band (1530 nm-1565 nm) and L-band (1568 nm-1610 nm) for optical communication.

In the presence of such wavelength bands, the signal is configured so as to allocate within one wavelength band (first band) and the control pulse is configured so as to allocate within the other wavelength band (second band), as shown in FIG. 21A. The optical switch 1 of the present invention does not involve wavelength shift in switching the signal. Because the wavelength of the output signal is the same as that of the input signal, the output signal is, therefore, allocated in the first band as described in FIG. 21B.

In general, an optical communication system comprises an optical amplifier, an optical filter, an optical receiver, and an electronic circuit to amplify signals, which is performed after O/E conversion. Among these devices, optical measurement devices are especially high-priced. If optical measurement devices are equipped for every wavelength band, the cost would further increase. However, introduction of the above-explained band arrangement allows switching of all signals allocated within the wavelength band with one set of devices. Also, generally, in order to extract a target switched signal from other optical beams including the control pulse, an optical filter (for example, the optical band-pass filter 16 shown in FIG. 1) is used. Here, if optical amplifiers, which operate for example in corresponding bands (C-band and L-band), are used under the above-explained wavelength allocation, linear amplification can be performed in one band in which signal is allocated, while unnecessary components can be cut off in the other band in which control beam to generated the control pulse is allocated.

Additionally, the wavelength of the signal has to be different from that of the control pulse in the optical switch 1 of the present invention. However, it may be difficult for some users to provide control beam with an appropriate wavelength to obtain the control pulse. For example, some user can provide optical beam in the C-band, which is the most common in optical communication, but cannot provide optical beam in the L-band. In such a case, a configuration, which can generate control pulses in the L-band by converting optical beam in the C-band into optical beam in the L-band, is useful.

Figure 22:
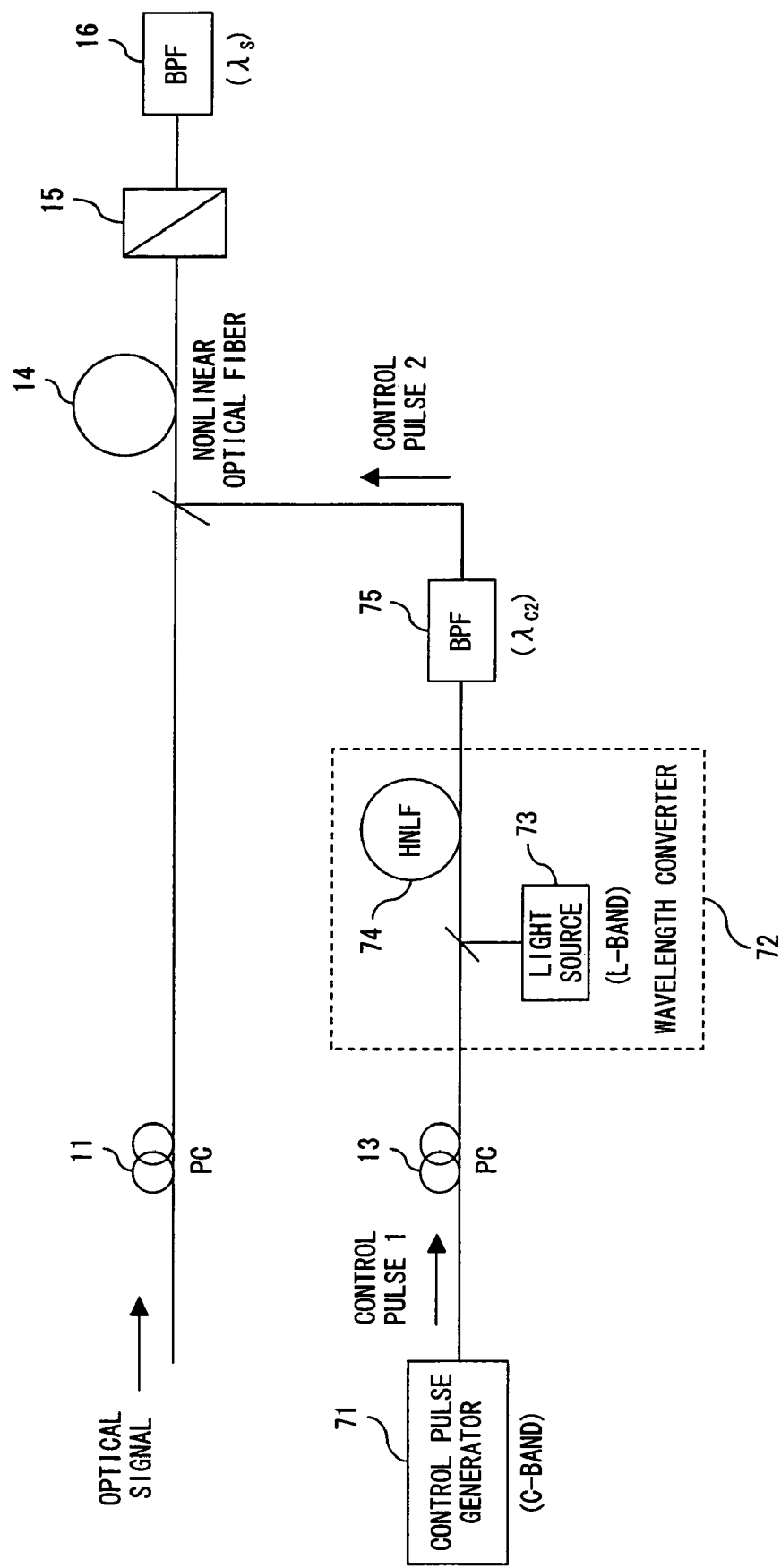
FIG. 22 is a diagram describing a configuration of an optical switch comprising a function for conversion of wavelength of the control pulse.

FIG. 22 is a diagram describing a configuration of an optical switch comprising a function of conversion of wavelength of a control pulse. To be more specific, the following explanation is of the configuration comprising a wavelength conversion function utilizing four-wave mixing.

Figure 23A:
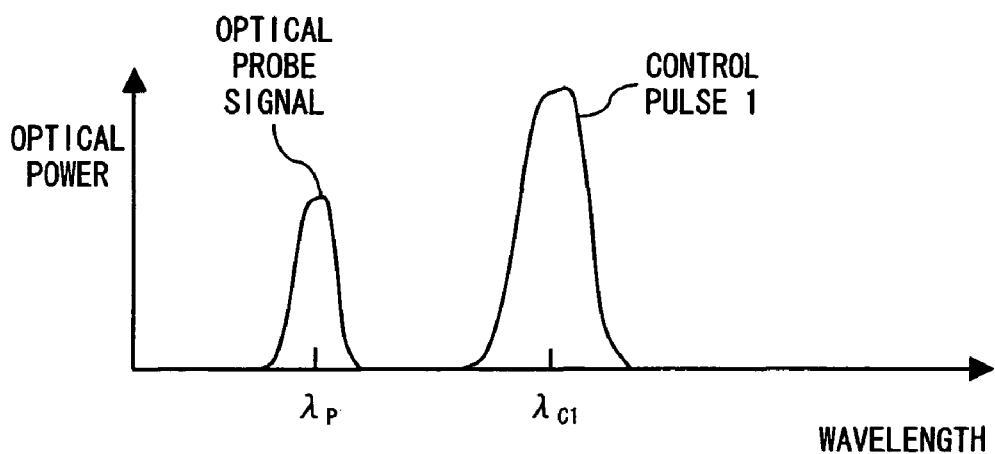
FIG. 23A through FIG. 23C are diagrams explaining wavelength conversion by four-wave mixing.
Figure 23B:
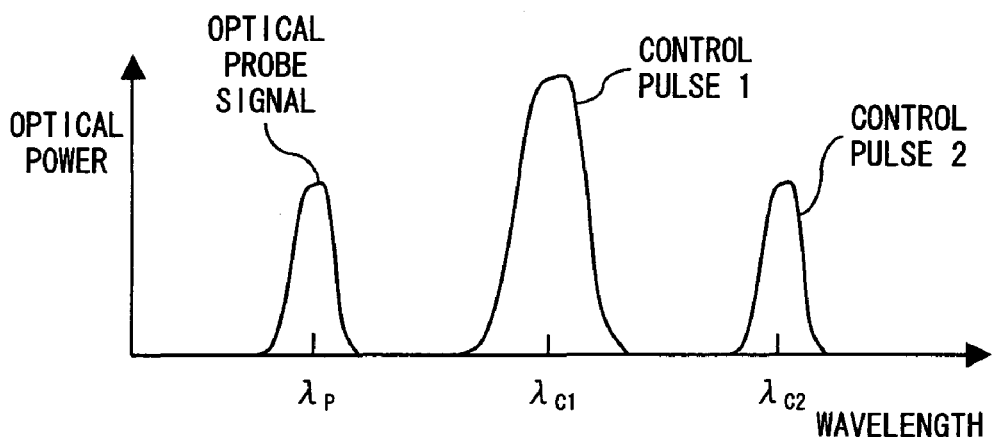

In FIG. 22, a control pulse generator 71 generates first control pulse with its wavelength of $\lambda c1$ within the C-band. A wavelength converter 72 comprises a light source 73 and a nonlinear optical fiber 74. The light source 73 generates probe light with its wavelength of $\lambda p < \lambda_{c1}$, for example. The probe light is either a continuous wave light or a series of optical pulses. As shown in FIG. 23A, the first control pulse and the probe light are input to the nonlinear optical fiber 74. Then, in the nonlinear optical fiber 74, second control pulse is generated by four-wave mixing as shown in FIG. 23B. Here, wavelength $\lambda c2$ of the second control pulse should meet the condition "$\lambda c2 - \lambda c1 \cong \lambda c1 - \lambda p$". By so doing, proper setting of the wavelength of the probe light can produce the second control pulse within the L-band from the first control pulse within the C-band.

Figure 23C:
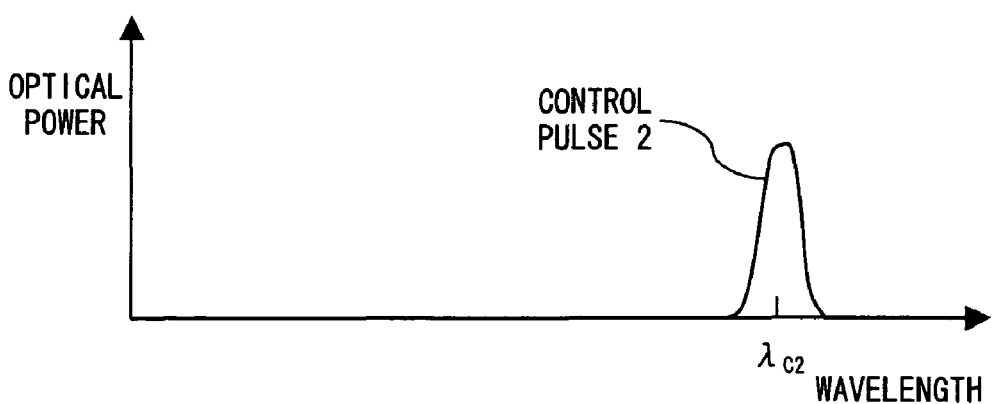

Band-pass filter 75 passes wavelength $\lambda c2$. Therefore, a control pulse with its wavelength within the L-band can be generated as shown in FIG. 23C. Also, an optical amplifier can be adopted to amplify the output of the nonlinear optical fiber 74 as the need arises.

The above-described embodiment provides the function of wavelength conversion utilizing four-wave mixing, however the present invention is not limited to this method. Wavelength conversion can be performed by methods such as a method utilizing three-wave mixing, a method utilizing cross phase modulation, a method utilizing self phase modulation, a method using an LiNbO$_3$ modulator in a quasi-phase matching configuration, a method using a semiconductor optical amplifier, a method using a saturable absorption type modulator, a method using an interferometric optical switch, a method using a device such as photonic crystal and a method detected by a photodetector to convert optical signal to electrical signal and then driving optical modulators with the electrical signal above.

Additionally, the present invention can be adopted in a configuration that has both signal and control pulse arranged within a single band. However, this configuration requires that the optical spectra of the pulses are separated from each other so that they do not inadequately interfere with each other. This arrangement of a signal and control pulse within the same wavelength band facilitates phase matching, decrease the effect of pulse walk-off, and consequently, provides higher efficiency in optical switching.

It is also possible to collectively switch optical WDM signals, in which a plurality of wavelengths multiplexed, with the optical switch of the present invention. However, in order to collectively switch optical WDM signals, signals in each of the channels have to be synchronized with each other. For that purpose, a synchronizing method of timing adjustment by optical buffering using delay circuits after comparison of the signal timing of each wavelength may be employed. On the other hand, when monitoring signal waveform in each channel in the WDM light with the oscilloscope utilizing optical switch of the present invention (see FIG. 17), signals in each of the channels do not have to be synchronized.

The explanation of an embodiment of a nonlinear optical fiber used in the optical switch 1 follows.

It is preferable to have the nonlinear optical fiber 14 with variation in chromatic dispersion less than a certain value over its whole length. Further, the nonlinear optical fiber 14 should have its nonlinear effect enhanced such as photonic crystal fiber, bismuth-substituted fiber (a nonlinear optical fiber with a bismuth doped core) and germanium-substituted fiber (a nonlinear optical fiber with a germanium doped core). In particular, a germanium-substituted fiber, with a configuration in which the refractive index ratio of the core and cladding is properly adjusted and generation efficiency of the third-order nonlinear optical effect per unit length is enhanced, so far is most suitable.

When nonlinear optical fiber is used, phase matching of the signal (wavelength $\lambda s$) with the idler light (wavelength $\lambda c$) in order to achieve four-wave mixing over a broad bandwidth covering two bands (for example, C-band and L-band) as explained above. Conditions for phase matching are described in Japanese published unexamined application No. H7-98464 and Japanese Patent No. 3494661.

Figure 24:
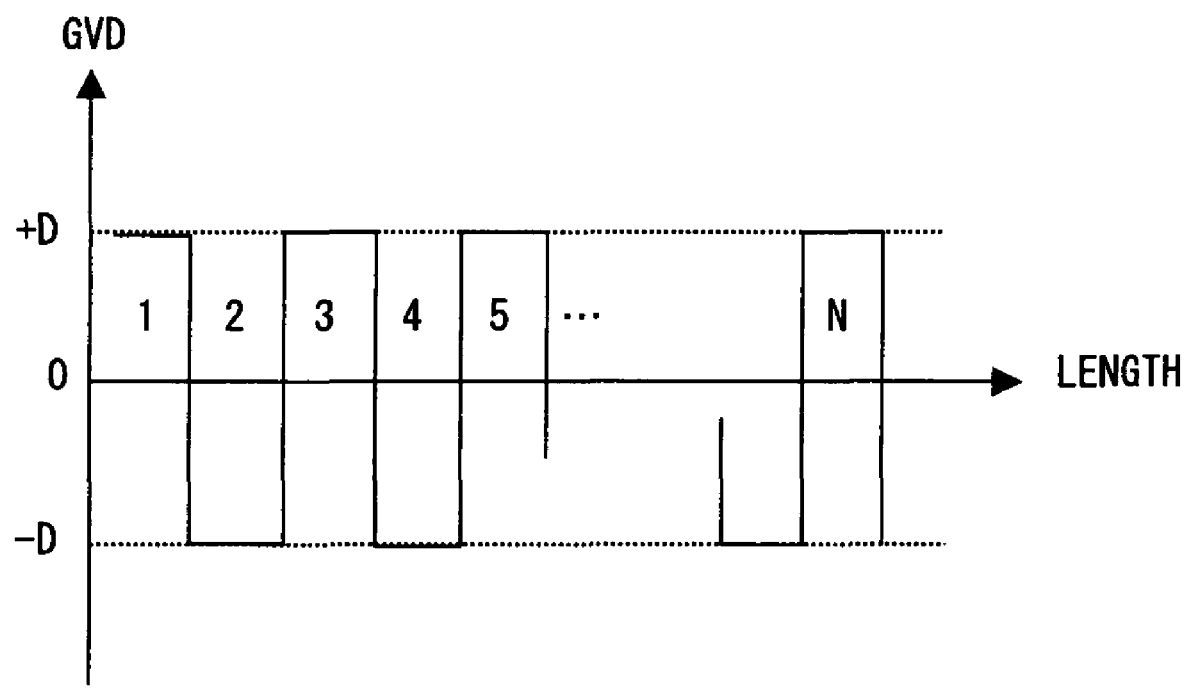
FIG. 24 is a diagram showing an example of dispersion compensation in optical fiber.

As an example, a nonlinear optical fiber with over-all average zero-dispersion can be obtained by alternately arranging optical fiber with positive chromatic dispersion and optical fiber with negative chromatic dispersion as in FIG. 24. When an optical fiber with sufficient nonlinear effects (for example, bismuth-substituted fiber) is used, four-wave-mixing can be achieved with sufficient efficiency even if the length of the fiber is short. However, such optical fiber generally has large chromatic dispersion. In this case, dispersion compensating fiber is suitable for compensation of the dispersion. For example, in FIG. 24, optical fibers with large nonlinear effect are arranged in the part N=1, 3, 5 . . . and the fibers to compensate dispersion of corresponding nonlinear optical fiber are arranged in the part N=2, 4, 6 . . . .

In the optical switch 1 of the present invention, other nonlinear optical medium can be used instead of nonlinear optical fiber. The other nonlinear optical media are semiconductor optical amplifier for four-wave mixing, quantum dot optical amplifier, or LiNbO$_3$ waveguide (Periodically Poled LN) comprising quasi-phase matching configuration for three-wave mixing, for example.

Also, the control pulse, although it is not specifically limited, can be generated using a semiconductor laser, a mode-locked laser, a saturable absorption type modulator or a LiNbO$_3$ waveguide type modulator.

Moreover, the input side of the optical switch 1 shown in FIG. 1 can comprise an optical amplifier to amplify the signal and an optical filter to remove amplified spontaneous emission light (ASE) from the optical amplifier.

Next, the following explains an embodiment, in which the present invention is adopted in an optical communication system. In the explanation, it is assumed that the optical signal sent by the transmitter 31 is transmitted to the receiver 32 via an optical repeater (or optical amplification repeater) 81. By monitoring the waveform of the optical signal at the optical repeater 81, the operational status of the optical communication system is monitored and controlled.

In such a case, a monitoring device 82 is connected to the optical repeater 81, and a component of the signal propagated through first optical transmission line is fed to the monitoring device 82 as shown in FIG. 25A. The monitoring device 82 can be implemented within the optical repeater 81. The monitoring device 82 can monitor the waveform of the signal, as it comprises monitoring functionality equivalent to the optical sampling oscilloscope shown in FIG. 17. The monitoring device 82 also evaluates the waveform of the signal and sends the evaluation result to at least any one of the transmitter 31, receiver 32, other repeaters and a network management system etc. (may be hereinafter collectively referred to as communication devices) when requested. The evaluation of the waveform is obtained by quantifying an eye pattern, for example. By so doing, communication can be controlled in at least any one of the communication devices.

Also, the waveform can be evaluated by at least one of the communication devices by transmitting a sampled optical signal (a series of optical pulses output by the optical switch 1 as in FIG. 17), which are sampled by the monitoring device 82, to the above-mentioned at least one of the communication devices. At this time, the sampled optical signal is, for example, superposed with the signal and transmitted. The optical beam generated by multiplexing the signal and sampled optical signal is converted into an electrical signal by the optical receiver, and then the sampled optical signal is extracted, and its waveform is monitored. Alternatively, it is also possible that the signal is temporally stopped at the optical repeater 81 and only the sampled optical signal is sent to at least one of the communication devices. The sampled optical signal is a short pulse equivalent to the control pulse and its repetition cycle is from several MHz up to hundreds MHz, for example. The sampled optical signal is degraded by chromatic dispersion of optical fiber in optical transmission, however it is easily compensated for waveform monitoring.

In the example explained above, data containing waveform evaluation information and sampled optical signals are transferred to the transmitter and/or receiver. However, they can be transferred to other devices such as the control server, which controls the entire communication system.

Figure 26:
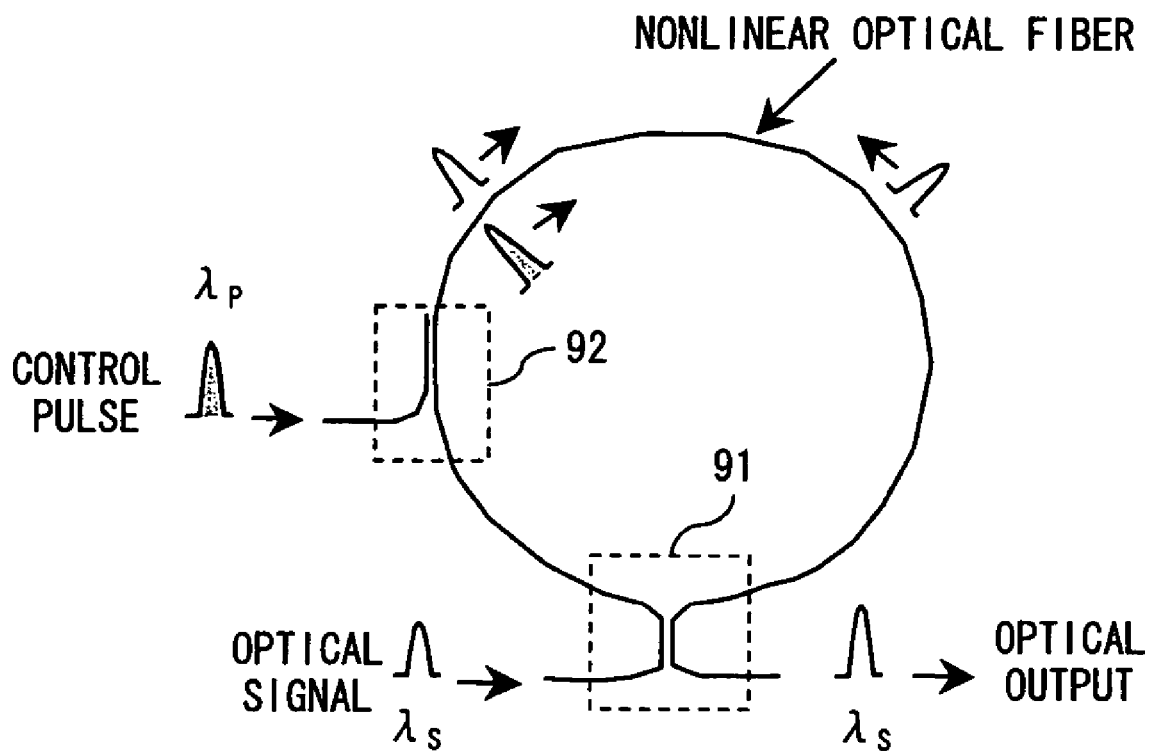
FIG. 26 is a diagram showing an example in which the present invention is implemented as a nonlinear optical loop mirror (NOLM)

FIG. 26 is a diagram showing an example in which the present invention is adopted to implement a nonlinear optical loop mirror (NOLM).

In FIG. 26, optical signal is branched into a pair of counter propagating branched signals by an optical coupler 91 with a coupling ratio of 1:1 so that power of each branched signal in the loop is equal. One of the signals is propagated in loop of the NOLM in the clockwise direction, and the other signal is propagated in the loop in the counterclockwise direction. A control pulse is supplied into the loop by an optical coupler 92 provided on the loop, and propagated in one direction (clockwise, in this example). The control pulse has a large power enough to achieve optical parametric amplification in the nonlinear optical fiber. Consequently, when the control pulse is present, the clockwise propagating signal is parametrically amplified. Conversely, when the control pulse is absent, the clockwise propagating signal and the counter clockwise propagating signal cancel each other, and the output is almost zero.

Nonlinear optical loop mirrors (NOLM) can switch synchronized signals by cross phase modulation of the control pulse as optical Kerr switches can. However, signal blocking in the absence of the control pulse can be achieved by full reflection, which occurs when the signals propagated in the clockwise and the counterclockwise directions, each of which has equal power, return to the optical coupler 91 with the same polarization state. In general, 100 percent transmission, or switching, is achieved when a phase shift of $\pi$ is given to a signal in one direction by cross phase modulation of the control pulse. In the present invention, as explained above, a control pulse with extremely large power is used to parametrically amplify the signal. By so doing, although the light reflected by the optical coupler is increased, signals of higher power can be switched.

As described above, the present invention is not limited to the configuration comprising a polarization controller, a nonlinear optical fiber and a polarizer as in FIG. 1, but can be adopted in nonlinear optical loop mirrors.

In addition, the present invention can be adopted in an interferometer shown in FIG. 27. By controlling cross phase modulation of nonlinear optical medium 93, the interferometer (for example, a Mach-Zehnder interferometer) achieves a first state of outputting an inverted signal of the input signal through second output port along with the outputting the same signal as the input signal through first output port, and a second state of outputting an inverted signal of the input signal through the first output port along with outputting the same signal as the input signal through the second output port.

When the present invention is adopted in this interferometer, the state of the nonlinear optical medium 93 is controlled using a control pulse as mentioned above. The optical power of the control pulse is sufficiently high so that the signal is parametrically amplified in the nonlinear optical medium 93. In this manner, when the control pulse is present, signals, which are parametrically amplified, are output via the first from output port, for example. In this case, when the control pulse is absent, the first output port is in the state of signal extinction. Thus, in the interferometer, optical amplification switching equivalent to that of the configuration shown in FIG. 1 is expected.

As explained above, the present invention is an optical switch comprising a nonlinear optical medium. One of its features, optical parametric amplification of signals is achieved by inputting both of the signal and control pulse to the nonlinear optical medium. The present invention comprises all configurations, which demonstrate such operation.

Additionally, every nonlinear amplification effect, which can be pumped by a control pulse, can be utilized similarly to the end of optical parametric amplification as used in the present invention. For example, when generating nonlinear optical amplification by the Raman effect (Raman amplification) using optical fiber as a nonlinear medium, the above-explained embodiment is achievable by generating an optical pulse, which has 12 THz higher frequency (about 100 nm shorter wavelength) than signal, as pump light. However, in order to generate cross phase modulation and Raman amplification efficiently, it is necessary to decrease walk-off between the signal pulse and control pulse. Among the methods to decrease the walk-off, a method using a nonlinear fiber with a significantly small slope of chromatic dispersion (dispersion-flattened fiber) along with a small chromatic dispersion, and a method using the symmetric arrangement of the wavelength of the signal and control pulses to the zero dispersion wavelength of nonlinear optical fiber are useful.

Next, an optical switch for amplifying and switching a phase-modulated optical signal or a frequency-modulated optical signal is set forth. In the above embodiments, the explanation of an optical switch for switching an intensity-modulated optical signal; however, the optical switch of the present invention can switch a phase-modulated optical signal and a frequency modulated optical signal.

Figure 28:
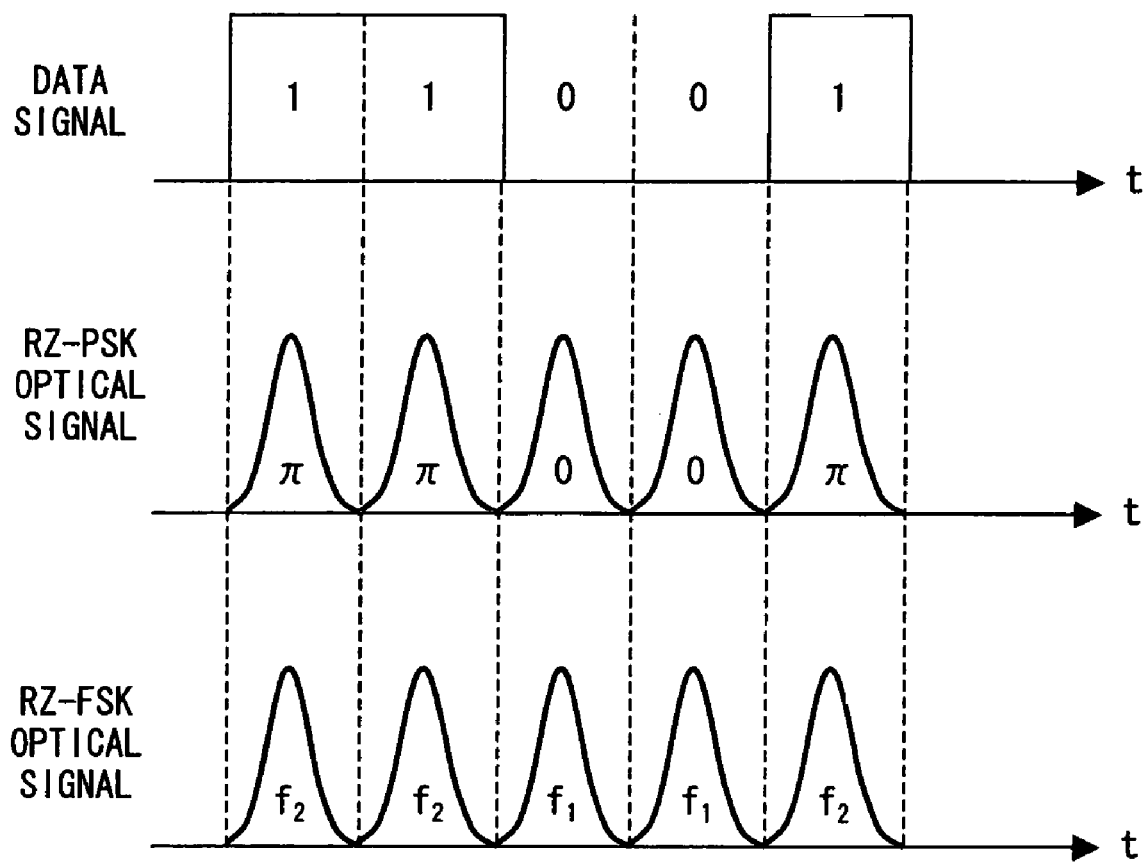
FIG. 28 is a diagram showing a phase-modulated optical signal and a frequency-modulated optical signal.

FIG. 28 is a diagram showing a phase-modulated optical signal and a frequency-modulated optical signal. It is assumed in this example that one symbol carries one bit data.

The phase modulated optical signal is a RZ (Return-to-zero)-PSK (Phase Shift Keying) optical signal, and can be acquired by optical phase modulation on a RZ pulse train according to a data signal. Here, in the RZ pulse train, optical power is practically zero between symbols. In an example of FIG. 28, a phase-modulated optical signal with its phase changes of "ππ00π . . . " according to data signal "11001 . . . ", is acquired. In other words, when data changes between "0" and "1", modulation is performed so as to shift the phase of the optical signal relatively by "π". Alternatively, it is also possible to assign the same phase as the preceding bit when the data is "1", and the phase with "π" added to the preceding bit when the data is "0". In either way, these phase modulations can be realized by, for example, a LiNbO$_3$ modulator or a technique using cross-phase modulation (XPM) in nonlinear medium.

In FIG. 28, BPSK, in which one symbol carries one bit data, is described as a phase modulation technique; however the present invention can be applied to MPSK (M=2, 4, 8, 16 . . . ). For example, for QPSK in which one symbol carries 2-bit data, "π/4", "3π/4", "5π/4" and "7π/4" are assigned to "00", "10", "11" and "01", respectively, as shown in FIG. 29. It is also applicable to a CS (Carrier Suppress) RZ-DPSK signal.

The frequency-modulated optical signal is a RZ-FSK (Frequency Shift Keying) optical signal, and can be acquired by optical frequency modulation on a RZ pulse train according to a data signal. In an example of FIG. 28, a frequency-modulated optical signal, in which frequency of the optical signal is changing as "f2, f2, f1, f1, f2 . . . " according to the data signal "11001 . . . ", is acquired. Such frequency modulation is performed, for example, by using a semiconductor laser etc. with superior frequency conversion efficiency. The phase-modulated optical signal and the frequency-modulated optical signal are received by, for example, optical heterodyne detection or optical homodyne detection.

FIG. 30A is an example of a demodulator for demodulating a DPSK optical signal. In the DPSK technique, the phase difference between adjacent bits is "0" or "π" as written in each pulses in FIG. 28. Therefore, the DPSK optical signal can be demodulated by using a 1-bit optical delay circuit 111. In other words, when the phase difference between the adjacent bits is "π", a signal acquired by coupling an input optical signal and 1-bit-delay optical signal is "1 (optical power present)". On the other hand, when the phase difference between the adjacent bits is "0", a signal acquired by coupling an input optical signal and 1-bit-delay optical signal is "0 (optical power absent)" By so doing, a phase-modulated optical signal is converted into an intensity-modulated optical signal. At present, owing to the advancement of optical waveguide technology, highly accurate 1-bit optical delay circuits have come into practical use. Optical receivers to detect signals after converting phase-modulated optical signal into intensity-modulated optical signal using such a 1-bit optical delay circuit have been implemented these days.

FIG. 30B is a practical example of a demodulator for demodulating the frequency-modulated optical signal. In this example, the frequency-modulated optical signal contains two frequencies f1 and f2. In this a case, by using an optical band-pass filter 112-1 to pass the frequency f1, or an optical band-pass filter 112-2 to pass the frequency f2, the frequency-modulated optical signal can be converted into the intensity-modulated optical signal. The frequency-modulated optical signal can be also converted into the intensity-modulated signal by using a Fabry-Perot resonator or an optical interferometer etc.

FIG. 31A is an example of an optical switch for switching modulated optical signal while amplifying it. In this example, an optical switch 200 comprises polarization controllers 11 and 13, nonlinear optical fiber 14, and polarizer 15 in FIG. 1. The modulated optical signal is a RZ phase-modulated optical signal or a RZ frequency-modulated optical signal. In addition, the control pulse is generated from a control beam with a frequency different from the modulated optical signal, using a clock recovered from the modulated optical signal. In the optical switch 200, the state of polarization (polarization direction) of the control pulse is set at a predetermined state (approximately 45 degrees, for example) to the polarization state (polarization direction) of the modulated optical signal. The operation of the optical switch 200 is basically the same as the above explanation with reference to FIG. 1 through FIG. 7.

In this practical example, the control pulse is, as shown in FIG. 31B, a flat-topped pulse in which optical power of the modulated optical signal maintains a constant intensity above a predetermined value during a certain pulse width. In this case, the predetermined value is zero (virtually zero), for example; however, the value can be other values (for example, ½ of peak of the optical power of the modulated optical signal) If the optical power of the control pulse is constant, the third-order nonlinear optical effect in the nonlinear optical fiber 14 becomes constant. Then, by using the above control pulse, the modulated optical signal is uniformly amplified by parametric amplification. In other words, the waveform of each pulse of the modulated optical signal cannot be distorted.

FIG. 32 is another example of an optical switch for switching the modulated optical signal. In this example, the pulse width of the control pulse is shorter than duration where the optical power of the modulated optical signal is above a predetermined value. A method for generating such a control pulse and the effect thereof is the same as the above explanation provided with reference to FIG. 10 and FIG. 11. In other words, according to this optical switch, timing fluctuation caused by polarization mode dispersion (PMD) etc. is suppressed, and reception characteristics can be improved without configuring a PMD compensator.

In such a way, in FIG. 31A and FIG. 32, the optical switch 200 performs amplifying and switching a phase-modulated optical signal or a frequency-modulated optical signal before converting them into an intensity-modulated signal. The output of the optical switch 200 is provided to a demodulator shown in FIG. 30A or FIG. 30B.

FIG. 33 is an example of an optical DEMUX using an optical switch of the present invention. In this example, an optical signal, acquired by time-division-multiplexing a RZ-DPSK optical signal or a RZ-FSK optical signal, is input to the optical switch 200. As one example, 160 Gbps multiplexed optical signal, in which four channels of 40 Gbps are multiplexed, is input to the optical switch 200. The control pulse can be acquired by recovering the clock from the optical signal and is provided to a nonlinear optical fiber comprised in the optical switch 200. At that time, the bit rate of the control pulse is a bit rate of the channel to be extracted. By so doing, an optical signal in a desired channel is extracted from the multiplexed optical signal.

In the practical example shown in FIG. 31A and FIG. 32, the optical switch of the present invention is configured in a former stage of a demodulator for converting the modulated optical signal; however the optical switch of the present invention can be configured in a later stage of the demodulator for converting a phase-modulated optical signal or a frequency-modulated optical signal into an intensity-modulated signal.

FIG. 34A is an example of switching after a DPSK optical signal is converted into an intensity-modulated optical signal.

In such a case, the DPSK optical signal is converted into an intensity-modulated optical signal by using a 1-bit optical delay circuit 111, as explained referring to FIG. 30A. FIG. 34B is an example of switching after an FSK optical signal is converted into an intensity-modulated optical signal. In such a case, the FSK optical signal is converted into an intensity-modulated optical signal by using the optical band-pass filter 112-1, as explained referring to FIG. 30B. Introduction of these configurations allows suppression of jitter and PMD etc. added to the optical signal in transmission channel and amplification of the optical signal, and therefore reception characteristics can be improved.

The optical switch of the present invention is used as a main part of an optical sampling oscilloscope, as explained with reference to FIG. 17. By applying the optical switch of the present invention to the configuration described in FIG. 34A or FIG. 34B, it is possible to observe data signal optical waveform, converted into an intensity-modulated signal. In addition, this optical sampling oscilloscope may observe the waveform of a phase-modulated optical signal or a frequency-modulated optical signal, as shown in FIG. 35. In this case, although eye patterns cannot be observed, quality of the optical signal such as the S/N ratio and noise distribution of the optical signal can be measured.

An explanation of an optical switch using polarization diversity is provided next.

In the optical switch 1 of the above practical example, a polarization controller 11 is placed in the former stage of the nonlinear optical fiber 14 so as to control the polarization state (polarization direction) of the optical signal being orthogonal to the polarization main axis of the polarizer 15. On the other hand, the following optical switch does not need a polarization controller for controlling polarization state of the input optical signal.

Figure 36:
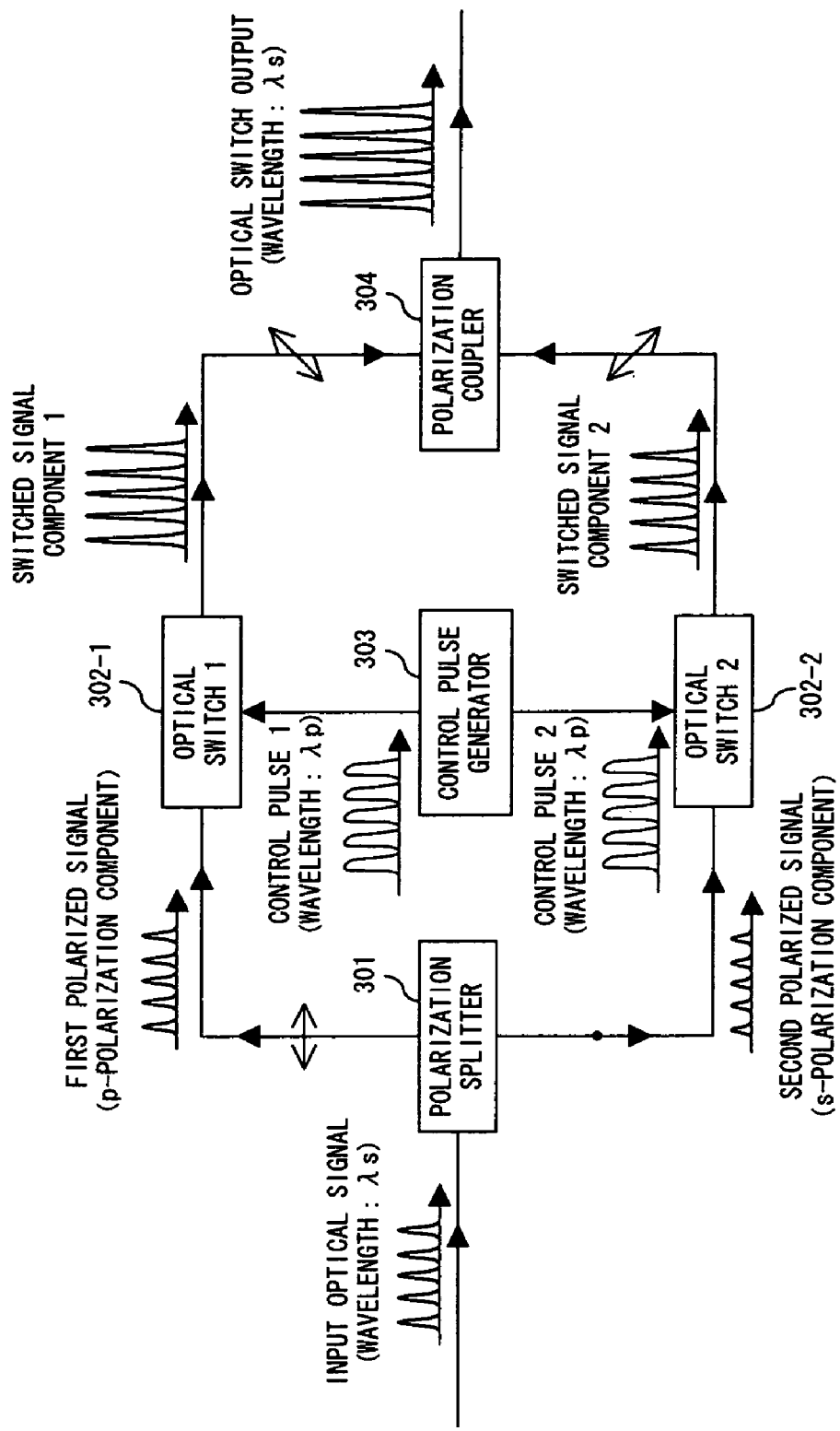
FIG. 36 is a first example of the optical switch using polarization diversity.

FIG. 36 is a diagram showing a configuration of the optical switch using polarization diversity. In FIG. 36, a polarization splitter 301 splits the input optical signal into a first polarized signal (P-polarization component) and a second polarized signal (S-polarization component), which are orthogonal to each other. Each of a pair of optical switches 302-1 and 302-2 comprises the nonlinear optical fiber 14 and the polarizer 15 shown in FIG. 1, and their operations are the same as explained above. In the present example, because a predetermined polarized signal is input to each of the optical switches 302-1 and 302-2 by the polarization splitter 301, the polarization controller 13 can be omitted. A control pulse generator 303, comprising an light source for generating control beam with its wavelength different from the wavelength of the input optical signal, and a clock regenerator for recovering a clock from the input optical signal, generates a first control pulse and a second control pulse from the control beam.

In the optical switch 302-1, the first polarized signal and the first control pulse are input to the nonlinear optical fiber 14, and parametric amplification is performed on the first polarized signal by the first control pulse. In the same manner, in the optical switch 302-2, parametric amplification is performed on the second polarized signal by the second control pulse. The output of the optical switches 302-1 and 302-2 are coupled by a polarization coupler 304. By so doing, the optical signal can be switched without controlling the polarization state of the input optical signal.

It is necessary to match the optical gains of the optical switches 302-1 and 302-2. Here, the optical gains in the optical switches 302-1 and 302-2 are proportional to the product of the length of the nonlinear optical fiber 14, the nonlinear characteristics of the nonlinear optical fiber 14, and the optical power of the control pulse. It is also required to match transmission delay of the channel from the polarization splitter 301 to the polarization coupler 304 via the optical switch 302-1, and that of the channel from the polarization splitter 301 to the polarization coupler 304 via the optical switch 302-2. In such a case, the transmission delay can be adjusted by placing an optical delay circuit.

FIG. 37A and FIG. 37B are diagrams explaining operation of the optical switch shown in FIG. 36. FIG. 37A describes the state of the optical switch 302-1, and FIG. 37B describes the state of the optical switch 302-2.

The first polarized signal and the second polarized signal are orthogonal to each other, as explained above. As shown in FIG. 37A, the polarization state of the first control pulse is set in a state, which is rotated by 45 degrees from the polarization state of the first polarized signal. The polarization main axis of the polarizer 15 in the optical switch 302-1 is set so as to be orthogonal to the polarization state of the first polarized signal. As a result, a part of the first polarized signal (a part coincides with the first control pulse in the nonlinear optical fiber 14 of the optical switch 302-1) is amplified and goes through the polarizer 15.

In the same manner, as shown in FIG. 37B, the polarization state of the second control pulse is set in a state, which is rotated by 45 degrees from the polarization state of the second polarized signal. The polarization main axis of the polarizer 15 in the optical switch 302-2 is set so as to be orthogonal to the polarization state of the second polarized signal. A part of the second polarized signal (a part coincides with the second control pulse in the nonlinear optical fiber 14 of the optical switch 302-2) is amplified and goes through the polarizer 15.

Figure 38:
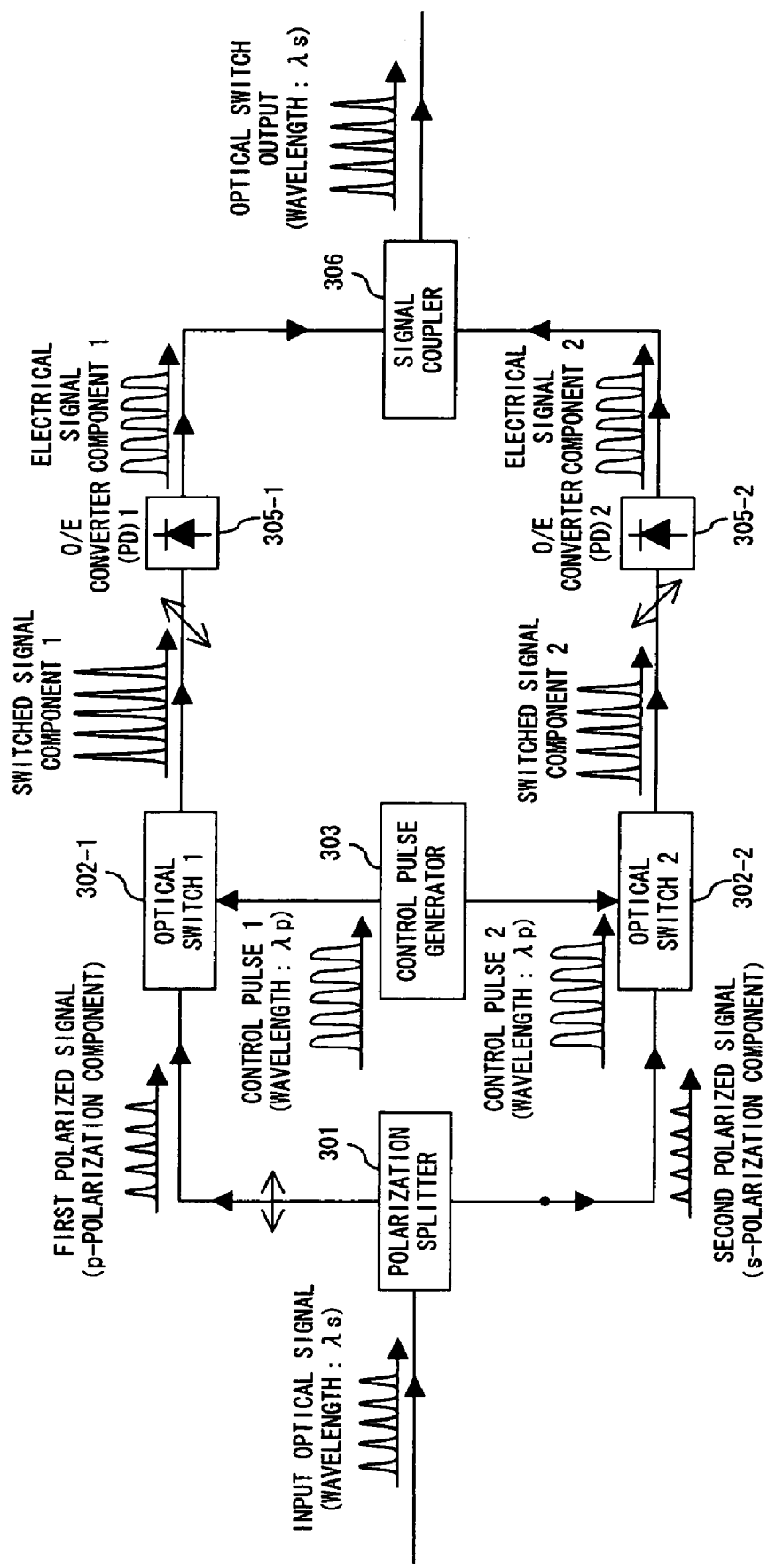
FIG. 38 is a second example of the optical switch using polarization diversity.

FIG. 38 is a modified example of the optical switch shown in FIG. 36. In a configuration shown in FIG. 36, optical switch output is acquired by coupling the output of the optical switches 302-1 and 302-2 in the state of optical signal. On the other hand, in the configuration shown in FIG. 38, the optical signals output from the optical switches 302-1 and 320-2 are converted into electrical signals by using an O/E converters 305-1 and 305-2, respectively, and these electrical signals are coupled by a signal coupler 306. In such a configuration, it is possible to adjust the timing of signals in two channels by using a variable length electrical circuit.

For the implementation of the present invention, it is necessary to set the polarization state of the optical signal and the control pulse to be input to the nonlinear optical fiber 14 at a predetermined (for example, rotated by 45 degrees from each other) linear polarization. The setting can be realized, for example, by monitoring the optical power of the signal output from the polarizer 15 using a photodiode 401 and then, adjusting each of the polarization controllers 11 and 13 by control circuits 402 and 403 so that the optical power of the output optical signal is optimal. Many of the control pulse, in particular, are constant in its repetition frequency f. For that reason, it is desirable, in a feedback system for controlling the polarization of the control pulse, to remove other frequency components (i.e. noise) from the electrical signal acquired by the photodiode 401 by using an electrical band-pass filter 404, which transmits the frequency f as a center frequency. By configuring the filter, detection sensitivity can be improved.

Figure 39:
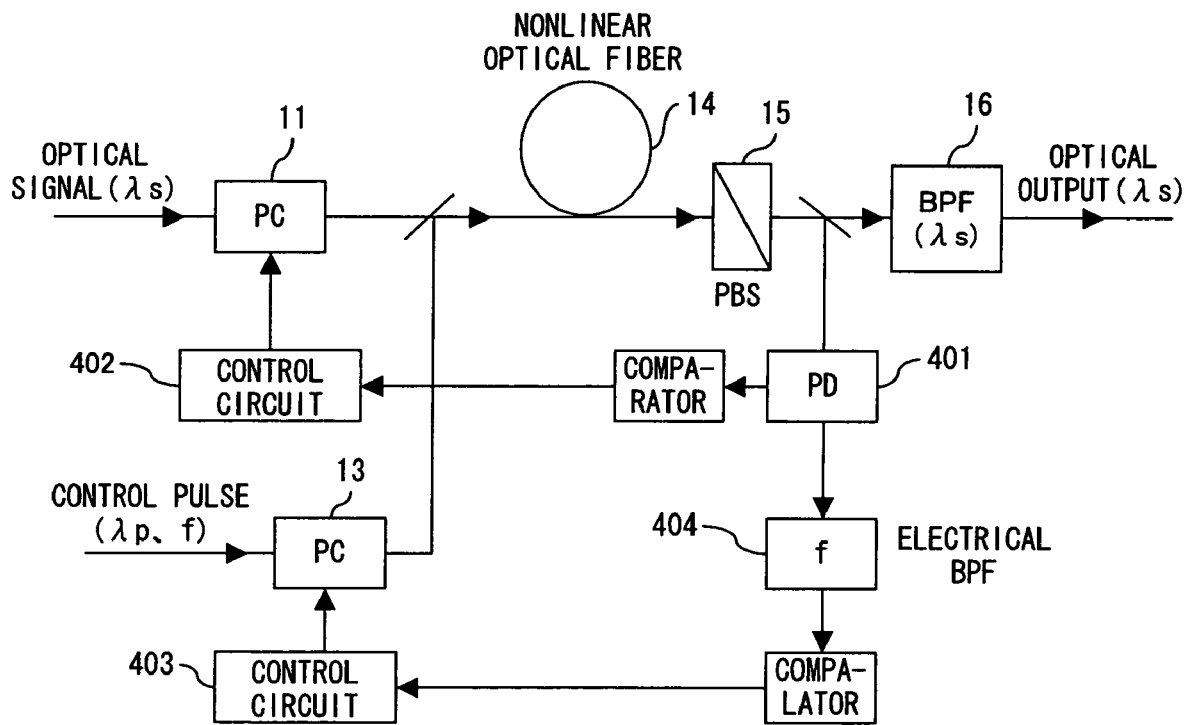
FIG. 39 shows a control system for controlling the polarization of the optical signal and the control pulse.

Although FIG. 39 shows a configuration for monitoring the output of the polarizer 15 configured in the output side of the optical switch, it is possible to monitor each of the optical signal and the control pulse to be input to the nonlinear optical fiber 14, and to adjust the polarization controllers 11 and 13 according to the monitoring result.

Embodiment 1

Figure 40:
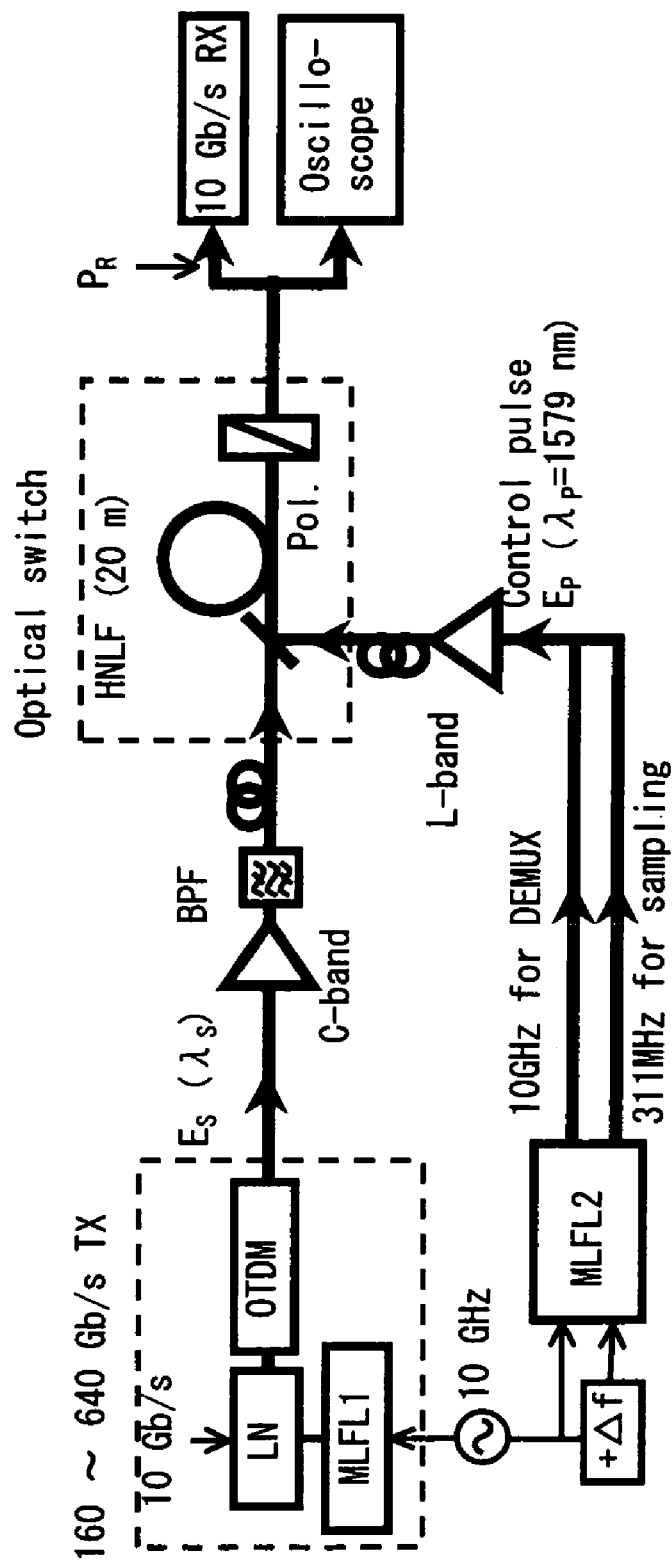
FIG. 40 is a diagram describing a configuration of the system for testing the characteristics of the optical switch of the present invention.

FIG. 40 is a diagram describing a configuration of the system for testing characteristics of the optical switch of the present invention. The testing environment is provided below.

Highly nonlinear fiber (HNLF) is equivalent to the nonlinear optical fiber 14 in FIG. 1. It is 20 m long and has a third-order nonlinear coefficient γ of 20.4 $W^{-1}km^{-1}$, a zero dispersion wavelength $\lambda_0$ of 1579 nm, and a dispersion slope of 0.03 $ps/nm^2/km$. A first Mode-locked fiber laser (MLFL1) generates a series of pulses with a repetition rate of 10 GHz at a wavelength λs in the C-band. The series of optical pulses is modulated by an $LiNbO_3$ intensity modulator (LN, 10 Gbps, PRBS:$2^{23}$–1), the modulated signal is multiplexed by optical time-division multiplexing to generate a data signal Es of 160-640 Gbps. With control pulse Ep generated by a second mode-locked fiber laser (MLFL2), the data signal Es is fed to the highly nonlinear fiber HNLF. The wavelength of the control pulse Ep is approximately the same as the zero dispersion wavelength $\lambda_0$, of the highly nonlinear fiber (HNLF), and is positioned in the L-band. The polarization direction of the control pulse Ep is 45 degrees.

FIG. 41 is a diagram showing switching gain when the peak power of the control pulse Ep is changed. Here the repetition rate of the control pulse Ep is 10 GHz, and wavelength $\lambda_0$ of the data signal Es is 1550 nm. Also, the pulse widths (FWHM) of the data signal Es and control pulse Ep are 1.6 ps and 0.9 ps, respectively.

Switching gain is defined as the power of output data signal Es from a polarizer (Pol.) compared with the power of the input data signal Es in the highly nonlinear fiber HNLF. Due to optical parametric amplification, power of the data signal Es increased almost proportional to the square of the peak power of the control pulse Ep. When the peak power of the control pulse Ep is 15 W, 7.6 dB is obtained as the maximum switching gain.

Figure 42:
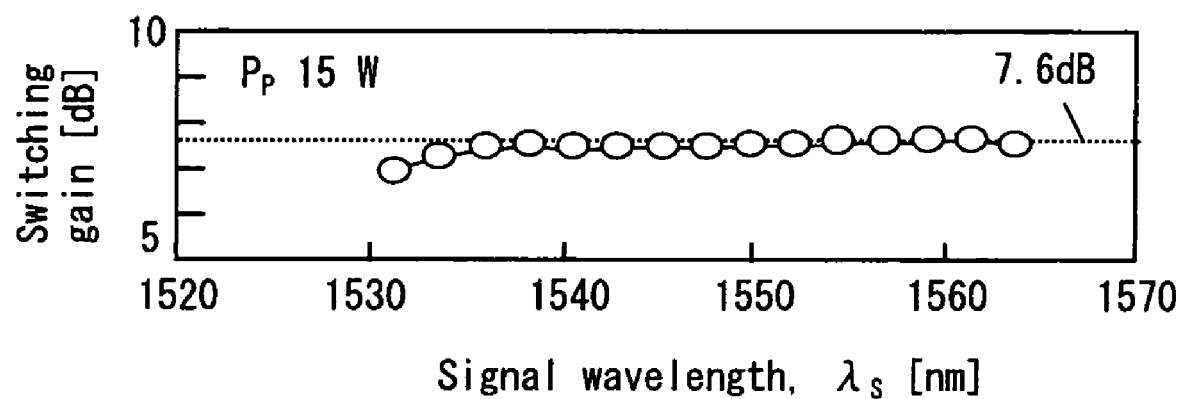
FIG. 42 is a graph showing switching gain when the wavelength of the data signal is changed.

FIG. 42 is a graph showing switching gain when the wavelength of the data signal Es is changed. The peak power of the control pulse Ep is 15 W. Switching gain is almost flat over all wavelengths within the C-band owing to low walk-off and good phase matching in 20 m highly nonlinear fiber (HNLF). The position of wavelength of the control pulse Ep within the C-band allows the optical switch to operate across the whole range of the L-band.

Embodiment 2

Experimental data for optical demultiplexer, which splits a 10 Gbps signal from an optical time-division multiplexed signals Es of 160 Gbps, 320 Gbps, and 640 Gbps is provided below. The pulse width of signal Es at 160 Gbps is 1.6 ps, that of signal Es at 320 Gbps is 0.75 ps, and that of signal Es at 640 Gbps is 0.65 ps. The pulse width of the control pulse Ep is 0.9 ps.

Figure 43:
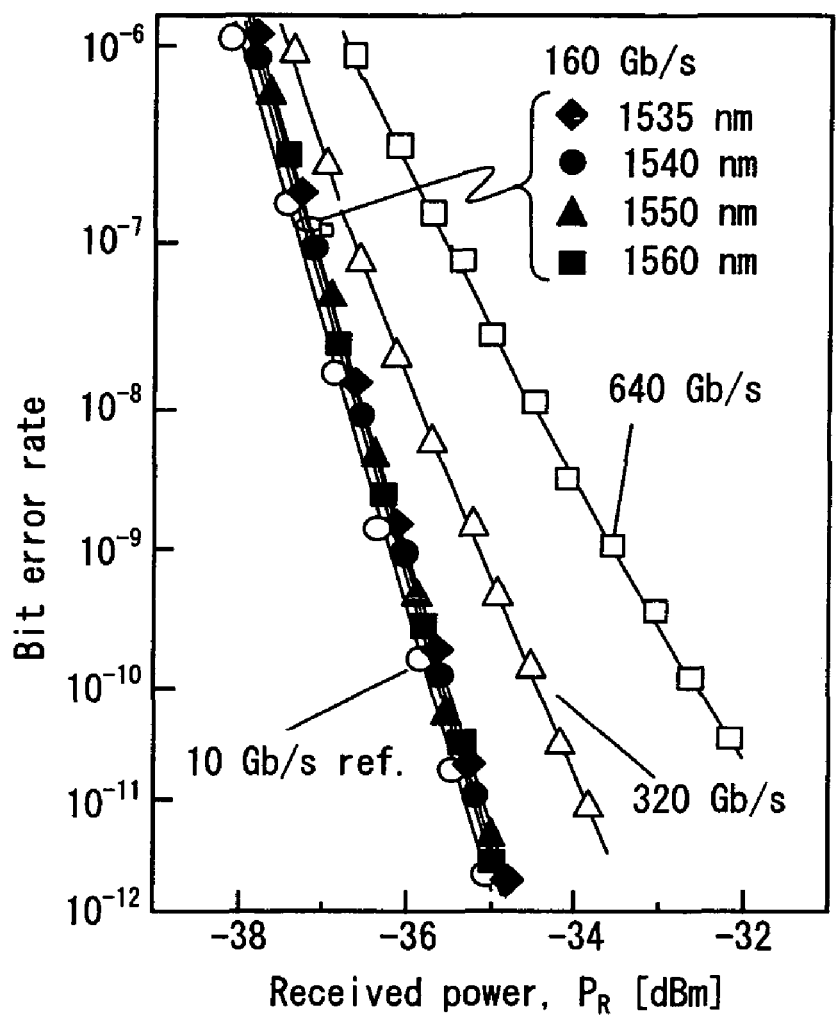
FIG. 43 shows the measured value of BER (Bit Error Rate) when the received optical power of the split signal is changed.

FIG. 43 is a graph showing measured values of BER (Bit Error Rate) when the reception power $P^R$ of the split signal is changed. The average power of the control pulse is +21.8 dBm (equivalent to peak power=15 W). The average power of the input signal Es of 160 Gbps to the optical switch is −5 dBm.

At 160 Gbps, bit error rates for each signal wavelength λs=1535 nm, 1540 nm, 1550 nm, and 1560 nm are measured. As a result, error-free operation (BER=$10^{-9}$) with a power penalty of less than 0.2 dB is achieved for all wavelengths in the C-band. Signals with 320 Gbps and 640 Gbps, error-free operation is achieved with little increase in power penalty of 1.1 dB and 2.5 dB, respectively. This increase in power penalty is mainly dues to residual cross talk because the pulse width is not sufficiently short.

Embodiment 3

Signal waveforms observed with an oscilloscope after sampling utilizing the optical switch of the present invention are shown. FIG. 44A through FIG. 44E show the observed eye diagrams when the pulse width conditions are the same as explained in Embodiment 2. The sampling rate is 311 MHz. Excellent eye diagrams are obtained throughout the range of 160 through 640 Gbps. Such fine time resolution is a great contribution to the implementation of optical sampling with high contrast over the entire range of the C-band.

The following document provides descriptions of the embodiments 1 through 3 explained above. S. Watanabe, et al. "Novel Fiber Kerr-Switch with Parametric Gain: Demonstration of Optical Demultiplexing and Sampling up to 640 Gb/s", $30^{th}$ European Conference on Optical Communication (ECOC 2004), Stockholm, Sweden, September 2004, Post-deadline paper Th4.1.6, pp 12-13.

What is claimed is:

1. An optical switch, comprising:
   a first polarization controller controlling a polarization direction of an optical signal;
   a nonlinear optical fiber to which the optical signal output from said first polarization controller is input;
   an optical pulse generator generating a control pulse with a wavelength different from that of the optical signal and providing the control pulse to said nonlinear optical fiber;
   a second polarization controller, placed between said optical pulse generator and said nonlinear optical fiber, aligning a polarization direction of the control pulse to a designated angle relative to the polarization direction of the optical signal; and
   a polarizer, placed at the output side of said nonlinear optical fiber, having a main polarization axis orthogonal to a polarization direction of the optical signal output from said nonlinear optical fiber, wherein
   the optical signal is selectively amplified with parametric amplification by the control pulse around a polarization direction of the control pulse propagating in the same direction as the optical signal in said nonlinear optical fiber,
   an angle between the polarization direction of the optical signal and the polarization direction of the control pulse is between 40 and 50 degrees.

2. The optical switch according to claim 1, wherein
   an angle between the polarization direction of the optical signal and the polarization direction of the control pulse is about 45 degrees.

3. The optical switch according to claim 1, wherein
   the output power of the optical signal from said polarizer is greater than the input power of the optical signal to said nonlinear optical fiber.

4. The optical switch according to claim 1, wherein
   the wavelength of the optical signal input to said nonlinear optical fiber is the same as the wavelength of the optical signal output from said polarizer.

5. The optical switch according to claim 1, wherein
   said nonlinear optical fiber is an optical fiber with variability in chromatic dispersion less than a certain value over its whole length.

6. The optical switch according to claim 1, wherein
an average zero-dispersion wavelength of the nonlinear optical fiber is the same or almost same as the wavelength of the control pulse.

7. The optical switch according to claim 6, wherein
the optical fiber is a highly nonlinear optical fiber with a core doped with germanium or bismuth.

8. The optical switch according to claim 6, wherein
the optical fiber is a photonic crystal fiber.

9. The optical switch according to claim 1, wherein
said nonlinear optical fiber is dispersion-flattened fiber with zero chromatic dispersion throughout its whole length.

10. The optical switch according to claim 1, wherein
said optical pulse generator recovers a clock from the optical signal, and generates the control pulse, which is synchronized with the optical signal utilizing the regenerated clock.

11. The optical switch according to claim 1, wherein
the control pulse is allocated in a wavelength band, which is different from a wavelength band in which the optical signal is allocated.

12. The optical switch according to claim 1, further comprising:
an optical filter, placed on the output side of said polarizer, removing amplified spontaneous emission.

13. The optical switch according to claim 1, further comprising:
an optical amplifier amplifying the optical signal; and
an optical filter removing amplified spontaneous emission from said optical amplifier, wherein
the output of said optical filter is provided to said first polarization controller.

14. The optical switch according to claim 1, further comprising:
a converter converting output from said polarizer into electrical signal;
a filter, a center frequency of which being a repetition frequency of the control pulse, filtering the electrical signal from said converter; and
a control circuit adjusting polarization of the control pulse by said second polarization controller according to the filtered electrical signal.

15. An optical switch, comprising:
a nonlinear optical fiber, to which both an optical signal with a designated polarization direction and a control pulse with a different wavelength and different polarization direction from the optical signal are input, changing a polarization of the optical signal by cross phase modulation during a period where the optical signal coincides with the control pulse in the time domain, and selectively amplifying the optical signal in the time domain so that the optical signal has a polarization component around the polarization direction of the control pulse propagating in the same direction as the optical signal in said nonlinear optical fiber by optical parametric amplification;
an optical pulse generator generating the control pulse and providing the control pulse to said nonlinear optical fiber;
a polarization controller, placed between said optical pulse generator and said nonlinear optical fiber, aligning a polarization direction of the control pulse to a designated angle relative to the polarization direction of the optical signal; and
a polarizer, placed on the output side of said nonlinear optical fiber, having a polarization main axis orthogonal to the polarization direction of the optical signal, wherein
an angle between the polarization direction of the optical signal and the polarization direction of the control pulse is between 40 and 50 degrees.

16. An optical switch comprising
a nonlinear optical fiber, to which an optical signal with a polarization direction controlled by a first polarization controller is input;
an optical pulse generator generating a control pulse with a wavelength different from that of the optical signal and providing the control pulse to said nonlinear optical fiber; and
a second polarization controller, placed between said optical pulse generator and said nonlinear optical fiber, aligning a polarization direction of the control pulse to a designated angle relative to the polarization direction of the optical signal, wherein
the polarization of the optical signal in the absence of the control pulse is aligned so that the optical signal polarization is orthogonal to a main polarization axis of a polarizer placed on the output side of the nonlinear optical fiber by use of the first polarization controller; and
the optical signal is selectively amplified by optical parametric amplification to have the polarization component around a polarization direction of the control pulse by the control pulse propagating in the same direction as the optical signal in the nonlinear optical fiber,
an angle between the polarization direction of the optical signal and the polarization direction of the control pulse is between 40 and 50 degrees.

17. An optical waveform monitoring device, comprising:
a first polarization controller controlling a polarization direction of an optical signal;
a nonlinear optical fiber to which the optical signal output from said polarization controller is input;
an optical pulse generator generating a control pulse with a wavelength different from that of the optical signal and providing the control pulse to said nonlinear optical fiber;
a second polarization controller, placed between said optical pulse generator and said nonlinear optical fiber, aligning a polarization direction of the control pulse to a designated angle relative to the polarization direction of the optical signal;
a polarizer, placed at the output side of said nonlinear optical medium, having a main polarization axis orthogonal to a polarization direction of the optical signal output from said nonlinear optical fiber;
an optical receiver converting the output of said polarizer into an electrical signal; and
monitoring means for monitoring a waveform of the optical signal by tracing the electrical signal in a time domain, wherein
the optical signal is selectively amplified with parametric amplification by the control pulse around a polarization direction of the control pulse propagating in the same direction as the optical signal in said nonlinear optical fiber,
a frequency of the control pulse is different from a bit rate of the optical signal,
an angle between the polarization direction of the optical signal and the polarization direction of the control pulse is between 40 and 50 degrees.

18. An optical communication system comprising an optical repeater on its transmission line, wherein
the optical repeater comprises the optical waveform monitoring device according to claim 17,
the optical monitoring device transmits an evaluation of the waveform of the optical signal propagated on the transmission line to a designated device.

19. An optical communication system comprising an optical repeater on its transmission line, wherein
the optical repeater comprises the optical waveform monitoring device according to claim 17,
the optical monitoring device transmits output of a series of optical pulses from said polarizer when the optical signal propagated on the transmission line is input into said nonlinear optical fiber to a designated device,
the waveform of the optical signal is monitored based on the series of optical pulse in the designated device.

20. An optical waveform monitoring device, comprising:
a first polarization controller controlling a polarization direction of an optical signal;
a nonlinear optical fiber to which the optical signal output from said polarization controller is input;
an optical pulse generator generating a control pulse with a wavelength different from that of the optical signal and providing the control pulse to said nonlinear optical fiber;
a second polarization controller, placed between said optical pulse generator and said nonlinear optical fiber, aligning a polarization direction of the control pulse to a designated angle relative to the polarization direction of the optical signal;
a polarizer placed at the output side of said nonlinear optical fiber;
an optical receiver converting the output of said polarizer into an electrical signal; and
monitoring means for monitoring a waveform of the optical signal by tracing the electrical signal in a time domain, wherein
the optical signal is selectively amplified with parametric amplification by the control pulse around a polarization direction of the control pulse propagating in the same direction as the optical signal in said nonlinear optical fiber,
a frequency of the control pulse is different from a bit rate of the optical signal,
a polarization direction of the optical signal is aligned orthogonal to the main polarization axis of said polarizer in the absence of the control pulse by said polarization controller,
an angle between the polarization direction of the optical signal and the polarization direction of the control pulse is between 40 and 50 degrees.

21. A method for optical switching, comprising:
controlling a polarization direction of an optical signal;
generating a control pulse with a wavelength different from a wavelength of the optical signal;
aligning a polarization direction of the control pulse to a designated angle relative to the polarization direction of the optical signal;
inputting the optical signal and control pulse into a nonlinear optical fiber;
extracting a part of the optical signal, which is coincident in time with the control pulse, by directing the optical signal pass through the polarizer having a main polarization axis orthogonal to a polarization direction of the optical signal during a period in which the control pulse is absent, the polarization direction of the optical signal being changed by cross phase modulation and the optical signal being selectively amplified by optical parametric amplification around a polarization direction of the control pulse propagating in the same direction as the optical signal during a period in which the optical signal is coincident with the control pulse in the nonlinear optical fiber, wherein
an angle between the polarization direction of the optical signal and the polarization direction of the control pulse is between 40 and 50 degrees.

22. A method for optical switching, comprising:
controlling a polarization direction of a first optical signal;
generating a control pulse with a wavelength different from a wavelength of the first optical signal;
aligning a polarization direction of the control pulse to a designated angle relative to the polarization direction of the first optical signal;
inputting the first optical signal and control pulse into a nonlinear optical fiber;
time-division multiplexing a second optical signal with the first optical signal, the first and second optical signals being not coincident in time with each other, by directing the first optical signal, selectively amplified by optical parametric amplification to be the polarization component with a polarization direction around that of the control pulse propagating in the same direction as the first optical signal in said nonlinear optical fiber and has a polarization direction changed by cross phase modulation during a period in which the first optical signal coincides with the control pulse, pass through a polarizer having a main polarization axis orthogonal to the polarization direction of the first optical signal in the absence of the control pulse, wherein
an angle between the polarization of the optical signal and the polarization direction of the control pulse is between 40 and 50 degrees.

23. A method for optical switching, comprising:
generating a control pulse with a time width shorter than that of a pulse of an optical signal and with a wavelength different from a wavelength of the optical signal;
aligning a polarization of the control pulse to a designated angle relative to a polarization direction of the optical signal;
inputting the optical signal and the control pulse into a nonlinear optical fiber; and
extracting a part of the optical signal, which is coincident in time with the control pulse, by directing the optical signal pass through a polarizer having a main polarization axis orthogonal to a polarization direction of the optical signal during a period in which the control pulse is absent, the polarization direction of the optical signal being changed by cross phase modulation and the optical signal being selectively amplified by optical parametric amplification around a polarization direction of the control pulse propagates in the same direction as the optical signal during a period in which the optical signal is coincident with the control pulse in the nonlinear optical fiber, wherein
an angle between the polarization direction of the optical signal and the polarization direction of the control pulse is between 40 and 50 degrees.

24. An optical switch, comprising:
a nonlinear optical fiber to which an optical signal and a control pulse are input;

an optical pulse generator generating the control pulse with a wavelength different from that of the optical signal and providing the control pulse to said nonlinear optical fiber;

a polarization controller, placed between said optical pulse generator and said nonlinear optical fiber, aligning a polarization direction of the control pulse to a designated angle relative to the polarization direction of the optical signal; and optical means for outputting the optical signal during a period in which the optical signal coincides with the control pulse in said nonlinear optical fiber, and for blocking the optical signal during a period in which the control pulse is absent in said nonlinear optical fiber, wherein the optical signal is selectively amplified with parametric amplification by the control pulse around a polarization direction of the control pulse propagating in the same direction as the optical signal in said nonlinear optical fiber, an angle between the polarization direction of the optical signal and the polarization direction of the control pulse between 40 and 50 degrees.

25. An optical switch, comprising:

a nonlinear optical fiber to which an optical signal and a control pulse are input;

an optical pulse generator generating the control pulse with a wavelength different from that of the optical signal and providing the control pulse to said nonlinear optical fiber;

a polarization controller, placed between said optical pulse generator and said nonlinear optical fiber, aligning a polarization direction of the control pulse to a designated angle relative to the polarization direction of the optical signal; and optical means for outputting the optical signal during a period in which the optical signal coincides with the control pulse in said nonlinear optical fiber, and for blocking the optical signal during a period in which the control pulse is absent in said nonlinear optical fiber, wherein the optical signal is selectively amplified with nonlinear amplification by the control pulse around a polarization direction of the control pulse propagating in the same direction as the optical signal in said nonlinear optical fiber, an angle between the polarization direction of the optical signal and the polarization direction of the control pulse is between 40 and 50 degrees.

26. An optical switch, comprising:

a first polarization controller controlling a polarization direction of an optical signal;

a nonlinear optical fiber to which the optical signal output from said polarization controller is input;

an optical pulse generator generating the control pulse with a wavelength different from that of the optical signal and providing the control pulse to said nonlinear optical fiber;

a second polarization controller, placed between said optical pulse generator and said nonlinear optical fiber, aligning a polarization direction of the control pulse to a designated angle relative to the polarization direction of the optical signal; and a polarizer, placed at the output side of said nonlinear optical fiber, having a main polarization axis orthogonal to a polarization direction of the optical signal output from said nonlinear optical fiber, wherein the optical signal is selectively amplified with nonlinear amplification by a control pulse around a polarization direction of the control pulse propagating in the same direction as the optical signal in said nonlinear optical fiber, an angle between the polarization direction of the optical signal and the polarization direction of the control pulse is between 40 and 50 degrees.

* * * * *

UNITED STATES PATENT AND TRADEMARK OFFICE
CERTIFICATE OF CORRECTION

PATENT NO. : 7,848,647 B2
APPLICATION NO. : 11/216213
DATED : December 7, 2010
INVENTOR(S) : Shigeki Watanabe It is certified that error appears in the above-identified patent and that said Letters Patent is hereby corrected as shown below:

Title Pg, Item (56) under Stolen et al. delete "pafges" and insert --pages--, therefor.

Column 28, Line 8, in Claim 16, after "comprising" insert -- : --.

Signed and Sealed this
Twenty-second Day of March, 2011

David J. Kappos
*Director of the United States Patent and Trademark Office*